United States Patent
Fujimoto

(10) Patent No.: US 8,413,421 B2
(45) Date of Patent: Apr. 9, 2013

(54) DETERIORATION DIAGNOSING APPARATUS FOR EXHAUST GAS PURIFYING CATALYST

(75) Inventor: Takeshi Fujimoto, Obu (JP)

(73) Assignee: Denso Corporation, Kariya (JP)

( * ) Notice: Subject to any disclaimer, the term of this patent is extended or adjusted under 35 U.S.C. 154(b) by 679 days.

(21) Appl. No.: 12/552,679

(22) Filed: Sep. 2, 2009

(65) Prior Publication Data
US 2010/0050602 A1 Mar. 4, 2010

(30) Foreign Application Priority Data

Sep. 4, 2008 (JP) ................................. 2008-227521
Dec. 1, 2008 (JP) ................................. 2008-305954

(51) Int. Cl.
*F01N 3/00* (2006.01)
(52) U.S. Cl.
USPC ................................. 60/277; 60/276; 60/285
(58) Field of Classification Search ................ 60/277, 60/276, 285
See application file for complete search history.

(56) References Cited

U.S. PATENT DOCUMENTS

| 5,154,055 | A | * | 10/1992 | Nakane et al. ................. 60/276 |
| 5,177,464 | A | * | 1/1993 | Hamburg ....................... 340/439 |
| 6,338,243 | B1 | * | 1/2002 | Takaoka et al. ................. 60/277 |
| 2002/0026789 | A1 | * | 3/2002 | Morinaga et al. ............... 60/277 |
| 2006/0101808 | A1 | * | 5/2006 | Nakagawa et al. ............. 60/277 |
| 2007/0214775 | A1 | * | 9/2007 | I et al. ............................. 60/288 |
| 2008/0041035 | A1 | * | 2/2008 | Sawada et al. ................. 60/277 |
| 2008/0110447 | A1 | * | 5/2008 | Wakahara et al. ............ 123/672 |

FOREIGN PATENT DOCUMENTS

JP        4-81540        3/1992

* cited by examiner

*Primary Examiner* — Thomas Denion
*Assistant Examiner* — Matthew T Largi
(74) *Attorney, Agent, or Firm* — Nixon & Vanderhye P.C.

(57) ABSTRACT

Two different flows for air-fuel mixture are formed by two different variational amounts for changing the air-fuel ratio of the mixture. Response delay times for different exhaust gas flows are measured as time periods from a first time point at which the air-fuel ratio of the mixture is changed to a second time point at which an output of an oxygen sensor is changed. The oxygen sensor is provided in an exhaust pipe of an engine at a downstream side of an exhaust gas purifying catalyst. A difference between the two response delay times is compared with a predetermined threshold value to carry out the diagnosis for the catalyst deterioration.

7 Claims, 30 Drawing Sheets

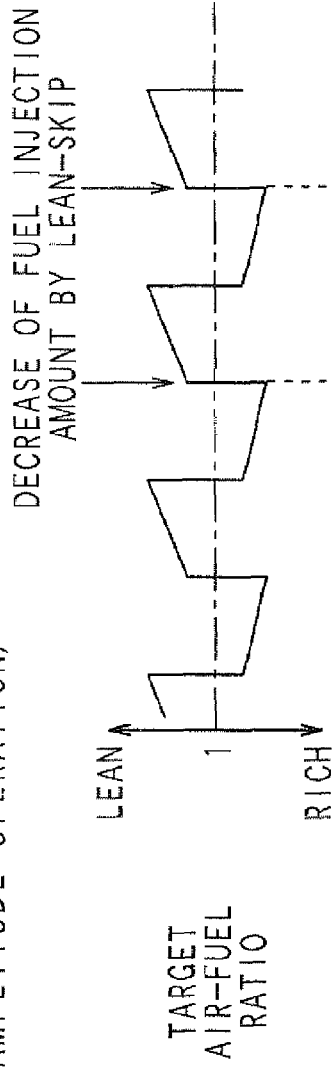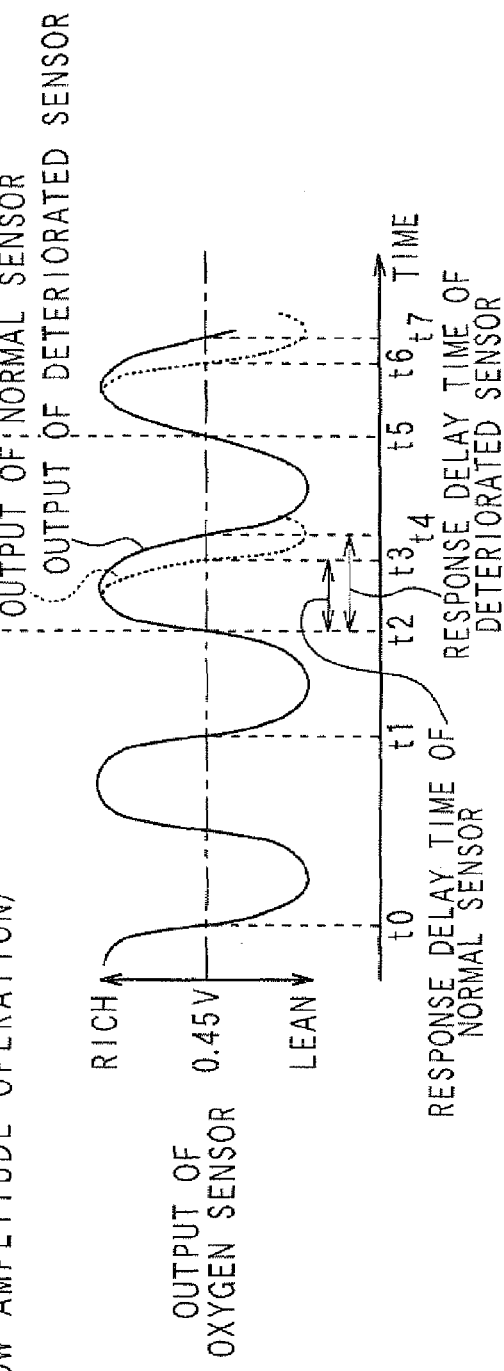
FIG. 9A
(LOW-AMPLITUDE OPERATION)
FIG. 9B
(LOW-AMPLITUDE OPERATION)

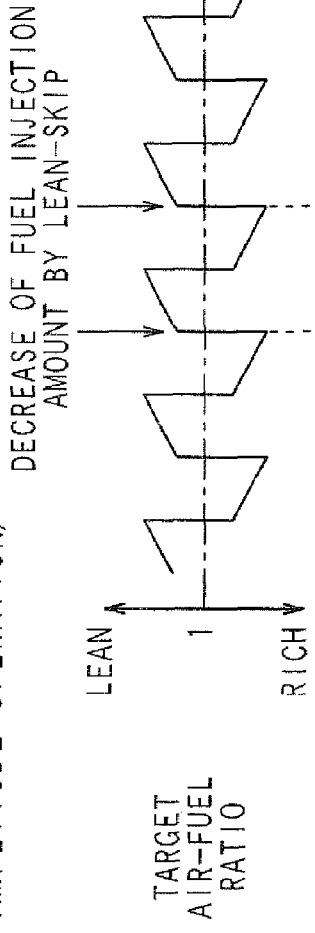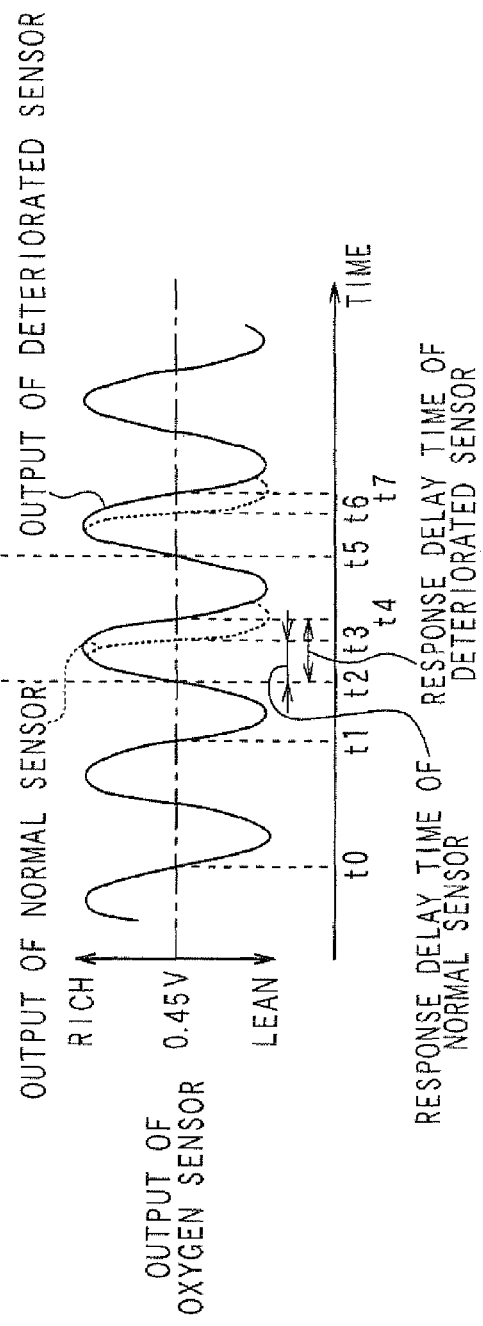
FIG. 9C (HIGH-AMPLITUDE OPERATION)
FIG. 9D (HIGH-AMPLITUDE OPERATION)

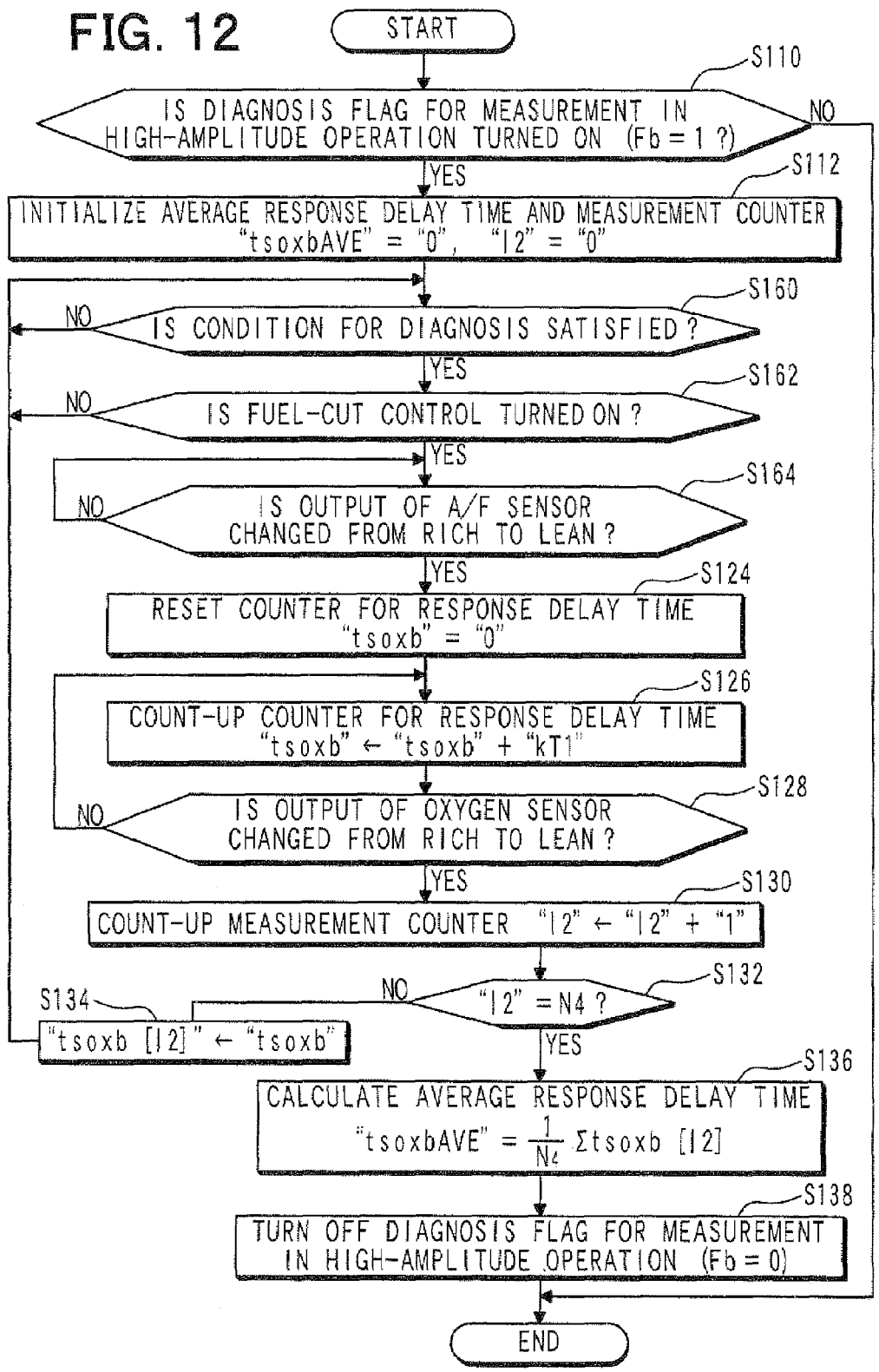

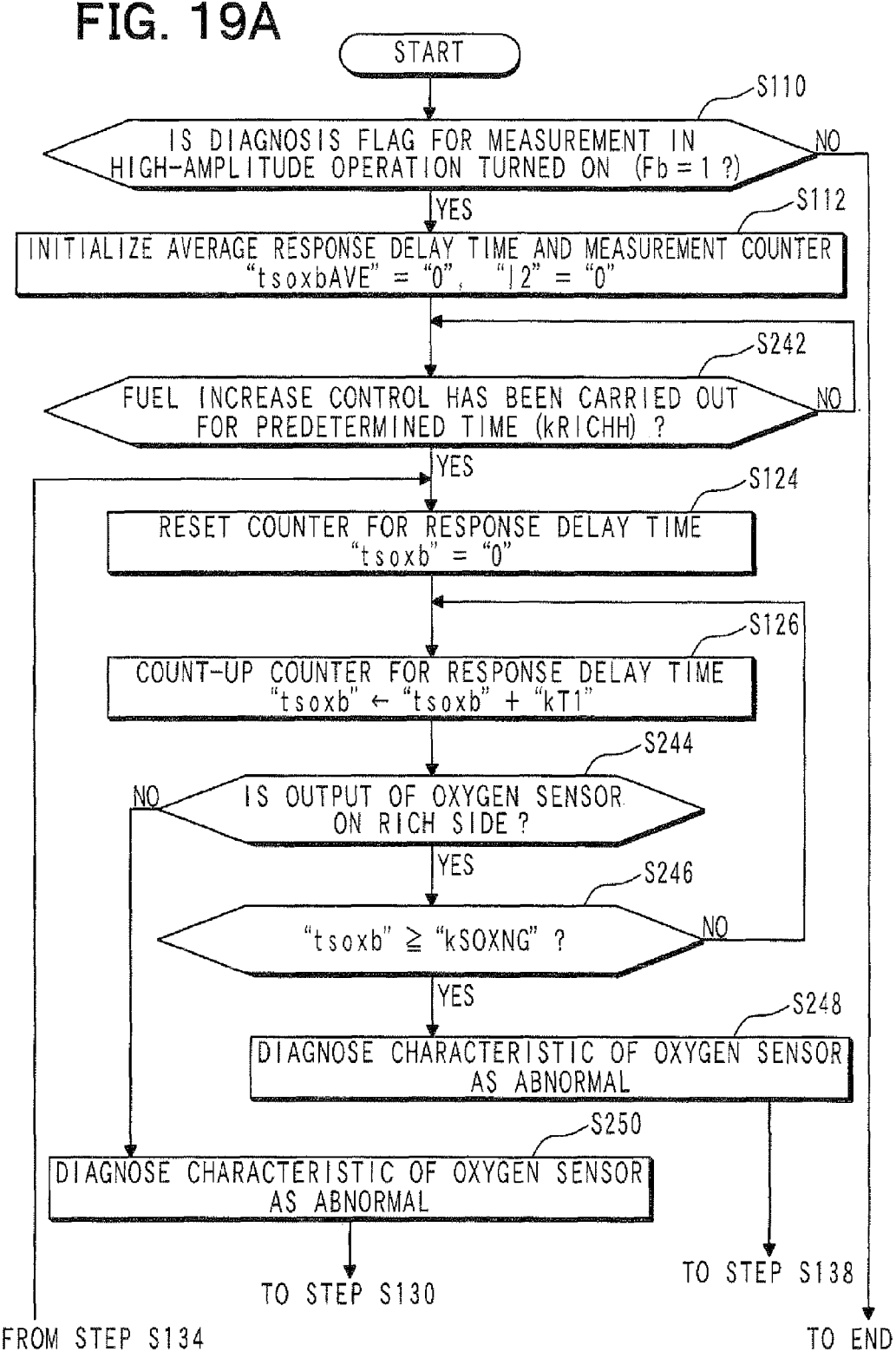

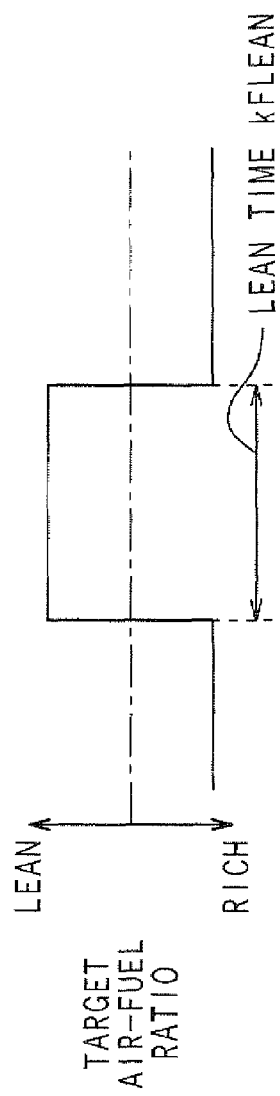
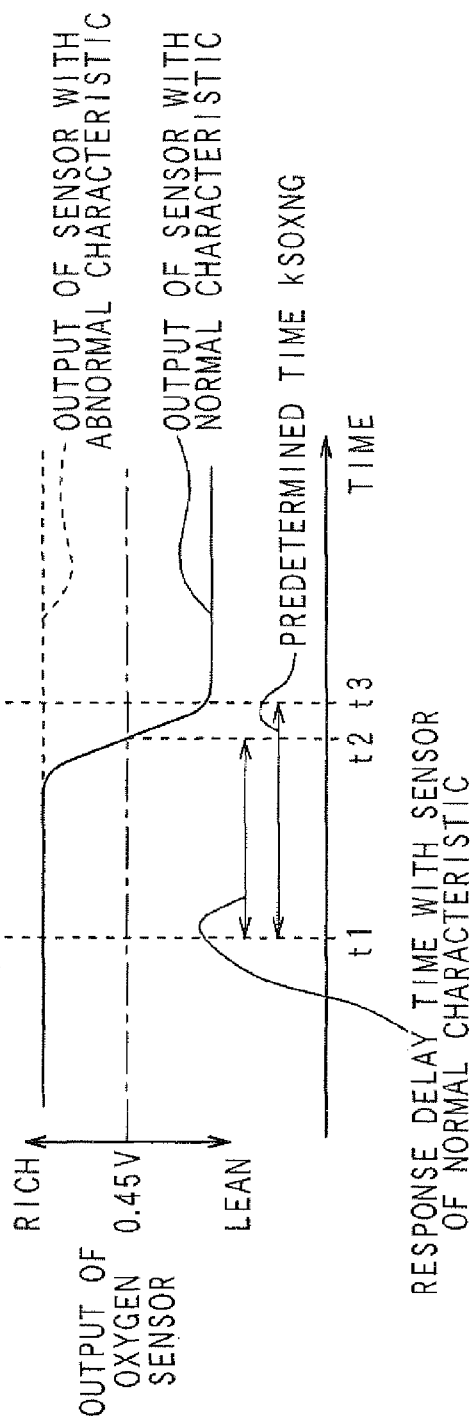
FIG. 20A (HIGH-AMPLITUDE OPERATION)
FIG. 20B (HIGH-AMPLITUDE OPERATION)

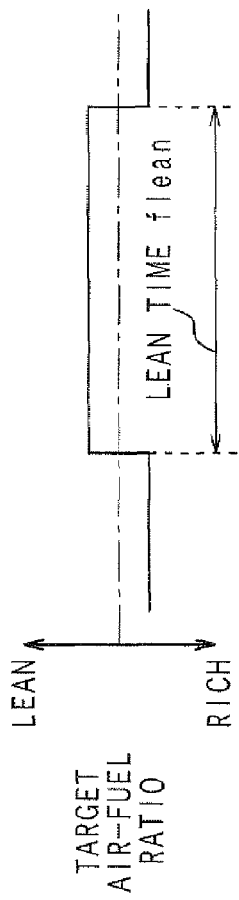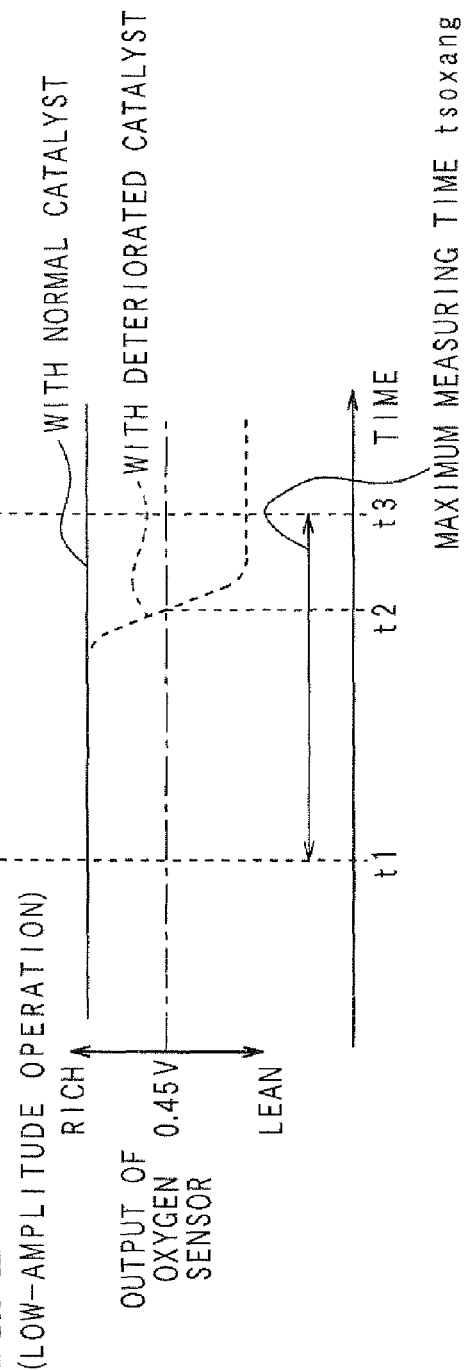

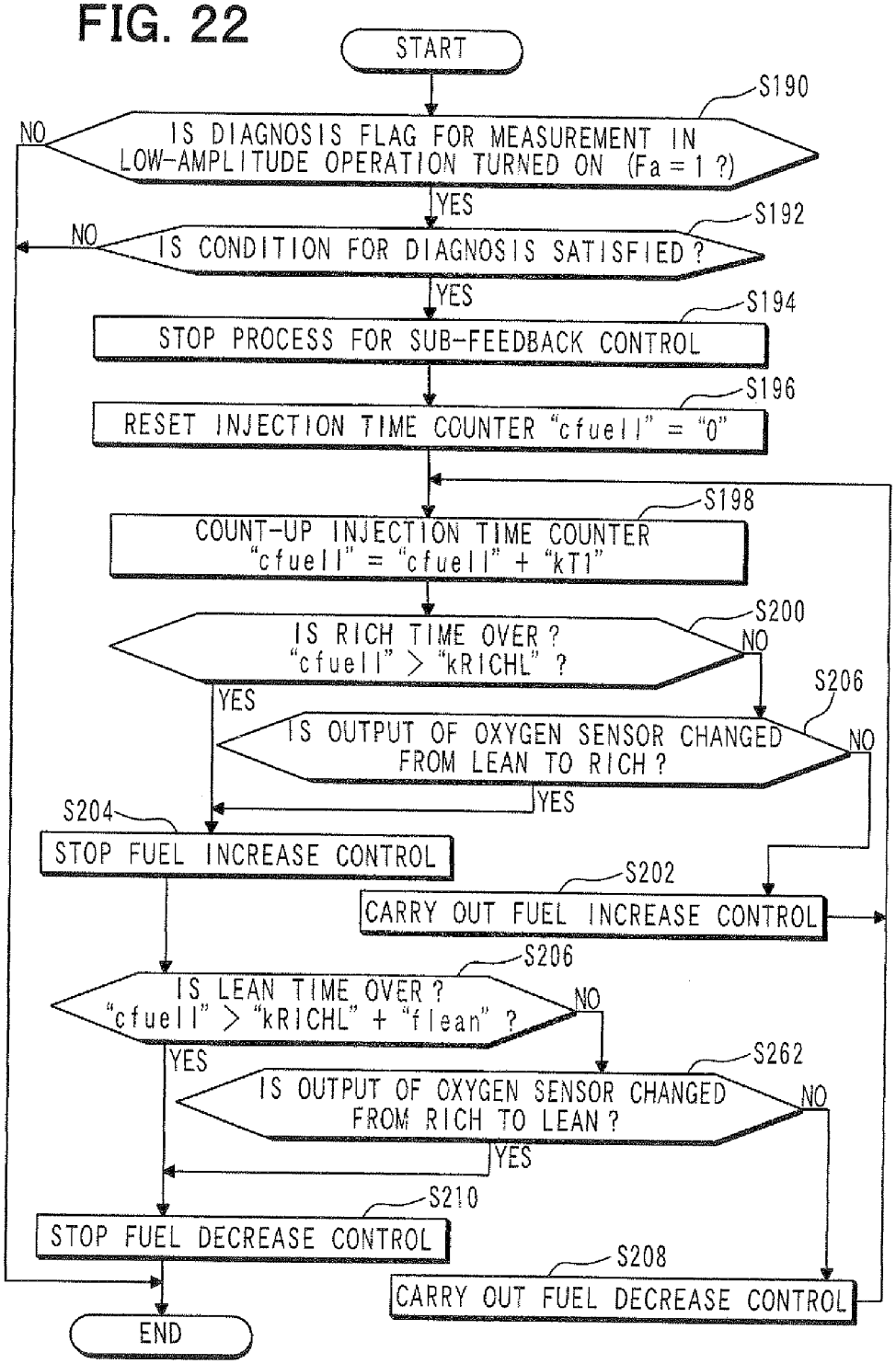

ered to as OBD, that is, On Board Diagnosis). When the three-way catalyst is diagnosed as being deteriorated, an engine checking lamp is turned on to inform a vehicle driver of an abnormal condition of the three-way catalyst.

DETERIORATION DIAGNOSING APPARATUS FOR EXHAUST GAS PURIFYING CATALYST

CROSS REFERENCE TO RELATED APPLICATION

This application is based on Japanese Patent Applications No. 2008-227521 filed on Sep. 4, 2008 and No. 2008-305954 filed on Dec. 1, 2008, the disclosures of which are incorporated herein by reference.

FIELD OF THE INVENTION

The present invention relates to a deterioration diagnosing apparatus for diagnosing deterioration of an exhaust gas purifying catalyst provided in an exhaust system of an internal combustion engine.

BACKGROUND OF THE INVENTION

A three-way catalyst is well known in the art as an exhaust gas purifying catalyst, which is provided in an exhaust pipe of a gasoline engine. The three-way catalyst purifies NOx, HC and CO contained in exhaust gas through oxidation-deoxidation reaction. And efficiency of the catalyst for purifying the exhaust gas will be increased up to a maximum value, when air-fuel ratio of mixture (that is, a ratio of intake-air amount versus injected amount of fuel) to be supplied to the gasoline engine is around a theoretical air-fuel ratio (that is, a stoichiometric air-fuel ratio). In addition, the three-way catalyst traps excessive oxygen contained in the mixture (exhaust gas) after combustion, when the air-fuel ratio of the mixture becomes larger than the theoretical air-fuel ratio (that is, when the mixture becomes leaner). On the other hand, the three-way catalyst discharges such trapped oxygen, when the air-fuel ratio of the mixture becomes smaller than the theoretical air-fuel ratio (that is, when the mixture becomes richer). Namely, when the air-fuel ratio becomes larger (i.e. the mixture becomes leaner), the excessive oxygen is trapped by the three-way catalyst, so that NOx in the exhaust gas is reduced (deoxidized). On the other hand, when the air-fuel ratio becomes smaller (i.e. the mixture becomes richer), the oxygen trapped in the three-way catalyst is discharged into the exhaust gas, so that HC and CO are oxidized. As a result, NOx, HC and CO contained in the exhaust gas can be purified, even when the air-fuel ratio of the mixture is changed to a richer side or a leaner side from the theoretical air-fuel ratio depending on operating condition of the gasoline engine.

When the three-way catalyst is deteriorated, an amount of the excessive oxygen in the exhaust gas which will be trapped into the three-way catalyst (also referred to as a maximum oxygen trapping amount) is decreased. Then, exhaust gas purifying performance is decreased and emission characteristic may be correspondingly decreased. Therefore, according to a prior art, for example, as disclosed in Japanese Patent Publication No. H04-081540, it is determined that the maximum oxygen trapping amount of the three-way catalyst is excessively decreased and the three-way catalyst is diagnosed as being deteriorated, when a response delay time becomes shorter than a predetermined threshold value. The response delay time is defined as a time period from a time point, at which oxygen concentration detected by an oxygen sensor (an $O_2$ sensor) provided at an upstream side of the three-way catalyst is changed from a rich side to a lean side (or from the lean side to the rich side), to another time point, at which oxygen concentration detected by another oxygen sensor provided at a downstream side of the three-way catalyst is changed from the rich side to the lean side (or from the lean side to the rich side). The above diagnosis is carried out by an in-vehicle malfunction diagnosing apparatus (which is also referred to as OBD, that is, On Board Diagnosis). When the three-way catalyst is diagnosed as being deteriorated, an engine checking lamp is turned on to inform a vehicle driver of an abnormal condition of the three-way catalyst.

When a response of the oxygen sensor provided at the downstream side of the three-way catalyst is deteriorated, or when a dead-time delay occurs, the above diagnosis may not be properly carried out. Namely, when the above situation occurs, the response delay time detected during the diagnosing process becomes longer. Then, the three-way catalyst may be, by mistake, diagnosed as being in order, even in spite that the maximum oxygen trapping amount of the three-way catalyst is excessively decreased as a result of the deterioration of the three-way catalyst. Therefore, the engine checking lamp is not turned on, the abnormal condition of the three-way catalyst is not informed to the driver, and thereby vehicle operation may be continued in a condition, in which emission characteristic is decreased. On the other hand, when the above predetermined threshold value is changed to a safer side by taking is the possible deterioration of the response and/or occurrence of the dead-time delay into consideration, in order that the emission characteristic may not be decreased, then the three-way catalyst may be misdiagnosed as being deteriorated even in the case that the three-way catalyst is in good order.

The above problem (misdiagnosis for the deterioration of the exhaust gas purifying catalyst) is commonly observed not only in the exhaust gas purifying catalyst having the three-way catalyst, but also in the other exhaust gas purifying catalyst, in which a gas sensor is provided at a downstream side of the exhaust gas purifying catalyst and deterioration of the catalyst is diagnosed based on output value of the gas sensor, when the response of the gas sensor is deteriorated or the dead-time delay occurs.

SUMMARY OF THE INVENTION

The present invention is made in view of the above problems. It is an object of the present invention to provide a deterioration diagnosing apparatus for an exhaust gas purifying catalyst, according to which a deterioration diagnosis for the exhaust gas purifying catalyst can be precisely carried out, even when the response of a gas sensor provided at a downstream side of the exhaust gas purifying catalyst is deteriorated or when dead-time delay occurs.

The present invention has one of or a combination of the following features:

(S1) According to a feature of the invention, a deterioration diagnosing apparatus for an exhaust gas purifying catalyst has a sensing device, which is provided in an exhaust system of an engine at a downstream side of the exhaust gas purifying catalyst and for detecting density of a specific component contained in exhaust gas. An electronic control unit receives an output from the sensing device and has a first diagnosing step for diagnosing deterioration of the exhaust gas purifying catalyst based on a difference between a first response delay time and a second response delay time.

The first response delay time is measured when the engine is operated in a first operational mode, in which a flow amount of the specific component contained in the exhaust gas at an upstream side of the exhaust gas purifying catalyst is changed by a first variational amount, and the first response delay time is measured as a first time period from a first time point at which the flow amount of the specific component is changed to a second time point at which the output of the sensing device is changed as a result of the change of the flow amount of the specific component.

The second response delay time is measured when the engine is operated in a second operational mode, in which a flow amount of the specific component contained in the exhaust gas at an upstream side of the exhaust gas purifying catalyst is changed by a second variational amount, and the second response delay time is measured as a second time period from another first time point at which the flow amount of the specific component is changed to another second time point at which the output of the sensing device is changed as a result of the change of the flow amount of the specific component. And the first and second variational amounts are set at different values from each other.

The response delay time, from the first time point at which the flow amount of the specific component is changed to the second time point at which the output of the sensing device is changed as a result of the change of the flow amount of the specific component, has a correlation with a maximum trapping amount of the specific component contained in the exhaust gas. Therefore, the response delay time is one of parameters having a correlation with deteriorated degree of the exhaust gas purifying catalyst. However, the response delay time also depends on a response delay time and a dead-time of the sensing device.

According to the present invention, the flow amount of the specific component is changed so that multiple fluid flows are formed, in which flow amounts of the multiple fluid flows are is different from each other. Then, the response delay times are measured in cases in which changing speeds of trapping amount for the specific component are different from each other, so that the deterioration diagnosis is carried out based on the response delay time. In each of the multiple response delay times, information related to differences between the changing speeds of the trapping amounts for the specific component is included. Therefore, it is possible to obtain the response delay time, from which the response delay time and the dead-time are removed, when the multiple response delay times are compared with each other. According to the present invention, it is possible to remove influence of the deterioration and the dead-time of the sensing device, when diagnosing the deterioration of the exhaust gas purifying catalyst.

(S2) According to another feature of the present invention, the specific component is oxygen and the exhaust gas purifying catalyst has functions for trapping and discharging oxygen.

In the exhaust gas purifying catalyst having functions for trapping and discharging the oxygen, a time period within which an amount of the oxygen to be trapped by the catalyst is saturated, or within which a predetermined amount of the trapped oxygen is discharged, depends on an amount of the oxygen contained in the exhaust gas at the upstream side of the exhaust gas purifying catalyst. According to the present invention, the phenomena that the flow amount of the oxygen contained in the exhaust gas is changed to different flow amounts in the engine operation is utilized, so that it becomes possible to obtain the response delay time, from which the response delay time and dead-time of the sensing device are removed. Accordingly, it is possible to remove the influence of the deterioration of the response and the dead-time delay of the sensing device, when carrying out the deterioration diagnosis.

The sensing device is preferably composed of an oxygen sensor.

(S3) According to a further feature of the present invention, the deterioration diagnosis is carried out based on multiple measured values for the response delay time.

Data spread occurs in the measurements of the response delay time depending on conditions of the exhaust gas purifying catalyst, operating condition of the engine, and so on. Then, there is concern that accuracy of the deterioration diagnosis for the exhaust gas purifying catalyst may be decreased. According to the further feature of the present invention, the response delay times are measured by several times for the respective flows of the oxygen, and diagnosis is carried out based on such response delay times so as to suppress the influence by the data spread to the deterioration diagnosis of the exhaust gas purifying catalyst.

The diagnosis is preferably carried out based on an average amount of the response delay times, which are measured by several times for the respective flows of the oxygen.

(S4) According to a still further feature of the invention, the diagnosing apparatus has a means for forcibly changing the flow amount of the oxygen contained in the exhaust gas at the upstream side of the exhaust gas purifying catalyst.

According to such a feature, the flow amount of the oxygen can be controlled at an appropriate value for carrying out the diagnosis. The diagnosis can be thereby properly carried out.

(S5) According to a still further feature of the invention, the diagnosing apparatus has a means for setting a ratio-change time period, based on which the flow amount of the oxygen is forcibly changed.

When the flow amount of the oxygen is continuously changed over a saturating time period or a discharging time period for the oxygen, the flow amount of the oxygen may be displaced from a proper amount for an exhaust gas purifying capability of the exhaust gas purifying catalyst. As a result, emission characteristic may be deteriorated. According to the above feature of the invention, the ratio-change time period for changing the flow amount of the oxygen is so set that the flow amount of the oxygen may not be excessively displaced from the proper amount. As a result, the deterioration of the emission characteristic during the deterioration diagnosis for the catalyst is suppressed.

(S6) According to a still further feature of the invention, the ratio-change time period is decided in accordance with the response delay time, which is obtained in an engine operation in which a variational amount of the oxygen is set at a maximum value, and the flow amount of the oxygen is changed, based on the ratio-change time period, in an engine operation in which a variational amount of the oxygen is set at a value other than the maximum value.

It is necessary to set the ratio-change time period in accordance with a saturating time period (a saturating time period of the oxygen) for saturating an excessive oxygen trapping amount of the catalyst or a discharging time period (a discharging time period of the oxygen) for fully discharging the trapped oxygen. When the variational amount for the flow amount of the oxygen becomes larger, the saturating time period of the oxygen or the discharging time period of the oxygen becomes shorter. Accordingly, the response delay time becomes correspondingly shorter. The ratio-change time period for the flow amount of the oxygen in the engine operation in which the variational amount for the flow amount of the oxygen is at a maximum value defines a minimum value for the ratio-change time period, which is used as a reference value when setting the ratio-change time period in the engine operation in which the variational amount for the flow amount of the oxygen is at a value other than the maximum value.

The engine operation in which the variational amount for the flow amount of the oxygen is at the maximum value corresponds to, for example, an engine operation in which a fuel-cut control (including a start of fuel-cut, an end of the fuel-cut) is carried out.

The ratio-change time period may be preferably set in accordance with the response delay time in the engine operation in which the variational amount for the flow amount of the oxygen is at the maximum value and a threshold value, with which the difference between the first and second response delay times is compared in order to carry out the diagnosis for the catalyst deterioration.

(S7) According to a still further feature of the invention, in the case that the flow amount of the oxygen is changed in the engine operation in which the variational amount for the flow amount of the oxygen is set at the value other than the maximum value, before the response delay time is measured in the engine operation in which the variational amount for the flow amount of the oxygen is set at the maximum value, the ratio-change time period is decided in accordance with an assumed response delay time for the engine operation in which the variational amount for the flow amount of the oxygen is set at the maximum value.

If the ratio-change time period is set only after the response delay time is measured in the engine operation in which the variational amount for the flow amount of the oxygen is set at the maximum value, a frequency for the measurement of the response delay time is decreased, and thereby a frequency for diagnosing the catalyst deterioration may be correspondingly decreased. However, according to the above feature of the invention, the ratio-change time period is decided in accordance with the assumed response delay time for the engine operation in which the variational amount for the flow amount of the oxygen is set at the maximum value. Accordingly, it is not necessary to wait until the response delay time is measured in the engine operation in which the variational amount for the flow amount of the oxygen is set at the maximum value, when the ratio-change time period is set. The frequency for measuring the response delay time can be increased. In addition, the ratio-change time period can be set as a shorter period as possible, because the ratio-change time period is decided in accordance with the assumed response delay time. As a result, the emission characteristic is suppressed from becoming worse and the frequency for diagnosing the catalyst deterioration can be increased.

(S8) According to a still further feature of the invention, the electronic control unit has a second diagnosing step for diagnosing the catalyst deterioration based on the change of the output of the sensing device. The diagnosing step is carried out by determining whether the output of the sensing device is changed within the ratio-change time period from the time point at which the flow amount of the oxygen is changed when the flow amount of the oxygen is changed in the engine operation in which the variational amount for the flow amount of the oxygen is set at the value other than the maximum value.

When the response delay time becomes longer than the ratio-change time period, the maximum oxygen trapping amount of the catalyst is larger. On the other hand, when the response delay time becomes shorter than the ratio-change time period, the maximum oxygen trapping amount of the catalyst is smaller. According to the above feature of the invention, the maximum oxygen trapping amount of the catalyst is determined based on the change of the output of the sensing device within the ratio-change time period. Accordingly, the diagnosis for the catalyst deterioration can be carried out as quickly as possible.

(S9) According to a still further feature of the invention, the exhaust gas purifying catalyst is diagnosed at the second diagnosing step that the catalyst is not in the deteriorated condition, when the output of the sensing device is not changed within the ratio-change time period from the time point at which the flow amount of the oxygen is changed.

The diagnosis for the catalyst deterioration is carried out based on the fact that when the response delay time becomes longer than the ratio-change time period, the maximum oxygen trapping amount of the catalyst is larger. Therefore, when the output of the sensing device is not changed within the ratio-change time period from the time point at which the flow amount of the oxygen is changed, the catalyst is determined as having a sufficient amount for the maximum oxygen trapping amount. As a result, it is possible to diagnose that the catalyst is not deteriorated, as quickly as possible.

(S10) According to a still further feature of the Invention, the electronic control unit has a learning function for learning the change of the maximum oxygen trapping amount of the exhaust gas purifying catalyst based on the response delay time, and the ratio-change time period is decided in accordance with the change of the maximum oxygen trapping amount.

When the maximum oxygen trapping amount is decreased as a result of the catalyst deterioration, the response delay time depending on the maximum oxygen trapping amount becomes shorter. According to the above feature of the invention, however, the ratio-change time period is decided in accordance with the change of the maximum oxygen trapping amount, which is learned by the learning function. It is possible to make a period, during which the flow amount of the oxygen is displaced from an amount for keeping the exhaust gas purifying performance at a proper value, as shorter as possible. It is, therefore, possible to suppress the emission characteristic from becoming worse.

(S11) According to a still further feature of the invention, when the output of the sensing device is changed to the rich or lean side within the ratio-change time period as a result of the change of the flow amount of the oxygen, the air-fuel ratio of the mixture to be supplied into the combustion chamber of the engine is forcibly changed to the lean or rich side, which is the opposite side to the above first mentioned side.

When the output of the sensing device is changed, it is supposed that the maximum oxygen trapping amount of the catalyst is saturated or the trapped oxygen is fully discharged. Therefore, in the case the output of the sensing device is changed within the ratio-change time period, the flow amount of the oxygen for the ratio-change time period may be displaced from a value for properly keeping the exhaust gas purifying performance. Therefore, there is concern that the emission characteristic may become worse. According to the above feature of the invention, however, the flow amount of the oxygen can be controlled at a proper value, even when the output of the sensing device is changed within the ratio-change time period. Accordingly, the emission characteristic can be suppressed from becoming worse during the process of diagnosing the catalyst deterioration.

(S12) According to a still further feature of the invention, the diagnosis is carried out based on the difference between the first and second response delay times, when the exhaust gas amount is within the predetermined range.

When the exhaust gas amount is changed depending on the operational condition of the engine, flow speed of the exhaust gas flowing in the exhaust system is changed. Therefore, a time period, from a time point at which the flow amount of the oxygen contained in the exhaust gas at the upstream side of the catalyst is changed to a time point at which the influence due to the change appears, is changed. In such a situation, it is difficult to precisely grasp the response delay time depending on the maximum oxygen trapping amount of the catalyst. Therefore, there is concern that the accuracy for the diagnosis of the catalyst deterioration may be decreased. According to the above feature of the invention, however, the diagnosis is carried out based on the difference between the first and second response delay times, when the exhaust gas amount is within the predetermined range, so as to remove the influence of the time period in which the influence of the change of the flow amount of the oxygen may appear. Accordingly, it becomes possible to precisely grasp the response delay time depending on the maximum oxygen trapping amount of the catalyst, and thereby it becomes possible to precisely carry out the diagnosis for the catalyst deterioration.

(S13) According to a further feature of the invention, the response delay time is measured as a time period from a first time point at which an injection amount of fuel injected by a fuel injection valve is changed to a second time point at which the output of the sensing device is changed.

The flow amount of the oxygen contained in the exhaust gas can be changed by adjusting fuel amount contained in the mixture supplied into the combustion chamber of the engine. According to the above feature of the invention, the starting point for the response delay time is set at the time at which the fuel injection amount is changed, so that a changing point can be easily set.

(S14) According to a further feature of the invention, the deterioration diagnosing apparatus has another sensing device for detecting an air-fuel ratio of the mixture at the upstream side of the catalyst. And the response delay time is measured as a time period from a first time point at which an output of the other sensing device (upstream side) is changed to a second time point at which the output of the sensing device (downstream side) is changed.

There is a delay time from a time point at which the flow amount of the oxygen contained in the exhaust gas at the upstream side of the catalyst is changed to a time point at which an influence of such change appears at the catalyst. According to the above feature of the invention, the response delay time is grasped based on the other (second) sensing device provided at the upstream side of the catalyst. Therefore, the influence caused by the above delay time can be removed from the response delay time or any value corresponding to the response delay time, which is used for the diagnosis of the catalyst deterioration.

(S15) According to a further feature of the invention, the change of the flow amount of the oxygen is carried out by a fuel-cut control.

When the flow amount of the oxygen to be supplied to the engine is excessively small, the response delay time becomes longer due to the functions of the catalyst for trapping the oxygen or discharging the trapped oxygen. And thereby, there is concern that variation of the response delay time would become larger. According to the above feature of the invention, however, the oxygen amount can be largely changed by use of the fuel-cut control (at starting and ending the fuel-cut), so that the time for saturating the excessive oxygen trapping amount of the catalyst or fully discharging the trapped oxygen can be made shorter. As a result, the response delay time can be made shorter, to thereby decrease the variation of the response delay time.

(S16) According to a further feature of the invention, the response delay time is grasped based on a cycle for the output change of the sensing device, which is caused by the change of the air-fuel ratio from the lean to the rich side or vice versa.

The cycle of the above change includes a response delay time from a time point at which an air-fuel ratio of the mixture is changed from the lean to the rich side to a time point at which the output of the sensing device is changed and a response delay time from a time point at which the air-fuel ratio of the mixture is changed from the rich to the lean side to the time point at which the output of the sensing device is changed. According to the above feature of the invention, flexibility for measuring period for the response delay time is improved.

(S17) According to a further feature of the invention, the diagnosis for the catalyst deterioration is carried out after the flow amount of the oxygen is changed by several times so that the air-fuel ratio of the mixture is alternately changed to the rich and lean side.

The response delay time, from the time point at which the flow amount of the oxygen is changed to the time point at which the output of the sensing device is changed for the first time, includes information relating to differences of changing speed of the oxygen trapping amount of the catalyst. According to the above feature of the invention, the response delay time can be measured as quickly as possible, since the flow amount of the oxygen is changed.

(S18) According to a further feature of the invention, the determination whether the diagnosis for the catalyst deterioration should be prohibited or not is carried out based on the change of the sensing device within a predetermined period from the time point at which the flow amount of the oxygen is changed.

According to the invention, the diagnosis for the catalyst deterioration can be carried out even when the response delay time and/or dead-time of the sensing device is elongated. However, when they are excessively elongated, there is concern that the emission characteristic may become worse. Namely, when the response delay time and/or dead-time of the sensing device is excessively elongated, the response delay time for the catalyst may be excessively elongated. Then, in the case the flow amount of the oxygen may be changed beyond a time period for saturating or discharging the oxygen of the catalyst, a time period during which the flow amount of the oxygen is displaced from a value for properly keeping the exhaust gas purifying performance may be excessively elongated. Therefore, there is concern that the emission characteristic may become worse.

According to the above feature of the invention, however, the determination whether the response delay time and/or dead-time of the sensing device is excessively elongated or not is carried out based on the change of the output of the sensing device within the predetermined period from the time point at which the flow amount of the oxygen is changed. And then, it is determined whether the diagnosis for the catalyst deterioration should be prohibited or not. As a result, it is possible to avoid a case in which the emission characteristic may become worse during the process for diagnosing the catalyst deterioration.

BRIEF DESCRIPTION OF THE DRAWINGS

The above and other objects, features and advantages of the present invention will become more apparent from the following detailed description made with reference to the accompanying drawings. In the drawings:

FIGS. 9A to 9D are timing charts showing measurements of the response delay time for the process of diagnosing catalyst deterioration;

FIG. 12 is a flow-chart showing a process for measuring response delay time for the high-amplitude operation;

FIGS. 19A and 19B are flow-charts showing a process for measuring response delay time for the high-amplitude operation and a process for diagnosing characteristic of an oxygen sensor;

FIGS. 20A to 20D are timing charts showing the process for diagnosing the catalyst deterioration;

FIG. 22 is a flow-chart showing a process for setting a target air-fuel ratio for the low-amplitude operation according to a sixth embodiment.

DETAILED DESCRIPTION OF THE PREFERRED EMBODIMENTS

The present invention will be explained with reference to the drawings for respective embodiments, in which a deterioration diagnosing apparatus for a catalyst according to the present invention is applied to a gasoline engine.

Figure 1:
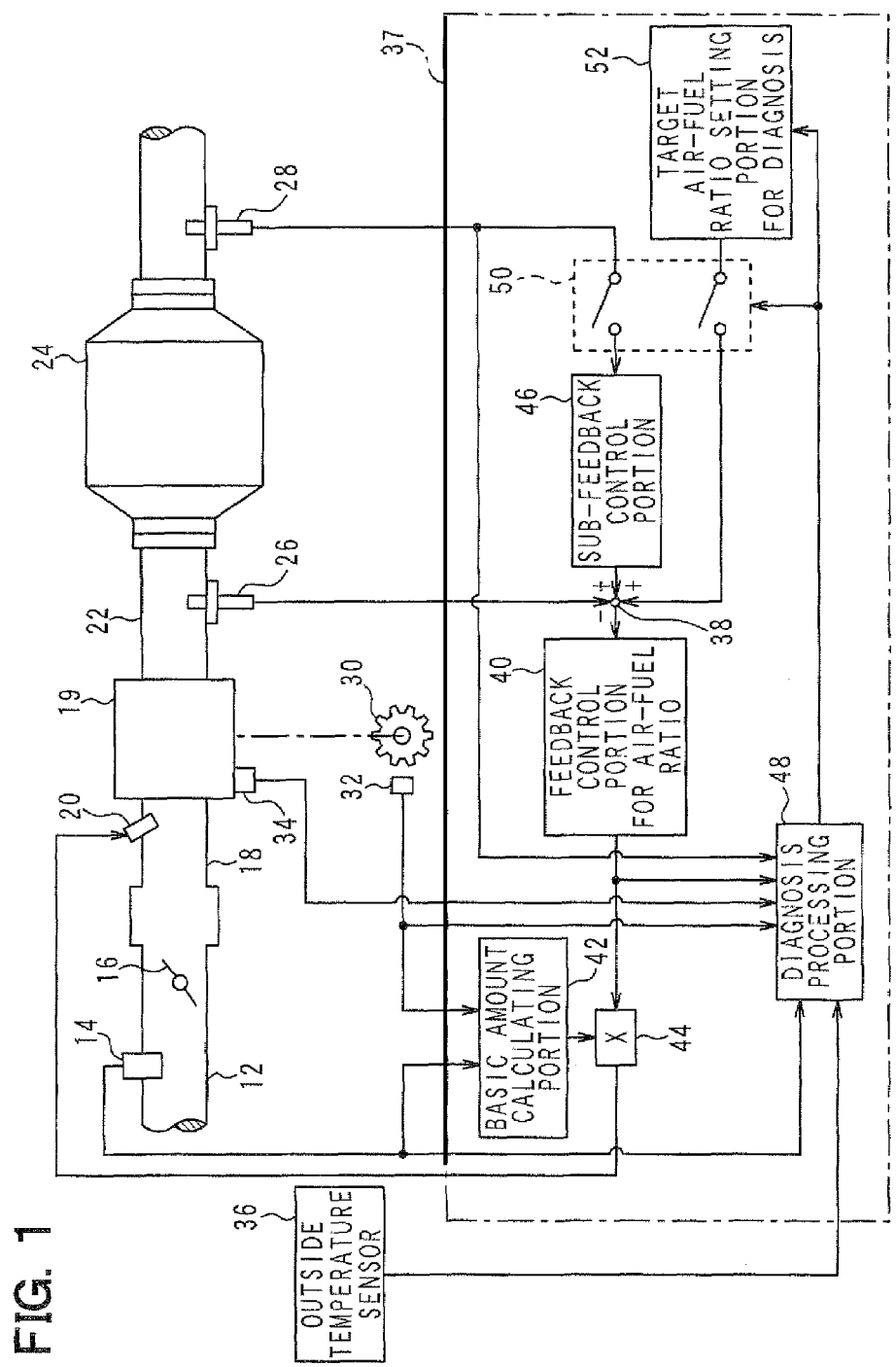
FIG. 1 is a schematic view showing a structure of an engine control system according to a first embodiment of the present invention.

FIG. 1 shows a structure of an engine control system according to a first embodiment of the present invention. As shown in FIG. 1, an air-flow meter 14 is provided at an upstream portion of an intake-air pipe 12 for detecting intake-air amount. A throttle valve 16 of an electronically controlled type is provided at a downstream side of the air-flow meter 14, wherein an opening degree of the throttle valve 16 is controlled by a throttle actuator (such as a DC motor). An intake manifold 18 is connected at a downstream side of the throttle valve 16 for introducing the intake-air into respective cylinders (combustion chambers) of an engine 19. An electromagnetic fuel injector (fuel injection valve) 20 is provided at the intake manifold 18 at a position adjacent to an intake port of the engine 19, for injecting fuel into the intake manifold. The injected fuel is introduced into the combustion chamber together with the intake-air in accordance with an opening operation of an intake valve (not shown) of the engine 19, so that mixture of the fuel and the intake-air is combusted in the combustion chamber.

Mixture combusted in the combustion chamber of the engine 19 is discharged into an exhaust pipe 22 as exhaust gas in accordance with an opening operation of an exhaust valve (not shown) of the engine 19. A three-way catalyst 24 is provided in the exhaust pipe 22, which is a part of an exhaust gas after-treatment system for purifying NOx, HC and CO contained in the exhaust gas. An A/F sensor 26 is provided in the exhaust pipe 22 at an upstream side of the three-way catalyst 24, wherein the A/F sensor 26 outputs an electrical signal in proportion to oxygen concentration/density and/or unburned components (CO, HC, H2, etc.) contained in the exhaust gas. More exactly, the A/F sensor 26 is a so-called total range air-fuel ratio sensor, which is capable of detecting the air-fuel ratio for a wide range. An oxygen sensor 28 (also referred to as O2 sensor) is provided in the exhaust pipe 22 at a downstream side of the three-way catalyst 24, wherein the oxygen sensor 28 changes its output signal in a stepwise manner (a binary manner) in accordance with the oxygen density of the exhaust gas. The oxygen sensor 28 detects based on the oxygen density of the exhaust gas whether the air-fuel ratio is smaller (rich) or larger (lean) than the theoretical air-fuel ratio. More specifically, the air-fuel mixture is rich ($\lambda<1$) when the output signal of the oxygen sensor 28 is larger than a predetermined value (for example, 0.45 V), and the air-fuel mixture is lean ($\lambda>1$) when the output signal of the oxygen sensor 28 is smaller than the predetermined value. "$\lambda$" is an excess air ratio. The air-fuel mixture is rich in case of $\lambda<1$.

A crank angle sensor 32 is provided at a position adjacent to a crank shaft 30 of the engine 19 for detecting rotational speed of the crank shaft 30. A water temperature sensor 34 is provided for detecting temperature of engine cooling water for the engine 19. Signals from the crank angle sensor 32, the water temperature sensor 34, the air-flow meter 14, the A/F sensor 26, the oxygen sensor 28, an outside temperature sensor 36 for detecting ambient temperature, are inputted to an electronic control unit 37 (also referred to as ECU).

According to the control system of the present invention, the air-fuel ratio of the mixture is calculated in accordance with a process carried out by the ECU 37 based on the output value of the A/F sensor 26. And a feedback control for fuel injection amount of the fuel injection valve 20 is carried out so that the above calculated air-fuel ratio will become closer to (and finally equal to) a target value (a target air-fuel ratio). FIG. 1 shows a block diagram of such portions of processes performed by the ECU 37 for carrying out the feedback control of the air-fuel ratio.

A deviation calculating portion 38 for the air-fuel ratio calculates a deviation between an air-fuel ratio of the mixture calculated based on the output value of the A/F sensor 26 and an air-fuel ratio which is separately set (a target air-fuel ratio). A feedback control portion 40 for the air-fuel ratio calculates a feedback correction coefficient based on the above calculated deviation. A basic amount calculating portion 40 calculates a basic fuel injection amount based on the intake-air amount, which is calculated from output value of the air-flow meter 14, and an engine rotational speed, which is calculated from output value of the crank angle sensor 32. A final amount calculating portion 44 calculates a final fuel injection amount by multiplying the basic fuel injection amount by the feedback correction coefficient. As a result, the fuel corresponding to the final fuel injection amount is injected from the fuel injection valve 20.

The above mentioned target air-fuel ratio is calculated by a sub-feedback control portion 46, which performs a control so as to bring the air-fuel ratio of the mixture calculated based on the output value of the oxygen sensor 28 to a value close to or equal to the target value (e.g. the theoretical air-fuel ratio). More specifically, the sub-feedback control portion 46 determines whether the air-fuel ratio is rich or lean based on the output value of the oxygen sensor 28, and properly sets the target air-fuel ratio based on the above determination (rich or lean).

Figure 2A:
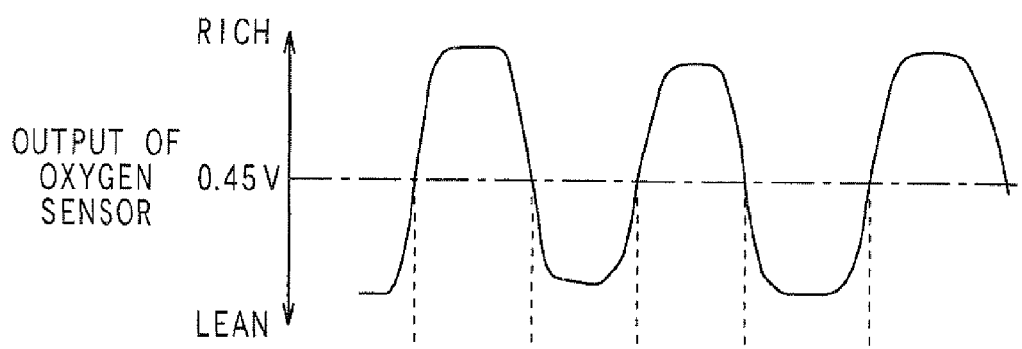
FIGS. 2A and 2B are timing charts showing an outline for setting a target air-fuel ratio in a feedback control for the air-fuel ratio.
Figure 2B:
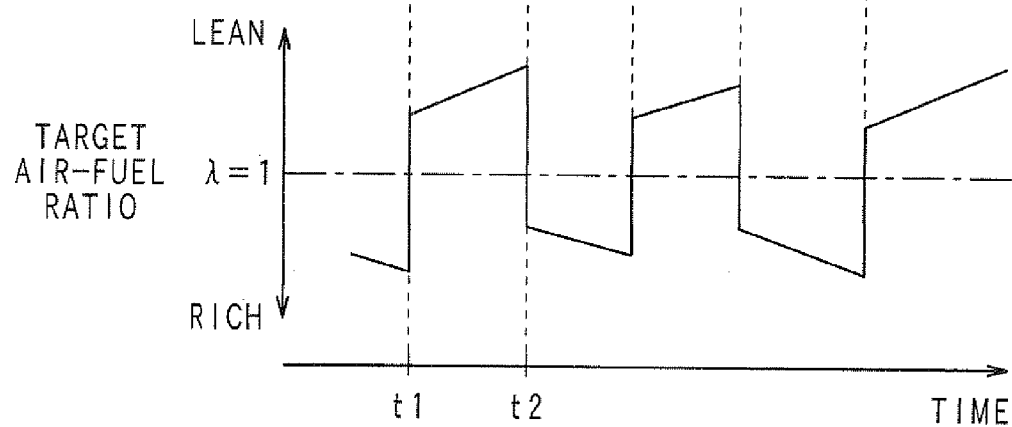

FIGS. 2A and 2B show an outline for setting the target air-fuel ratio by the sub-feedback control portion 46. FIG. 2A shows the output value of the oxygen sensor 28, while FIG. 2B shows the target air-fuel ratio calculated by the sub-feedback control portion 46. As shown in FIG. 2A, the output of the oxygen sensor 28 is periodically changed from a rich side to a lean side, or from the lean side to the rich side. A skip process and an integration process for the target air-fuel ratio are carried out in accordance with the above reversals of the output values. For example, at a time "t1", at which the output value of the oxygen sensor 28 is changed from the lean side to the rich side, the target air-fuel ratio is skipped to the lean side, as shown in FIG. 2B, and thereafter the integration process is carried out in a direction towards a leaner value. And as shown in FIG. 2A, at a time "t2", at which the output value of the oxygen sensor 28 is changed from the rich side to the lean side, the target air-fuel ratio is skipped to the rich side, as shown in FIG. 2B, and thereafter the integration process is likewise carried out in a direction towards a richer value. As above, the air-fuel ratio of the mixture to be supplied to the engine 19 is controlled to become closer to the target air-fuel ratio, and thereby emission characteristic is improved.

When the three-way catalyst 24 is deteriorated, the maximum oxygen trapping amount of the three-way catalyst 24 is decreased. As a result, the exhaust gas purifying performance is decreased and the emission characteristic is decreased. The maximum oxygen trapping amount is related to response delay time (of the system). The response delay time (of the system) is defined as a time period from a time point, at which the target air-fuel ratio is changed from a rich-side value to a lean-side value (or from the lean-side value to the rich-side value), to another time point, at which the output value of the oxygen sensor 28 is correspondingly reversed. Accordingly, the response delay time (of the system) is one of parameters having a relation to deterioration of the three-way catalyst 24. However, the response delay time (of the system) may include not only a delay time depending on the maximum oxygen trapping amount of the catalyst but also response delay time and/or a dead-time of the oxygen sensor 28. The response delay time and/or the dead-time of the oxygen sensor 28 may result from plugging in a filter formed at a sensor cover of the oxygen sensor 28. Accordingly, it is difficult to precisely calculate the delay time depending on the maximum oxygen trapping amount based on the response delay time of the system. Therefore, it is difficult to exactly diagnose the deterioration of the catalyst.

According to the present embodiment, the diagnosis for the deterioration of the catalyst is carried out by removing influence of the response delay time and/or the dead-time of the oxygen sensor 28. Namely, the air-fuel ratio is so controlled that multiple flows are formed, in which amounts of oxygen to the three-way catalyst 24 are controlled to be different from each other. And the diagnosis is carried out based on multiple response delay times (of the system) for the respective flows, wherein the response delay time is measured from a time point at which the air-fuel ratio is changed to another time point at which the output value of the oxygen sensor 28 is reversed. More in detail, two variations for the air-fuel ratio are set when changing the air-fuel ratio from a predetermined value to a value on a lean side, and the diagnosis is carried out based on a difference between the response delay times of the output values from the oxygen sensor 28 in the respective cases. A principle for the deterioration diagnosis according to the present embodiment will be explained with reference to FIGS. 3A to 3D.

Figure 3A:
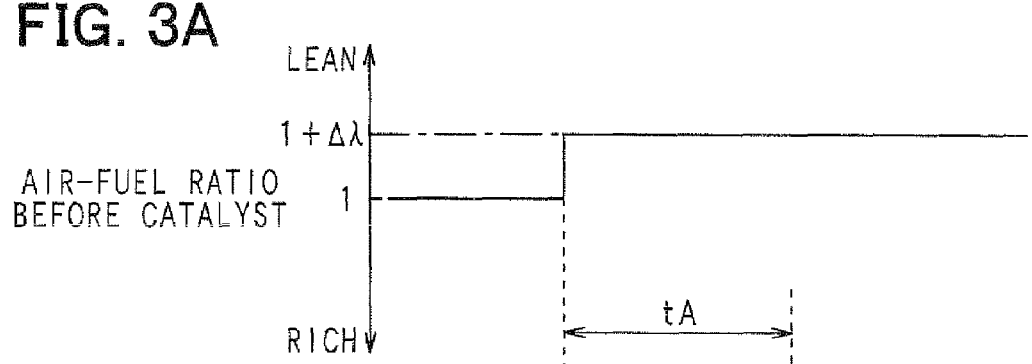
FIGS. 3A to 3D are timing charts showing different response delay times depending on maximum oxygen trapping amount of a catalyst.
Figure 3B:
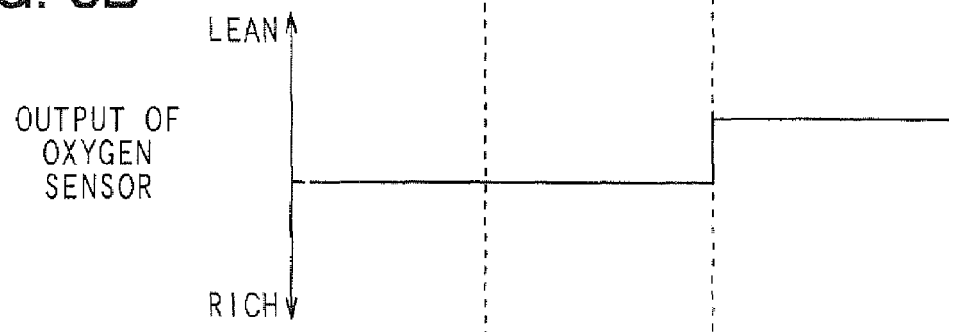

FIGS. 3A and 3B show transitions of the air-fuel ratio of the mixture before the catalyst and the output of the oxygen sensor for a first case, in which the air-fuel ratio is changed by a predetermined amount ($\Delta\lambda$) towards the lean side. Namely, at a time point "t1", the air-fuel ratio is changed from a value "1" to another value "1+$\Delta\lambda$". Then, at a time point "t3", the output of the oxygen sensor is reversed from the rich side to the lean side.

Figure 3C:
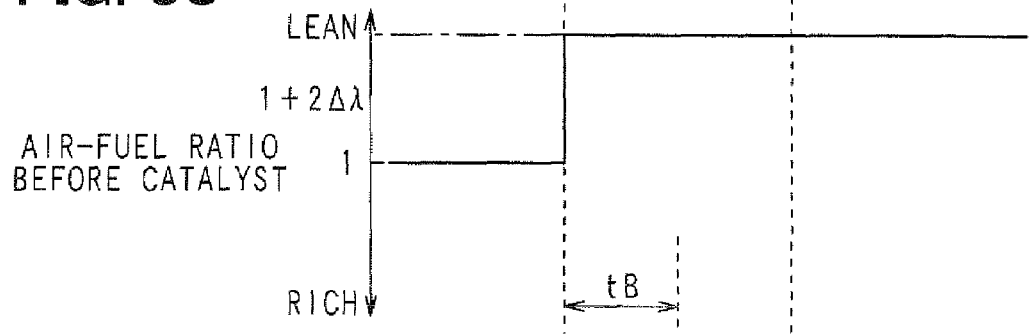
Figure 3D:
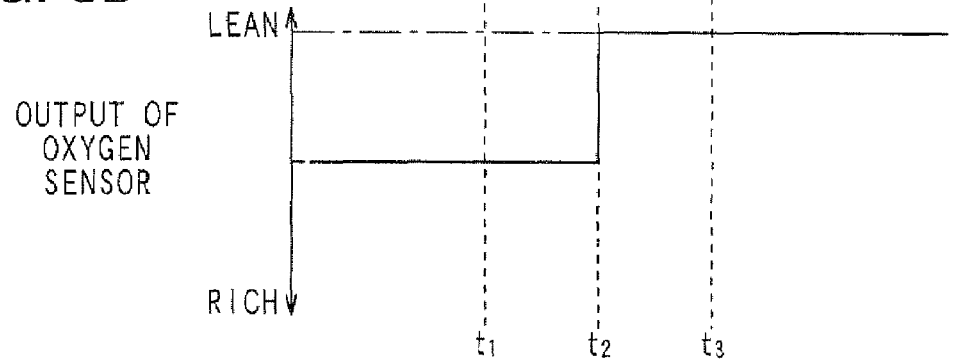

FIGS. 3C and 3D likewise show transitions of the air-fuel ratio and the output of the oxygen sensor for a second case, in which the air-fuel ratio is changed by another predetermined amount ($2\Delta\lambda$) towards the lean side. The predetermined amount ($2\Delta\lambda$) of the second case for changing the air-fuel ratio towards the lean side is larger than the predetermined amount ($\Delta\lambda$) of the first case. As a result, at the time point "t1", the air-fuel ratio is changed from the value "1" to another value "1+$2\Delta\lambda$". Then, at a time point "t2", the output of the oxygen sensor is reversed from the rich side to the lean side.

As shown in FIGS. 3A and 3B, a response delay time "tA" for the first case is defined as a time period from the time point "t1", at which the air-fuel ratio (in FIG. 3A, the air-fuel ratio before the catalyst) for the engine 19 is changed from an initial value (in this case, $\lambda$=1) to the lean-side value ($\lambda$+$\Delta\lambda$; for example, $\Delta\lambda$=0.03), to the time point "t3", at which the output of the oxygen sensor 28 is reversed from the rich side to the lean side. And the response delay time "tA" is expressed in the following formula (1)

$$tA = S/(ga \times \Delta\lambda) + \Delta T + \Delta r \quad (1)$$

In the above formula (1), "ga" is intake-air amount; "S" is the maximum oxygen trapping amount of the three-way catalyst 24; "$\Delta T$" is a delay time from a time point at which the air-fuel ratio before the catalyst is changed to another time point at which an influence appears at the three-way catalyst 24; and "$\Delta r$" is a delay time which is caused by the response delay time and/or the dead-time of the oxygen sensor 28.

In a similar manner to the above first case, as shown in FIGS. 3C and 3D, a response delay time "tB" for the second case is defined as a time period from the time point "t1", at which the air-fuel ratio before the catalyst is changed from the initial value to the lean-side value ($\lambda$+$2\Delta\lambda$), to the time point "t2", at which the output of the oxygen sensor 28 is reversed to the lean side. And the response delay time "tB" is expressed in the following formula (2)

$$tB = S/(ga \times 2 \times \Delta\lambda) + \Delta T + \Delta r \quad (2)$$

As understood from the above formulas (1) and (2), each of the response delay times "tA" and "tB" includes the delay time "ΔT" and the delay time "Δr". However, a time difference "Δt" obtained through the difference of those formulas is expressed in the following formula (3), in which the above delay times "ΔT" and "Δr" are removed:

$$\Delta t = tA - tB = S/(ga \times 2 \times \Delta\lambda) \quad (3)$$

Accordingly, the time difference "Δt" is used as an important parameter for precisely quantifying the maximum oxygen trapping amount "S". Therefore, when the time difference "Δt" is a smaller amount, the maximum oxygen trapping amount "S" can be determined as being a smaller amount. As above, the deterioration of the three-way catalyst 24 can be precisely determined.

As shown in FIG. 1, the engine control system according to the present embodiment has a diagnosis processing portion 48 in order to carry out the diagnosis for the deterioration of the three-way catalyst 24 based on the above time difference "Δt". When a predetermined condition for carrying out the diagnosis is satisfied, the diagnosis processing portion 48 drives a selecting portion 50 for selecting the target air-fuel ratio, so that the air-fuel ratios for a deterioration diagnosis process set by a target air-fuel ratio setting portion 52 are forcibly selected at the selecting portion 50. The target air-fuel ratios for the deterioration diagnosis process are defined as such air-fuel ratios, each of which has a variation by which the air-fuel ratio is alternately changed to the rich side and to the lean side, and each of which is different from the other. The diagnosis processing portion 48 carries out the deterioration diagnosis based on the difference between the response delay times for the cases, in which the air-fuel ratios are changed by those different variations.

FIGS. 4 to 8 show processes related to the deterioration diagnosis for the catalyst according to the present embodiment. The processes are repeatedly carried out by the ECU 37, for example, at a predetermined cycle.

Figure 4:
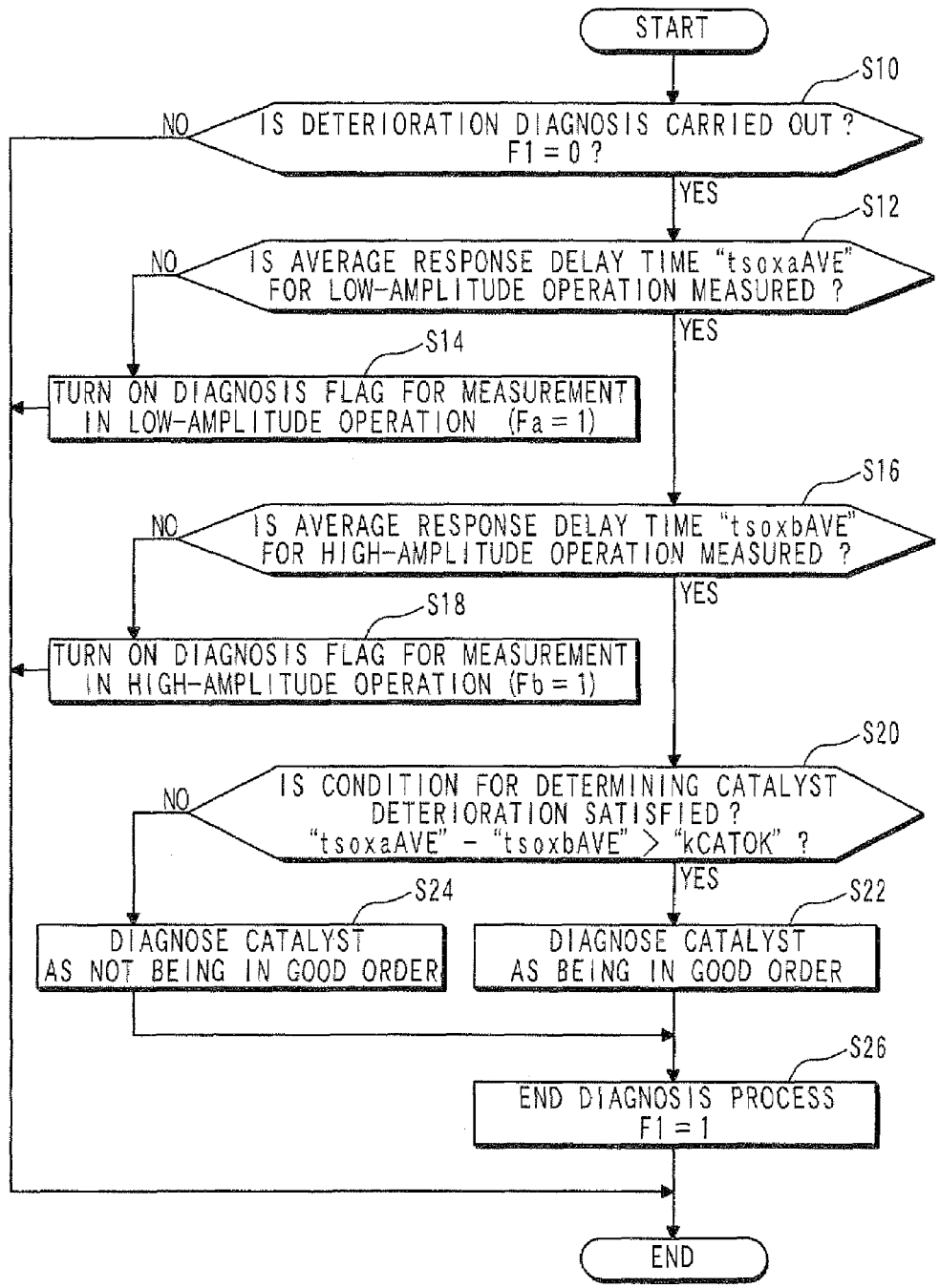
FIG. 4 is a flow-chart showing a deterioration diagnosing process for the catalyst according to the first embodiment.

FIG. 4 shows the process for the deterioration diagnosis for the catalyst.

At first, at a step S10, the ECU 37 determines whether the deterioration diagnosis has been carried out or not. More specifically, when a record flag "F1" for the diagnosis is "0", the ECU 37 determines that the deterioration diagnosis has not been carried out. The process goes to a step S12, when the ECU 37 determines at the step S10 that the deterioration diagnosis has not been carried out.

At the step S12, the ECU 37 determines whether an average response delay time "tsoxaAVE" for a low-amplitude operation has been measured or not. The low-amplitude operation is defined as such an operation, in which the air-fuel ratio is alternately changed to the rich and lean sides, wherein a smaller value (Δλ) is selected as the variation. The average response delay time "tsoxaAVE" is an average amount of a plurality of response delay times. This is because data spread, which may be generated in each measurement for the response delay time, is taken into consideration. The accuracy of the deterioration diagnosis for the catalyst may be largely decreased due to the data spread in each measurement of the response delay time, which may be generated depending on a condition of the three-way catalyst 24 and an operating condition of the engine 19. Therefore, the average value is used here in order to avoid less accurate diagnosis.

When the average response delay time "tsoxaAVE" for the low-amplitude operation has not been measured, the process goes to a step S14, at which a diagnosis flag "Fa" for measurement in the low-amplitude operation is turned ON (Fa=1). As a result, the response delay times are measured in the low-amplitude operation in accordance with processes of FIGS. 5 and 6 (explained below).

In case of YES at the step S12, the process goes to a step S16, at which the ECU 37 determines whether an average response delay time "tsoxbAVE" for a high-amplitude operation has been measured or not. The high-amplitude operation is likewise defined as such an operation, in which the air-fuel ratio is alternately changed to the rich and lean sides, wherein a larger value (2Δλ) is selected as the variation. The average response delay time "tsoxbAVE" for the high-amplitude operation is an average amount of a plurality of response delay times, because of the same reason for the average response delay time "tsoxaAVE" for the low-amplitude operation.

When the average response delay time 'tsoxbAVE' for the high-amplitude operation has not been measured, the process goes to a step S18, at which a diagnosis flag "Fb" for measurement in the high-amplitude operation is turned ON (Fb=1). As a result, the response delay times are measured in the high-amplitude operation in accordance with processes of FIGS. 7 and 8 (explained below).

In case of YES at the step S16, the process goes to a step S20, at which the ECU 37 determines whether a condition for determining the deterioration of the catalyst is satisfied or not. The condition is defined as such a condition, according to which the ECU 37 determines whether the time difference between the average response delay time "tsoxaAVE" for the low-amplitude operation and the average response delay time "tsoxbAVE" for the high-amplitude operation is larger than a predetermined value "kCATOK". The predetermined value "kCATOK" is set in advance based on experiments and so on. The predetermined value "kCATOK" is a threshold value for determining whether there is deterioration of the three-way catalyst 24, wherein the threshold value varies depending on parameters, such as the intake-air amount or the air-fuel ratios of the mixture set for the low-amplitude and high-amplitude operations.

When, at the step S20, the time difference is larger than the predetermined value "kCATOK", the process goes to a step S22, at which the ECU 37 determines (diagnoses) that the three-way catalyst 24 is in a good order. On the other hand, in case of NO at the step S20, the process goes to a step S24, at which the ECU 37 diagnoses that the three-way catalyst 24 is not in the good order (that is, deteriorated). Then, the engine checking lamp is turned on to inform the vehicle driver of the abnormal condition of the three-way catalyst 24.

When the process of the step S22 or S24 is ended, the record flag "F1" for the diagnosis is turned ON (F1=1) at a step S26, and the process for diagnosing the deterioration of the catalyst is ended. According to the present embodiment, the value for the record flag "F1" for the diagnosis is stored in a volatile memory device. As a result, when the ECU 37 is turned off, the record for the deterioration diagnosis is deleted, so that the process for the catalyst deterioration is carried out whenever the ECU 37 is turned on in order to restart the engine 19.

In case of NO at the step S10 or when the process at the step S14, S18 or 526 is ended, the diagnosis process of FIG. 4 is ended.

Figure 5:
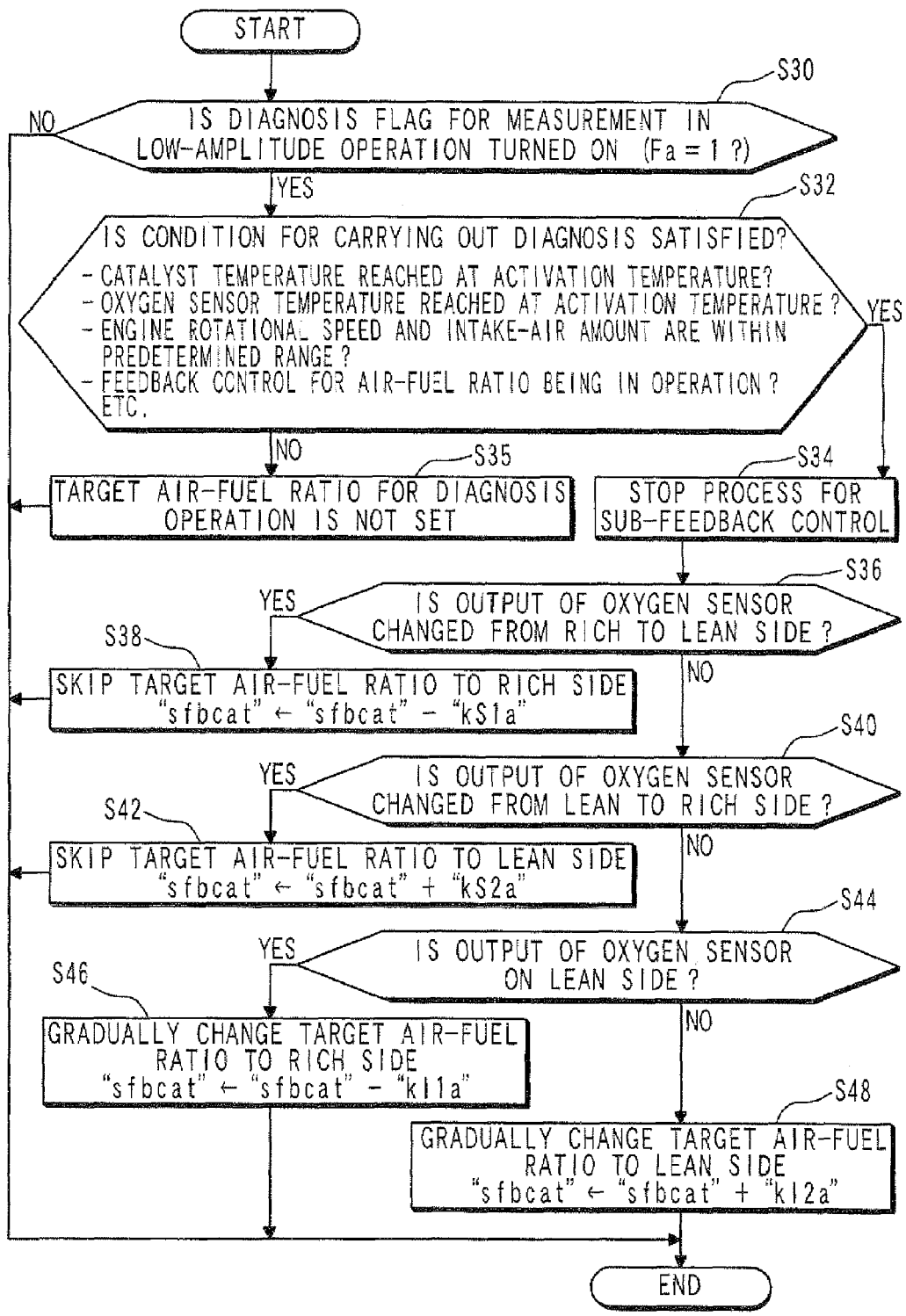
FIG. 5 is a flow-chart showing a process for setting a target air-fuel ratio for a low-amplitude operation.

FIG. 5 shows a process for setting a target air-fuel ratio for the low-amplitude operation. This process is repeatedly carried out by the ECU 37, for example, at a predetermined cycle.

At first, at a step S30, the ECU 37 determines whether the diagnosis flag "Fa" for the measurement of the average response delay time in the low-amplitude operation is turned ON (Fa=1). When the diagnosis flag "Fa" is turned ON, the process goes to a step S32.

At the step S32, the ECU 37 determines whether a condition for carrying out the diagnosis is satisfied or not. According to the present embodiment, a logical multiplication of the following conditions (a) to (f) is defined as the condition for carrying out the diagnosis:

(a) the condition that temperature of the three-way catalyst 24 has reached at its activated temperature. The temperature of the three-way catalyst 24 may be calculated based on the operating condition of the engine 19, the outputs of the water temperature sensor 34 and the outside temperature sensor 36.

(b) the condition that temperature of the oxygen sensor 28 has reached at its activated temperature. This condition is set in consideration that detection of the rich and lean condition of the mixture becomes possible when the temperature of the oxygen sensor 28 has reached at its activated temperature.

(c) the condition that the intake-air amount is within a predetermined range. This condition is necessary because the diagnosis for the deterioration is carried out based on the response delay time when the delay times "ΔT" (for the low-amplitude and high-amplitude operations) from the time point at which the air-fuel ratio is changed to the time point at which the influence appears at the three-way catalyst 24 are equal to each other. Namely, when the intake-air amount is changed, the above delay time "ΔT" may be correspondingly changed. Then, the above formula (3) for the time difference "Δt" (which is the important parameter for quantifying the maximum oxygen trapping amount "S" of the three-way catalyst 24) will not be realized. In other words, the delay times "ΔT" may be included in the time difference "Δt". The condition (c) is the condition for avoiding such an unfavorable situation. The intake-air amount may be calculated based on the output of the air-flow meter 14.

(d) the condition that the engine rotational speed is within a predetermined range. This condition is likewise necessary because the diagnosis for the deterioration is carried out based on the response delay time when the delay times "ΔT" are equal to each other (for the low-amplitude and high-amplitude operations). Namely, even in the case that the intake-air amount is the same, the delay times "ΔT" is changed when the engine rotational speed is different from each other. As a result, the above formula (3) for the time difference "Δt" (which is the important parameter for quantifying the maximum oxygen trapping amount "S" of the three-way catalyst 24) will not be realized. In other words, the delay times "ΔT" may be included in the time difference "Δt". The condition (d) is the condition for avoiding such an unfavorable situation.

(e) the condition that a feedback control operation for the air-fuel ratio is being carried out. This is the condition for bringing the air-fuel ratio of the mixture (which is calculated based on the output of the A/F sensor 26) to a value closer or equal to the target air-fuel ratio set for the deterioration diagnosis.

(f) the condition that the feedback correction coefficient calculated during the feedback control operation for the air-fuel ratio is within a predetermined range. This is the condition for avoiding such a situation, in which the control for the fuel injection amount by the fuel injection valve 20 becomes difficult as a result that the feedback correction coefficient becomes closer to a predetermined upper or lower limit.

In addition, a condition for determining whether the temperature of the oxygen sensor 28 is within a predetermined range may be added to the above condition for carrying out the diagnosis. According to the case in which the above additional condition is satisfied, it is possible to precisely carry out the diagnosis for the deterioration, even when the delay time "Δr" (which is caused by the response delay time and/or the dead-time of the oxygen sensor 28) is changed depending on the temperature change.

When the ECU 37 determines at the step S32 that the condition for carrying out the diagnosis is not satisfied, the process goes to a step S35, at which the target air-fuel ratio for the diagnosis operation is not set. In case of YES at the step S32, the process goes to a step S34.

At the step S34, the ECU 37 stops a process for the sub-feedback control. The process of this step S34 corresponds to the selecting operation of the selecting portion 50 shown in FIG. 1. As the target air-fuel ratios for the diagnosis operation are set, the diagnosis operation for the catalyst deterioration is forcibly carried out.

At a step S36, the ECU 37 determines whether the output of the oxygen sensor 28 is changed from the rich side to the lean side. When the output of the oxygen sensor 28 is changed to the lean side (YES at the step S36), the process goes to a step S38, at which the ECU 37 skips the target air-fuel ratio to the rich side, so that the injection amount of the fuel injected by the fuel injection valve 20 is increased. In case of NO at the step S36, the process goes to a step S40.

At the step S40, the ECU 37 determines whether the output of the oxygen sensor 28 is changed from the lean side to the rich side. When the output of the oxygen sensor 28 is changed to the rich side (YES at the step S40), the process goes to a step S42, at which the ECU 37 skips the target air-fuel ratio to the lean side, so that the injection amount of the fuel injected by the fuel injection valve 20 is decreased. In case of NO at the step S40, the process goes to a step S44.

At the step S44, the ECU 37 determines whether the output of the oxygen sensor 28 is on the lean side. When the output of the oxygen sensor 28 is on the lean side (YES at the step S44), the process goes to a step S46, at which the ECU 37 gradually changes the target air-fuel ratio further towards the rich side, so that the injection amount of the fuel injected by the fuel injection valve 20 is correspondingly increased.

This step is provided here in order that the output of the oxygen sensor 28 is surely reversed. Namely, in the case that a skipping amount for the air-fuel ratio is large, the air-fuel ratio of the mixture may be changed beyond a capability of the three-way catalyst 24 for purifying the exhaust gas, and thereby the emission characteristic may be made worse during the operation for diagnosing the catalyst deterioration.

On the other hand, in the case that the skipping amount for the air-fuel ratio is set at such a small value, at which the emission characteristic may not be made worse, the output of the oxygen sensor 28 may not be reversed due to variation of the characteristic of the A/F sensor 26. Accordingly, the step S46 is provided in order to avoid the above unfavorable situations.

In case of NO at the step S44, the process goes to a step S48, at which the ECU 37 gradually changes the target air-fuel ratio further towards the lean side, so that the injection amount of the fuel injected by the fuel injection valve 20 is correspondingly decreased. The step S48 is provided because of the same reason for the step S46. The skipping amount for the air-fuel ratio (from rich to lean, or vice versa) at the above steps S38 and S42 as well as an amount of gradually changing the air-fuel ratio at the above steps S46 and S48 may be preferably decided in advance based on the engine operating conditions through experiments, so that the emission characteristic may not be made worse.

In case of NO at the step S30 or when the process at the step S35, S38, S42, S46 or S48 is ended, the process of FIG. 5 is ended.

Figure 6A:
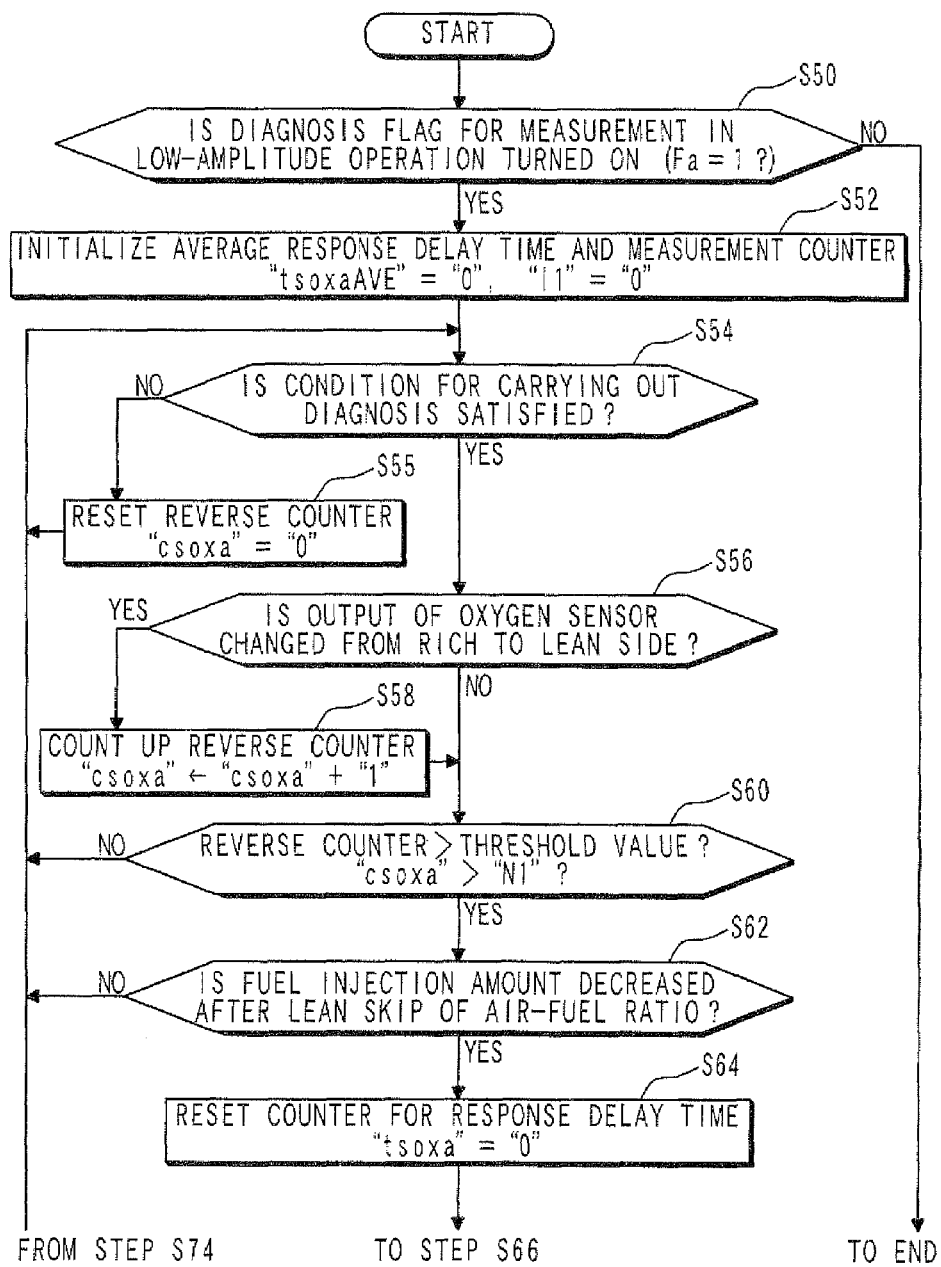
FIGS. 6A and 6B are flow-charts showing a process for measuring response delay time for the low-amplitude operation.
Figure 6B:
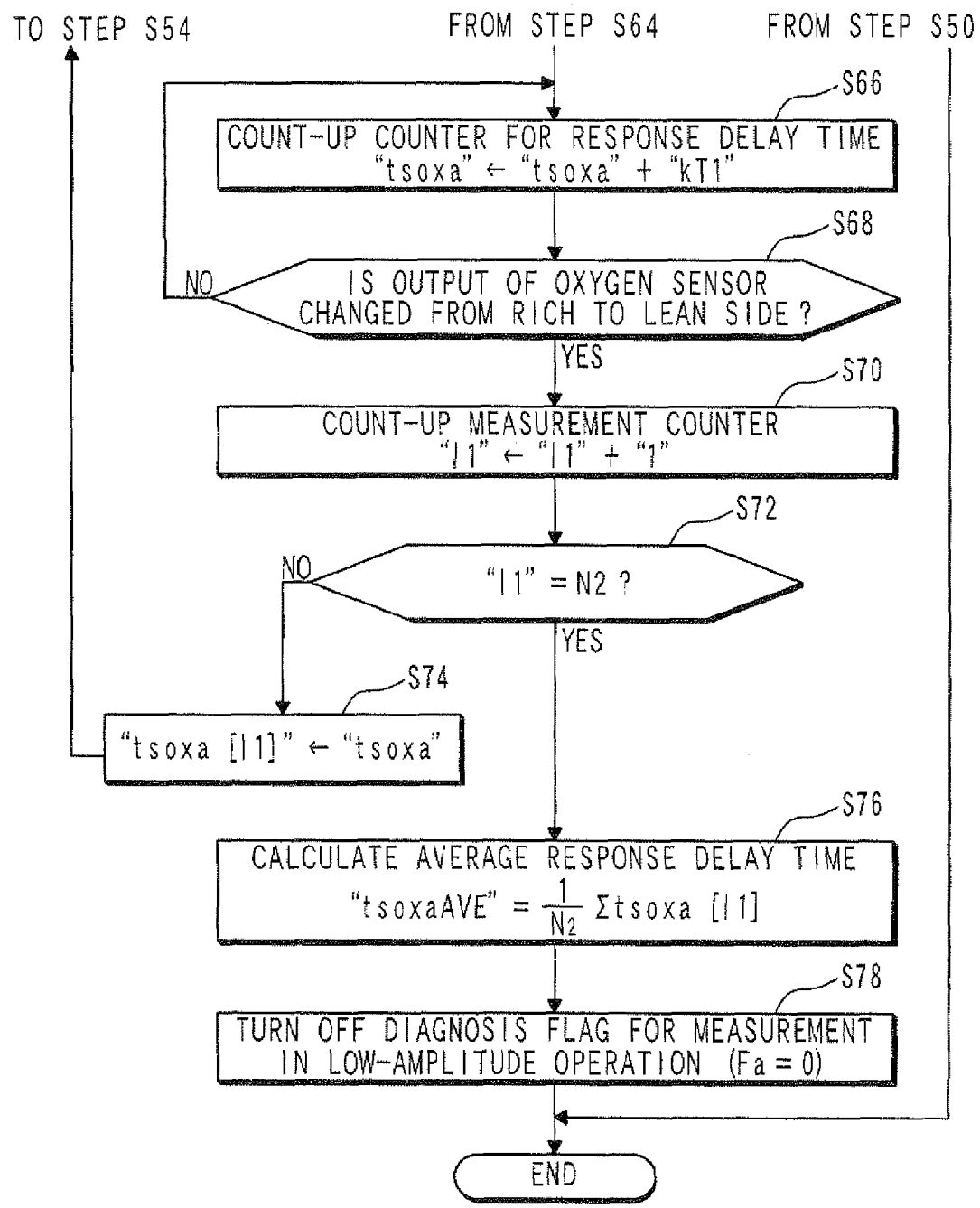

FIGS. 6A and 6B show a process for measuring the response delay time for the low-amplitude operation. This process is repeatedly carried out by the ECU 37, for example, at a predetermined cycle.

At first, at a step S50, the ECU 37 determines whether the diagnosis flag "Fa" for the measurement of the average response delay time in the low-amplitude operation is turned ON (Fa=1). When the diagnosis flag "Fa" is turned ON, the process goes to a step S52, at which the ECU 37 initializes the average response delay time "tsoxaAVE" for the low-amplitude operation and a measurement counter I1 which counts a number of measurement for the response delay time "tsoxa". Namely, the respective values are made to "0". At a step S54, the ECU 37 determines whether the condition for carrying out the diagnosis is satisfied or not, as in the same manner to the step S32 of FIG. 5. When the condition for carrying out the diagnosis is not satisfied, the process goes to a step S55, at which the ECU 37 resets a reverse counter "csoxa" to "0". The reverse counter counts a number of reverse of the outputs from the oxygen sensor 28 from the rich side to the lean side. The process goes back from the step S55 to the step S54. In case of YES at the step S54, the process goes to a step S56.

At steps S56 to S60, the ECU 37 carries out a process by several times (for example, N1+1), according to which the air-fuel ratio is alternately changed from the lean to the rich side and vice versa, before measuring the response delay time. This process is carried out because of the following reason. In the case that the oxygen trapping amount by the three-way catalyst 24 is excessively larger or smaller than the maximum oxygen trapping amount, data spread may occur in the response delay times even when the oxygen amount to be supplied to the catalyst is the same. Accordingly, the above process (the steps S56 to S60) is carried out to bring the oxygen trapping amount in the catalyst to a predetermined value (for example, a value equal to half of the maximum oxygen trapping amount) to avoid such data spread. More specifically, at the step S56, the ECU 37 determines whether the output of the oxygen sensor 28 is changed from the rich side to the lean side. When the output of the oxygen sensor 28 is changed to the lean side (YES at the step S56), the process goes to a step S58, at which a number "1" is added to the reverse counter "csoxa". In case of NO at the step S56 or when the process at the step S58 is ended, the process goes to the step S60, at which the ECU 37 determines whether the number of the reverse counter "csoxa" is larger than a predetermined threshold value "N1" (N1≧1). According to the present embodiment, the threshold value is set at "1". In case of NO at the step S60, the process goes back to the step S54. When the number of the reverse counter "csoxa" is larger than the predetermined threshold value "N1" at the step S60, the process goes to a step S62.

At the step S62, the ECU 37 determines whether the injection amount of the fuel injected from the fuel injection valve 20 is decreased or not as a result of the lean-skip process at the step S42 of FIG. 5 (at which the target air-fuel ratio is skipped to the lean side). When it is determined at the step S62 that the fuel injection amount is not decreased, the process goes back to the step S54. In case of YES at the step S62, the process goes to a step S64, at which the ECU 37 resets a counter "tsoxa" for the response delay time to "0", before starting with a measurement for the response delay time. When measuring the response delay time, a time point of fuel injection amount being decreased is set as a starting point.

At a step S66 (FIG. 6B) after the step S64 being completed, a predetermined number "kT1" is added to the counter "tsoxa" for the response delay time. According to the present embodiment, the predetermined number "kT1" is set at a value corresponding to a process cycle of the process of FIGS. 6A and 6B. Then, at a step S68, the ECU 37 determines whether the output of the oxygen sensor 28 is changed from the rich side to the lean side. When the output of the oxygen sensor 28 is not reversed, the process goes back to the step S66. In case of YES at the step S68, the process goes to a step S70, at which the process for measuring the response delay time is ended and a number "1" is added to the measurement counter "I1". Then, the process goes to a step S72.

At the step S72, the ECU 37 determines whether the measurement counter "I1" is equal to a threshold value "N2" (N2≧1). When, at the step S72, it is determined that the measurement counter "I1" is not equal to the threshold value "N2", the process goes to a step S74, at which the response delay time "tsoxa" measured this time is stored in the memory device as "tsoxa[I1]". In case of YES at the step S72, the process goes to a step 376, at which the average response delay time "tsoxaAVE" is calculated. According to the present embodiment, the average response delay time "tsoxaAVE" is calculated as a simple moving average value for the response delay times which are measured by several times ("tsoxa[I1], I1=1~N2").

When the step S76 is finished, the diagnosis flag "Fa" for the measurement of the average response delay time in the low-amplitude operation is turned OFF (Fa=0) at a step S78.

In case of NO at the step S50 or when the process at the step S78 is ended, the process of FIGS. 6A and 6B is ended.

Figure 7:
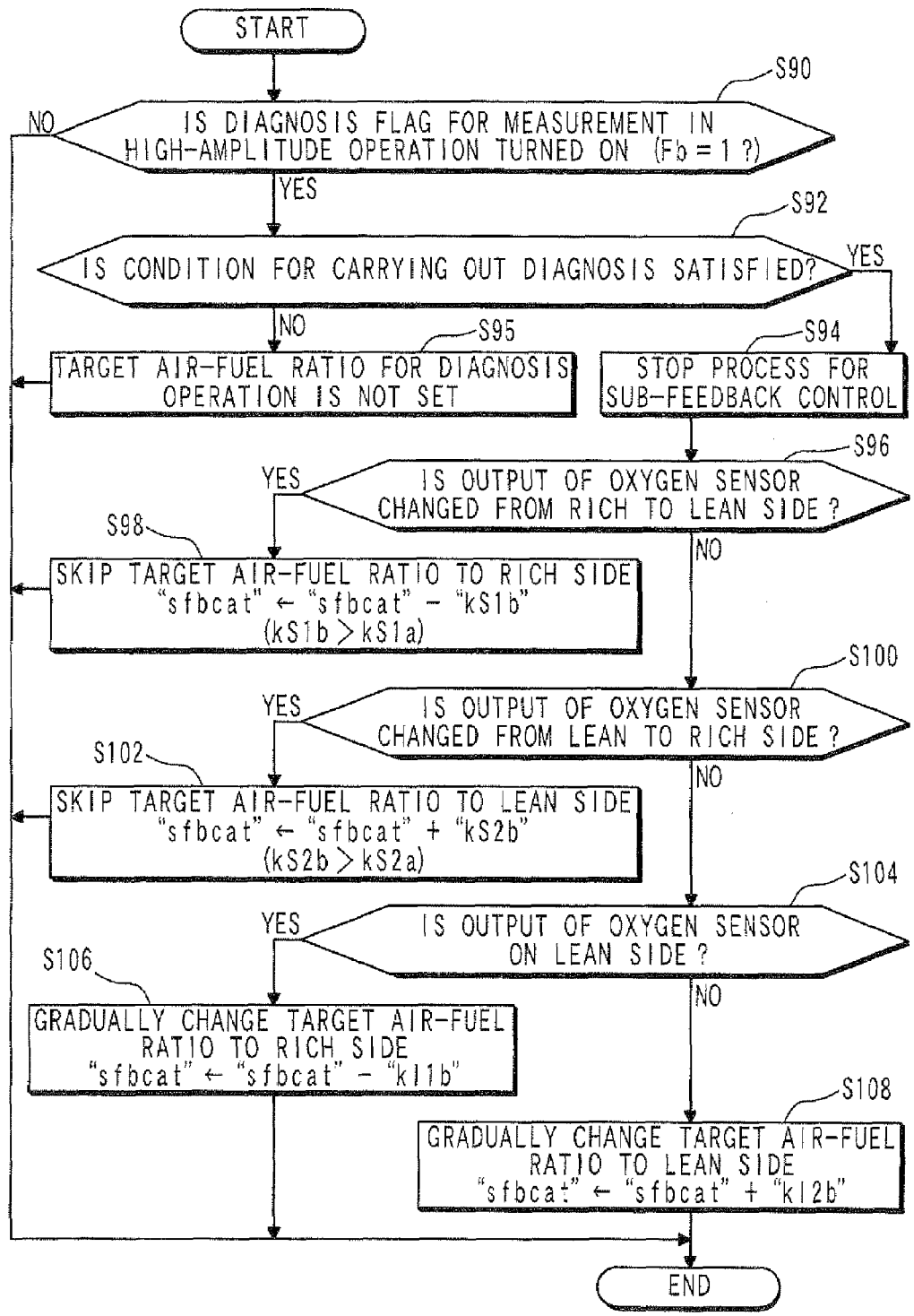
FIG. 7 is a flow-chart showing a process for setting a target air-fuel ratio for a high-amplitude operation.

FIG. 7 shows a process for setting a target air-fuel ratio for the high-amplitude operation. This process is repeatedly carried out by the ECU 37, for example, at a predetermined cycle.

At first, at a step S90, the ECU 37 determines whether the diagnosis flag "Fb" for the measurement of the average response delay time in the high-amplitude operation is turned ON (Fb=1). When the diagnosis flag "Fb" is turned ON, the ECU 37 carries out, at steps S92 to S108, a process which corresponds to the process of the steps S32 to S48 of FIG. 5. Namely, the air-fuel ratio is periodically changed from the rich side to the lean side or vice versa. Skipping amounts "ks1b" and "kS2b" at the steps S98 and S102 are set at such values larger than the skipping amounts "kS1a" and "kS2a" at the steps S38 and S42 of FIG. 5. And amounts for gradually changing the air-fuel ratio (the gradually changing amounts) "kI1b" and "kI2b" at the steps S106 and S108 are also set at such values larger than the gradually changing amounts "kI1a" and "kI2a" at the steps S46 and S48 of FIG. 5. According to such arrangement, variation of the air-fuel ratio in the process of FIG. 7 becomes larger than that in the process of FIG. 5. As in the same manner to the steps S38, S42, S46 and S48 of FIG. 5, the skipping amounts for the air-fuel ratio at the steps S98 and S102 as well as the amounts of gradually changing the air-fuel ratio at the steps S106 and S108 may be preferably decided in advance based on the engine operating conditions through experiments, so that the emission characteristic may not be made worse.

Figure 8A:
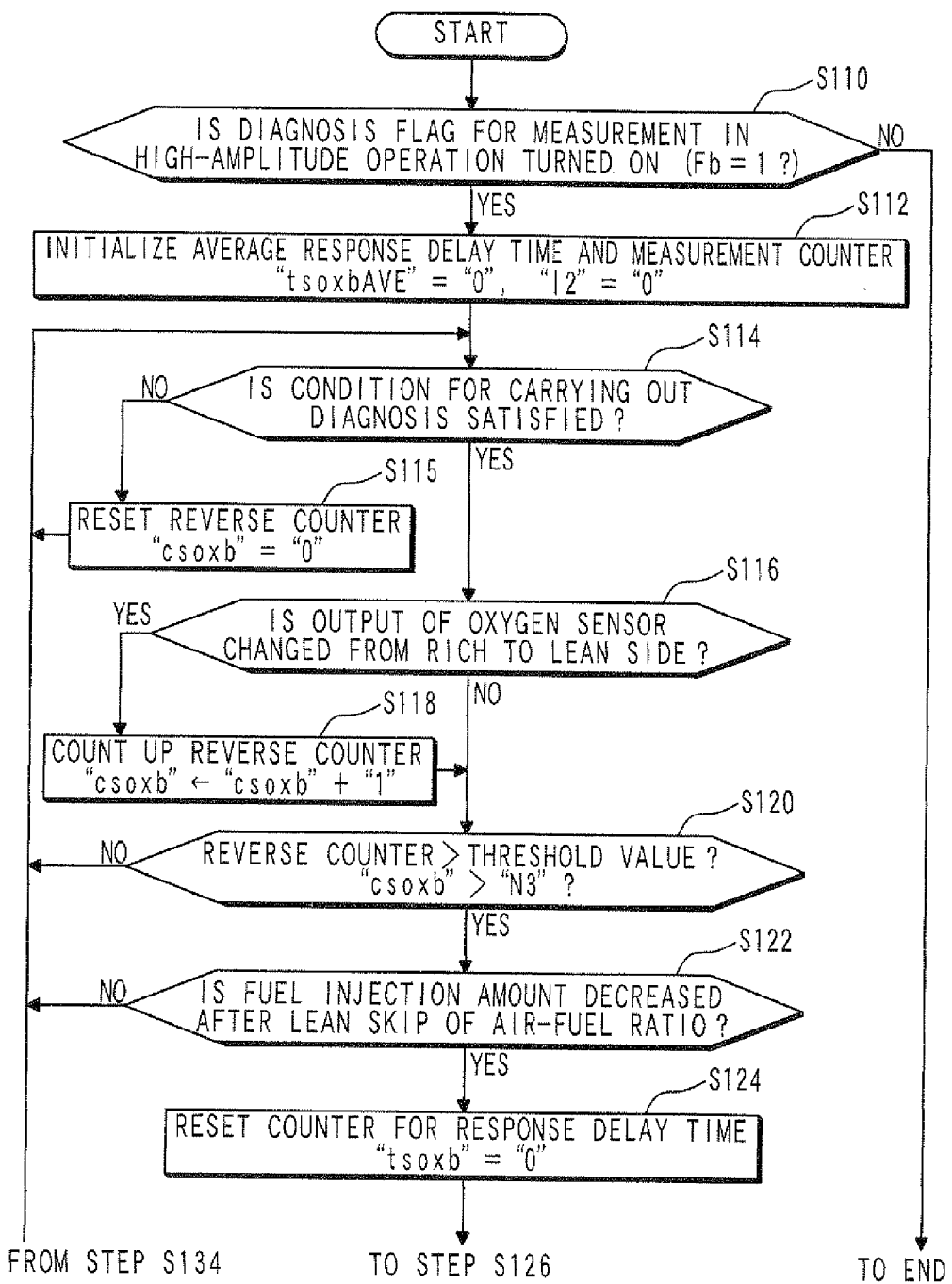
FIGS. 8A and 8B are flow-charts showing a process for measuring response delay time for the high-amplitude operation.
Figure 8B:
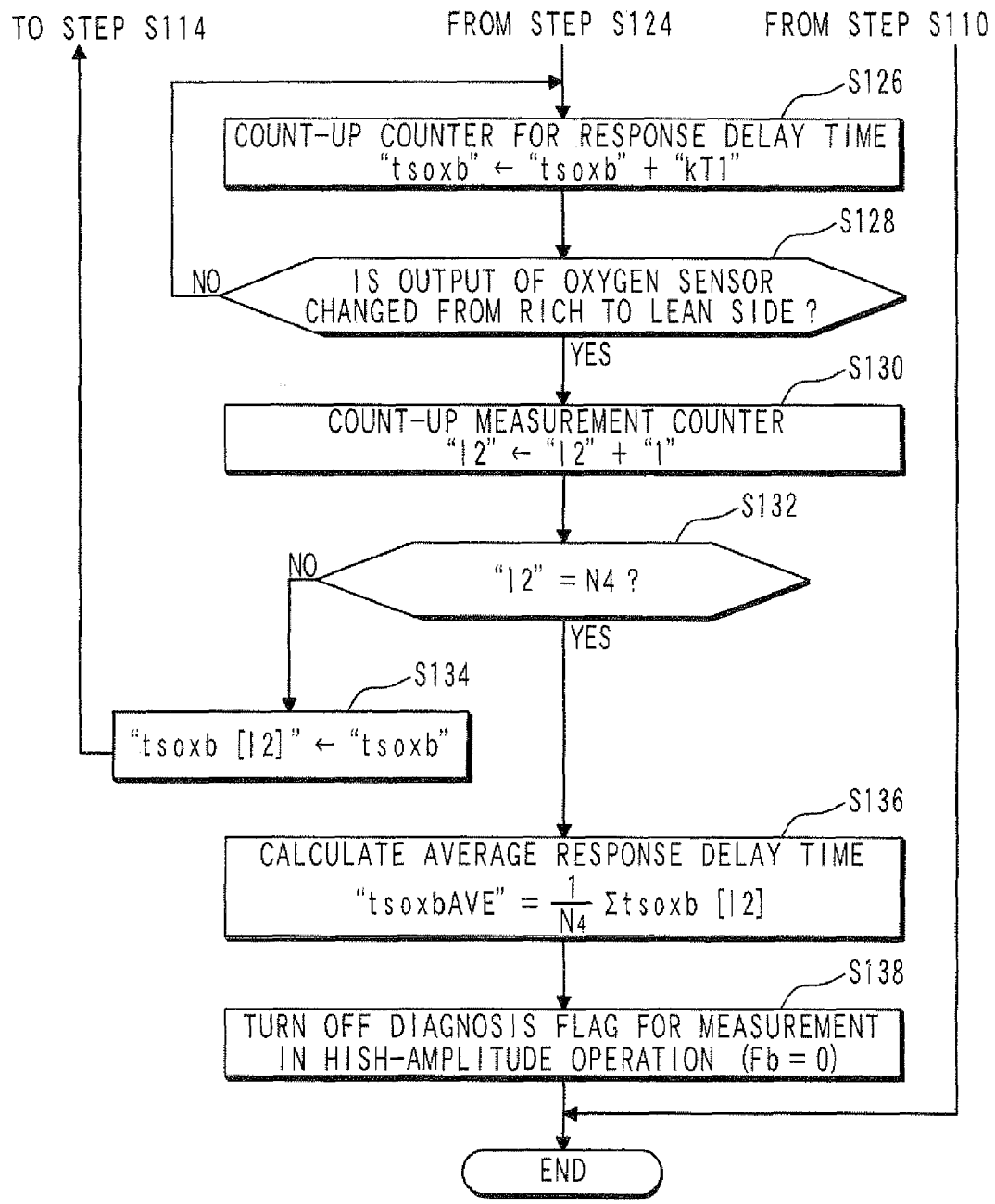

FIGS. 8A and 8B show a process for measuring the response delay time for the high-amplitude operation. This process is repeatedly carried out by the ECU 37, for example, at a predetermined cycle.

At first, at a step S110, the ECU 37 determines whether the diagnosis flag "Fb" for the measurement of the average response delay time in the high-amplitude operation is turned ON (Fb=1). When the diagnosis flag "Pb" is turned ON, the process goes to a step S112. The ECU 37 carries out, at steps S112 to S138, a process which corresponds to the process of the steps S52 to S78 of FIGS. 6A and 6B. Namely, in the process of FIGS. 6A and 6B, the ECU 37 carries out the measurement of the response delay time "tsoxb" and calculates the average response delay time "tsoxbAVE", as in the similar manner to FIGS. 6A and 6B. A threshold value "N3" used in the steps S116 to S120 may be preferably set at the same value to the threshold value "N1". A threshold value "N4" for defining a number of measurements may be also preferably set at the same value to the threshold value "N2".

FIGS. 9A to 9D show examples for measurements of the response delay times in the low-amplitude and high-amplitude operations for diagnosing catalyst deterioration. FIG. 9A shows transition of the target air-fuel ratio in the low-amplitude operation and FIG. 9B shows transition of the output of the oxygen sensor 28 in the low-amplitude operation.

As shown in FIGS. 9A and 9B, the output of the oxygen sensor 28 is reversed again from the rich to the lean side at a time point "t1", after the output has been reversed from the rich to the lean side at a time point "t0". Then, the determination at the step S60 of FIG. 6A becomes "YES". As a result, a pre-processing prior to the measurement of the response delay time is completed. A response delay time, which starts from a time point "t2" at which the injection amount of the fuel injected by the fuel injection valve 20 is decreased by the lean-skip of the air-fuel ratio and terminates at a time point "t4" at which the output of the oxygen sensor 28 is changed from the rich to the lean side, is measured. Another response delay time from a time point "t5" to a time point "t7" is also measured in the same manner. As above, the response delay times are measured by "N2" times, so that the average response delay time "tsoxaAVE" for the low-amplitude operation is calculated, at the step S76 of FIG. 6B.

FIG. 9C shows transition of the target air-fuel ratio in the high-amplitude operation and FIG. 9D shows transition of the output of the oxygen sensor 28 in the high-amplitude operation.

As shown in FIGS. 9C and 9D, the output of the oxygen sensor 28 is reversed again from the rich to the lean side at a time point "t1", after the output has been reversed from the rich to the lean side at a time point "t0". Then, the determination at the step S120 of FIG. 8A becomes "YES". As a result, a pre-processing prior to the measurement of the response delay time is completed. In the same manner to that of FIGS. 9A and 9B, a response delay time, which starts from a time point "t2" at which the injection amount of the fuel injected by the fuel injection valve 20 is decreased by the lean-skip of the air-fuel ratio and terminates at a time point "t4" at which the output of the oxygen sensor 28 is changed from the rich to the lean side, is measured. Another response delay time from a time point "t5" to a time point "t7" is also measured in the same manner. As above, the response delay times are measured by "N4" times, so that the average response delay time "tsoxbAVE" for the high-amplitude operation is calculated, at the step S136 of FIG. 8B.

In FIGS. 9B and 9D, the output of the oxygen sensor 28 is indicated by a solid line in case of the operation of the deteriorated sensor, and indicated by a dotted line in case of the operation of the normal sensor. As seen from the drawings, the response delay time becomes longer when the oxygen sensor 28 is deteriorated. Therefore, when the maximum oxygen trapping amount "S" of the three-way catalyst 24 is calculated based on either one of the response delay times in the low-amplitude or the high-amplitude operation, the maximum oxygen trapping amount "S" may be calculated as such a value, which is larger than an actual value. According to the present embodiment, however, the difference between the response delay times in the low-amplitude and high-amplitude operations is used, so that the diagnosis for the deterioration of the three-way catalyst 24 can be precisely carried out.

According to the present embodiment, the following advantages (A1) to (A7) can be obtained.

(A1) According to the above embodiment, the average response delay time "tsoxaAVE" in the low-amplitude operation as well as the average response delay time "tsoxbAVE" in the high-amplitude operation are respectively calculated based on respective measured amounts for response delay times measured by the multiple times, when each of the intake-air amount and the engine rotational speed is within the respective predetermined ranges. And the three-way catalyst 24 is diagnosed as being in the good order, when the difference between the above average response delay times for the low-amplitude and high-amplitude operations is larger than the predetermined threshold "kCATOK". Accordingly, it is possible to precisely calculate the maximum oxygen trapping amount "S" of the three-way catalyst 24 and thereby it becomes possible to precisely diagnose the catalyst deterioration.

(A2) The air-fuel ratios are forcibly set for the process of deterioration diagnosis for the three-way catalyst 24. Accordingly, the change of the air-fuel ratios necessary for the measurement of the response delay time can be properly made.

(A3) The injection amount of the fuel injected by the fuel injection valve 20 is decreased when the target air-fuel ratio is skipped to the lean side (the lean-skip). The starting time for the decrease of the fuel injection amount is used as the starting time for measuring the response delay time. Accordingly, it is possible to easily set the starting time for measuring the response delay time, without being influenced by the deterioration of the response of the A/F sensor 26.

(A4) For each trip, namely for each period from starting the engine to stopping the engine, the diagnosis process for diagnosing the deterioration of the three-way catalyst 24 is carried out. Accordingly, the diagnosis for the catalyst deterioration is carried out whenever the vehicle driver uses the vehicle, so that such an unfavorable situation in which the vehicle running with deteriorated emission characteristic may be effectively avoided.

(A5) The target air-fuel ratio for the deterioration diagnosis of the catalyst is so set that it is gradually changed to become further richer or leaner after the air-fuel ratio is skipped to rich or lean side. Accordingly, the output value of the oxygen sensor 28 can be surely reversed without adversely affecting the emission characteristic during the operation for the deterioration diagnosis.

(A6) The measurement of the response delay time is made after the oxygen trapping amount in the three-way catalyst 24 is controlled at the amount almost equal to the half of the maximum oxygen trapping amount. Accordingly, variation of the oxygen trapping amount in the three-way catalyst 24 is suppressed at the beginning of the measurement of the response delay time. Namely, the decrease of accuracy for the response delay time is suppressed as much as possible.

(A7) The response delay time is measured as the time period from the time point, at which the injection amount of the fuel injected by the fuel injection valve 20 is decreased as a result of skipping of the target air-fuel ratio to the lean side, to the time point at which the output of the oxygen sensor 28 is changed from the rich to the lean side. Accordingly, the response delay time can be quickly measured.

(Second Embodiment)

A second embodiment will be explained with reference to the drawings, wherein different points from the first embodiment are mainly explained.

According to the second embodiment, the deterioration diagnosis is carried out by use of the response delay time also measured during the normal operation of the engine 19, in order to increase a frequency of the deterioration diagnosis for the three-way catalyst 24.

Figure 10A:
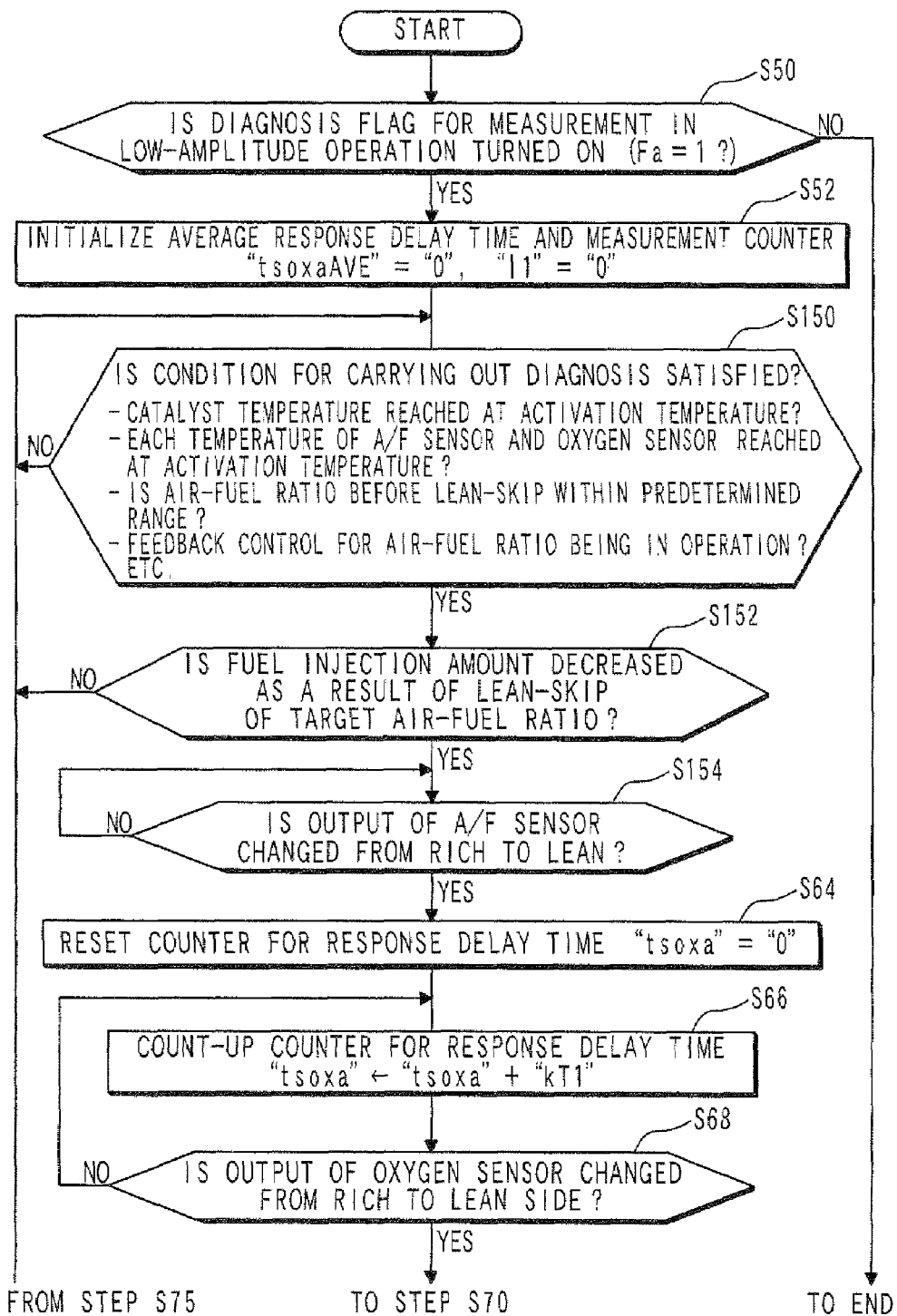
FIGS. 10A and 10B are flow-charts showing a process for measuring response delay time for the low-amplitude operation according to a second embodiment.
Figure 10B:
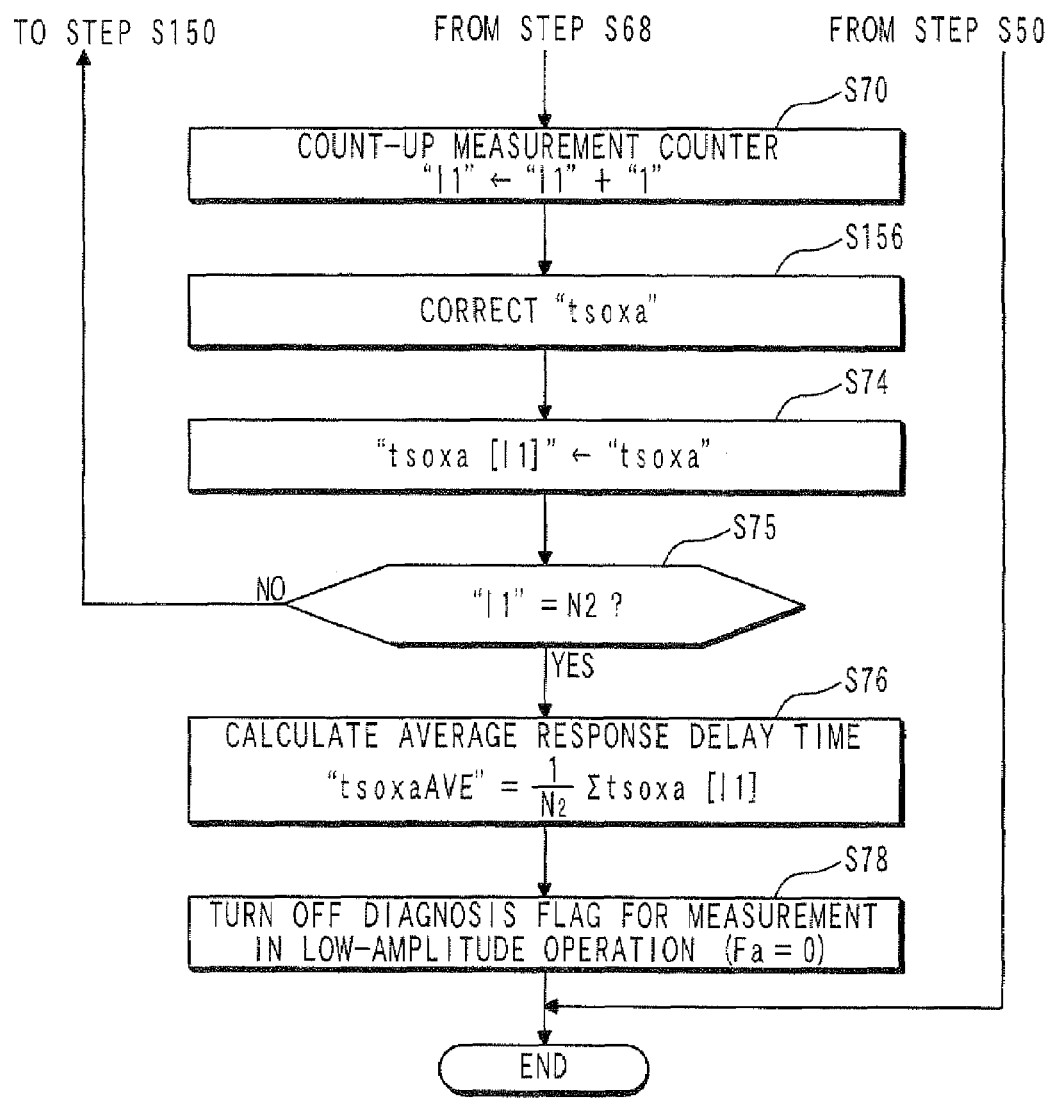

FIGS. 10A and 10B as well as FIG. 12 show a process for measuring the response delay time for the deterioration diagnosis of the catalyst according to the present embodiment. This process is repeatedly carried out by the ECU 37, for example, at a predetermined cycle. The same reference numerals of FIGS. 6A and 6B and FIGS. 8A and 8B are given to the same steps of FIGS. 10A, 10B and 12 to those of FIGS. 6A, 6B, 8A and 8B.

FIGS. 10A and 10B show a process for measuring the response delay time in the low-amplitude operation.

At a step S150 after the step S52, the ECU 37 determines whether the condition for carrying out the diagnosis is satisfied or not.

According to the present embodiment, a logical multiplication of the conditions (a), (b), (e) and (f) (for the first embodiment) and the following condition (g) is defined as the condition for carrying out the diagnosis:

(g) the condition that the air-fuel ratio is within a predetermined range before the lean-skip. This is the condition for controlling the oxygen trapping amount by the three-way catalyst 24 at a predetermined amount (for example, at a half of the maximum oxygen trapping amount) before measurement of the response delay time, to thereby suppress the variation of the response delay time.

In case of YES at the step S150, the process goes to a step S152, at which the ECU 37 determines whether the injection amount of the fuel injected by the fuel injection valve 20 shall be decreased by carrying out the lean-skip of the target air-fuel ratio. When it is determined at the step S152 that the fuel injection amount is not decreased, the process goes back to the step S150. In case of YES at the step S152, on the other hand, the process goes to a step S154, at which the ECU 37 determines whether the output value of the A/F sensor 26 is changed from the rich side to the lean side. In case of YES at the step S154, steps which are the same to the steps S64 to S70 of FIGS. 6A and 6B are carried out.

At a step S156, the response delay time "tsoxa" is corrected. The delay time "ΔT" may differ from measurement to measurement depending on the difference of exhaust gas amount for each measurement. The delay time "ΔT" likewise differs from measurement to measurement depending on the difference of oxygen supplying amount to the three-way catalyst 24. Therefore, this is the step for standardizing the delay time "ΔT" and the response delay time to the same amounts.

In the case that the exhaust gas amount differs from measurement to measurement during the multiple measurements of the response delay time, it is supposed not only that the delay time included in the response delay time depending on the maximum oxygen trapping amount of the catalyst differs from measurement to measurement, but also that the delay time "ΔT" (which is the time period from the time point for decreasing the fuel injection amount to the time point at which the influence of the decrease of the fuel injection amount appears) differs from measurement to measurement.

Figure 11A:
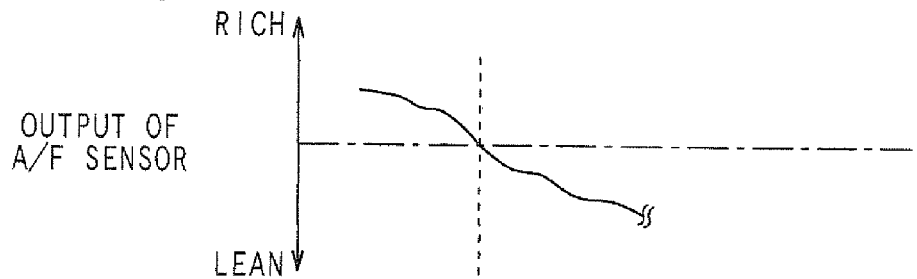
FIGS. 11A to 11D are timing charts showing correction of exhaust gas amount for the response delay time.
Figure 11B:
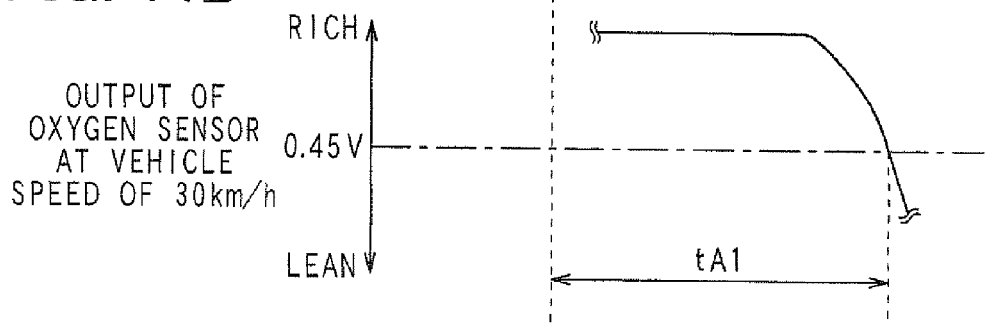
Figure 11C:
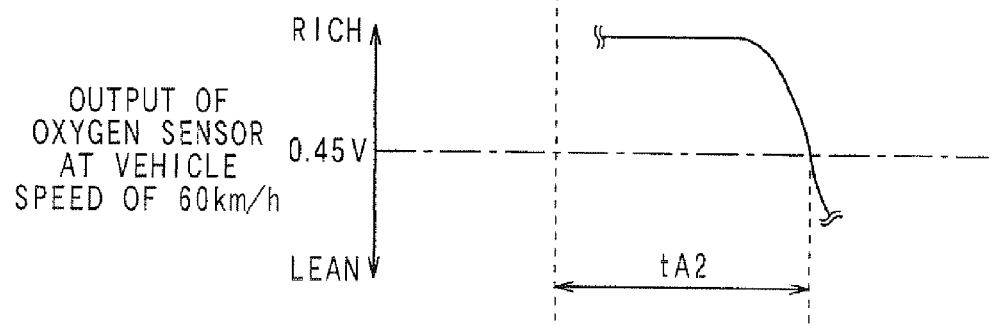
Figure 11D:
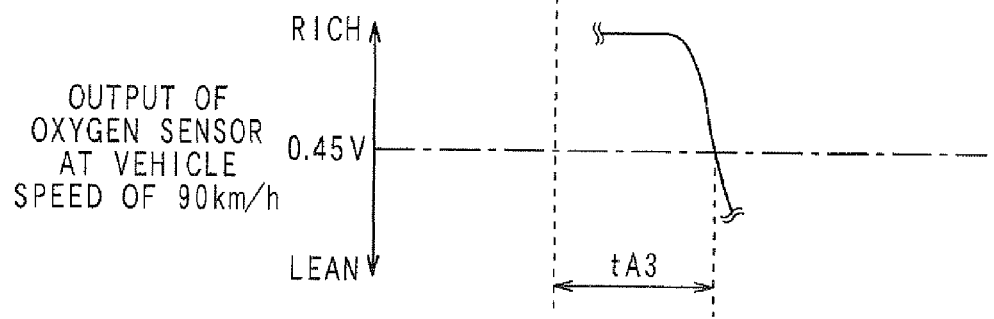

As shown in FIGS. 11A to 11D, the response delay time (tA1, tA2, tA3) varies when the exhaust gas amount is different, even in the case that the maximum oxygen trapping amount "S" of the three-way catalyst 24 is the same. FIGS. 11B to 11D respectively show transitions of the output of the oxygen sensor 28 with respect to the transition of the output of the A/F sensor 26. FIGS. 11B to 11D respectively show the transitions of the output of the oxygen sensor 28, when the vehicle speed is 30 km/h, 60 km/h and 90 km/h. As shown in the drawing, the response delay time becomes shorter as the vehicle speed is higher (tA1>tA2>tA3), because the exhaust gas amount becomes larger as the vehicle speed is higher. Therefore, the response delay time "tsoxa" is corrected, for example, by multiplying the response delay time "tsoxa" by a certain correction coefficient, or by adding a certain correction amount to the response delay time "tsoxa". The correction coefficient or the correction amount is set in advance based on the experiments, wherein the exhaust gas amount, the fuel injection amount before and after the lean-skip of the target air-fuel ratio, information for the engine operating condition and so on are changed as parameters.

When the process of the step S156 is completed, at a step S74, the response delay time "tsoxa" measured at this cycle is stored as "tsoxa [I1]" in the memory device. At a step S75, the ECU 37 determines whether the counter "I1" for the measurement number is equal to a predetermined threshold "N2" (N2>1). When the counter "I1" for the measurement number is not equal to the threshold "N2", the process goes back to the step S150. In case of YES at the step S75, the process goes to the step S76 for calculating the average response delay time "tsoxaAVE". At the step S78, the diagnosis flag Fa is turned OFF (Fa=0).

In case of NO at the step S50 or when the process at the step S78 is ended, the process of FIGS. 10A and 10B is ended.

FIG. 12 shows a process for measuring the response delay time in the high-amplitude operation.

When the process of the step S112 is completed, at a step S160, the ECU 37 determines whether the condition for diagnosis is satisfied. According to the present embodiment, a logical multiplication of the conditions (a), (b), (e), (f) and (g) (for the step S150 of FIG. 10A) and the following condition (h) is defined as the condition for carrying out the diagnosis:

(h) the exhaust gas amount is within a predetermined range.

The above predetermined range for the exhaust gas amount corresponds to the exhaust gas amount, which is a basis for standardizing the response delay time at the step S156 of FIG. 10B. This condition is for avoiding such a case, in which the delay time resulting from the maximum oxygen trapping amount of the catalyst may not be precisely calculated, because the delay time "ΔT" varies depending on the difference of the exhaust gas amount.

In case of YES at the step S160, the process goes to a step S162, at which the ECU 37 determines whether fuel-cut control is turned ON or not. When it is determined at the step S162 that the fuel-cut control is not turned ON, the process goes back to the step S160. On the other hand, in case of YES at the step S162, the process goes to a step S164 in order to determine whether the output value of the A/F sensor 26 is changed from the rich side to the lean side. In case of YES at the step S164, steps which are the same to the steps S124 to S138 of FIGS. 8A and 8B are carried out. Although the air-fuel ratio at the fuel-cut control becomes "the intake-air amount/0", the air-fuel ratio in this control is defined as an extremely large value.

In case of NO at the step S110 or when the process at the step S138 is ended, the process of FIG. 12 is ended.

The fuel-cut operation is carried out when a demand for decreasing a torque of the engine 19 is existing. The exhaust gas amount tends to be gradually decreased to a smaller amount after the fuel-cut control, when compared with that before the fuel-cut control. Accordingly, the delay time included in the response delay time and depending on the maximum oxygen trapping amount of the catalyst becomes longer. Therefore, the response delay time measured in the high-amplitude operation tends to become longer. As a result, the difference between the average response delay time "tsoxaAVE" in the low-amplitude operation and the average response delay time "tsoxbAVE" in the high-amplitude operation becomes correspondingly shorter. Therefore, the ECU 37 is likely to determine at the step S20 of FIG. 4 that the catalyst is not in the good order. This is desirable, on one hand, in a viewpoint that an erroneous diagnosis (that is, an abnormal catalyst is determined as a normal catalyst) can be avoided. On the other hand, another erroneous diagnosis (that is, a normal catalyst is determined as an abnormal catalyst) may be done. Therefore, in order to avoid such erroneous diagnosis, it is preferable to set the threshold value "kCATOK" (for the step S20 of FIG. 4) in advance based on the experiments, by taking into consideration that the average response delay time "tsoxbAVE" in the high-amplitude operation tends to become longer.

The above explained second embodiment has the following advantages (A8) to (A11), in addition to the advantages (A1) to (A7) of the first embodiment.

(A8) According to the above embodiment, the deterioration diagnosis is carried out by use of the response delay times measured also during the normal operation of the engine 19. Accordingly, the number of diagnosis can be properly increased.

(A9) The response delay times are measured in the operations, in which the exhaust gas amount differs from measurement to measurement, when the average response delay time for the low-amplitude operation is measured. Those response delay times are corrected to such values, which would have been measured in the operation with the reference exhaust gas amount. According to the embodiment, the average response delay time "tsoxaAVE" is calculated as a simple moving average value for such corrected values. Accordingly, the number of measurements for the response delay time to be used for the deterioration diagnosis can be increased.

(A10) The deterioration diagnosis for the three-way catalyst 24 is carried out based on the difference between the average response delay time "tsoxaAVE" for the low-amplitude operation and the average response delay time "tsoxbAVE" for the high-amplitude operation, wherein the response delay time is measured as the time period from the time point at which the output of the A/F sensor 26 is changed from the rich to the lean side to the time point at which the output of the oxygen sensor 28 is reversed from the rich to the lean side. Accordingly, the influence of the delay time "ΔT" included in the response delay times, which is the time period from the time point at which the fuel injection amount is decreased to the time point at which the influence of such fuel decrease appears in the three-way catalyst 24, can be eliminated as much as possible.

(A11) The fuel-cut control is carried out as a change of the fuel injection amount during the measurement of the response delay time for the high-amplitude operation. It becomes possible to shorten a time period during which the three-way catalyst 24 is saturated with respect to the oxygen trapping amount. The response delay time can be thereby made shorter, so that variation for the response delay time can be made smaller.

(Third Embodiment)

A third embodiment will be explained with reference to the drawings, wherein different points from the first embodiment are mainly explained.

In the above embodiments, the time period from the first time point at which the air-fuel ratio is changed to the second time point at which the output of the oxygen sensor 28 is reversed is defined as the response delay time. According to the third embodiment, a cycle of reverse for the output of the oxygen sensor is defined as a value corresponding to the response delay time.

Figure 13A:
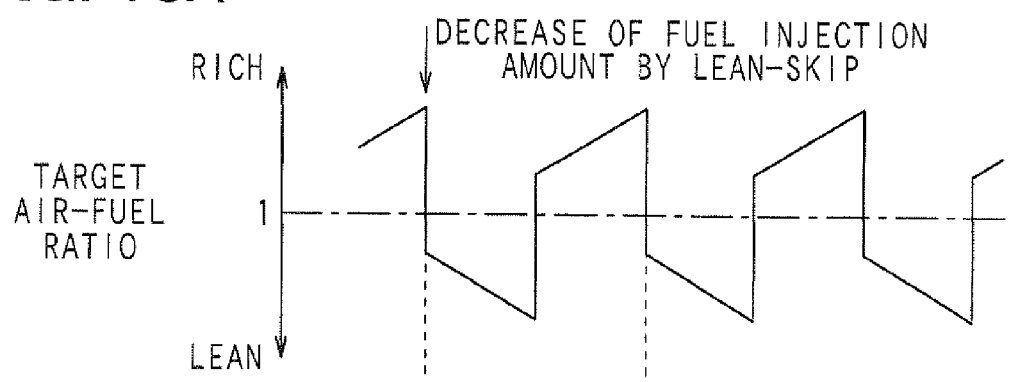
FIGS. 13A and 13B are timing charts showing measurements of a value corresponding to the response delay time for the process of diagnosing catalyst deterioration according to a third embodiment.
Figure 13B:
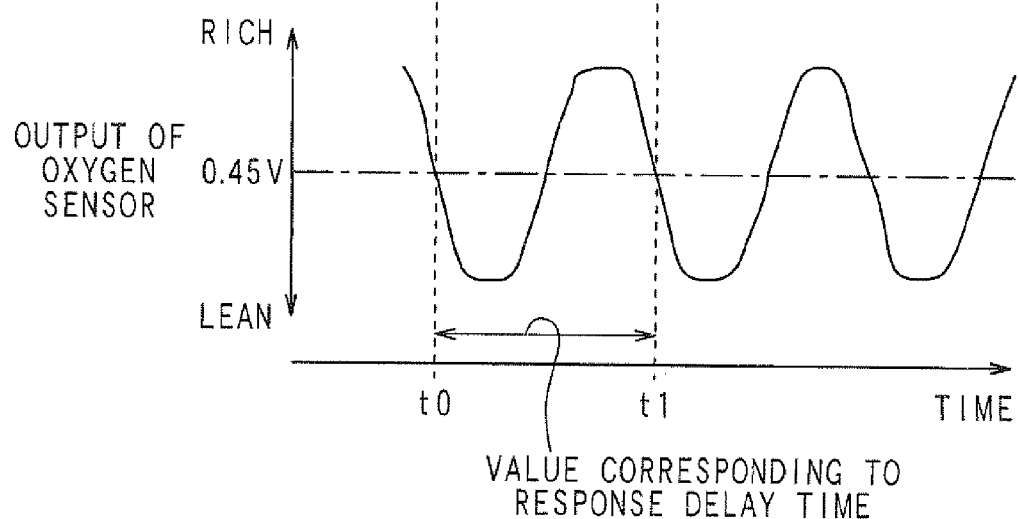

FIGS. 13A and 13B show time charts for explaining the measurement of the value corresponding to the response delay time according to the third embodiment. FIG. 13A shows transition of the target air-fuel ratio and FIG. 13B shows transition of the output of the oxygen sensor 28. As shown in the drawing, one cycle, from a starting time point "t0" at which the output of the oxygen sensor 28 is changed from the rich to the lean side to an ending time point "t1" at which the output of the oxygen sensor 28 is again reversed from the rich to the lean side, is measured as the value corresponding to the response delay time. In this value corresponding to the response delay time, there are included the following two response delay times: Namely, the response delay time from the time point at which the target air-fuel ratio is changed to the rich side to the time point at which the output of the oxygen sensor 28 is changed from the lean to the rich side, and the response delay time from the time point at which the target air-fuel ratio is changed to the lean side to the time point at which the output of the oxygen sensor 28 is changed from the rich to the lean side are included in the value corresponding to the response delay time. Accordingly, even when the value corresponding to the response delay time is used instead of the response delay time for the first embodiment, the same advantages to the first embodiment can be obtained.

(Fourth Embodiment)

A fourth embodiment will be explained with reference to the drawings, wherein different points from the first embodiment are mainly explained.

According to the above first embodiment, the target air-fuel ratio is changed from the lean side to the rich side, or vice versa, only when the output of the oxygen sensor 28 is reversed.

However, in the case that the response delay time and/or the dead-time of the oxygen sensor 28 is elongated, the output of the oxygen sensor 28 is not changed for such an elongated time period in spite that the excessive oxygen trapping amount of the three-way catalyst 24 has been already saturated or the trapped oxygen has been already fully discharged. As a result, the air-fuel ratio of the mixture may be changed to the rich or lean side beyond the time for trapping or discharging the oxygen by the three-way catalyst 24, and thereby the air-fuel ratio may be deviated from the theoretical air-fuel ratio. Therefore, there is a concern that the three-way catalyst 24 may not absorb influence caused by the deviation of the air-fuel ratio from the theoretical air-fuel ratio.

According to the first embodiment, however, it is possible to precisely diagnose the deterioration of the three-way catalyst 24, regardless of the elongation of the response delay time and/or dead-time of the oxygen sensor 28. However, in the case that the response delay time and/or the dead-time of the oxygen sensor 28 were excessively elongated, there would be a concern that the emission characteristic may be made worse due to the operation for the deterioration diagnosis.

According to the present embodiment, therefore, a predetermined time period is set, during which the target air-fuel ratio is maintained on the rich side or the lean side, regardless of the output of the oxygen sensor 28. In other words, the air-fuel ratio is forcibly changed from the rich to the lean, or vice versa, when time passes over the predetermined time period. The predetermined time period is referred to as "a ratio-change time period". More exactly, the ratio-change time period is set depending on the average response delay time "tsoxbAVE" for the high-amplitude operation, when measuring the time difference between the average response delay time "tsoxaAVE" for the low-amplitude operation and the average response delay time "tsoxbAVE" for the high-amplitude operation. As a result, the elongation of the ratio-change time period is suppressed, and thereby the emission characteristic is suppressed from becoming worse. In addition, an upper limit is set to a measuring time for the response delay time depending on the ratio-change time period. Namely, a maximum measuring time for measuring the response delay time is set depending on the ratio-change time period.

Furthermore, the ECU 37 carries out a diagnosis whether the response delay time and/or the dead-time of the oxygen sensor 28 is excessively elongated or not, when measuring the response delay time of the system. In the case that the response delay time and/or the dead-time of the oxygen sensor 28 is excessively elongated, the diagnosis for the deterioration of the catalyst is prohibited to avoid a situation in which the emission characteristic may become worse.

FIGS. 14 to 19B show a process for the deterioration diagnosis of the catalyst according to the fourth embodiment. This process is repeatedly carried out by the ECU 37, for example, at a predetermined cycle. The same reference numerals of FIGS. 4, 6A, 6B, 8A and 8B are given to the steps of FIGS. 14, 17A, 17B, 19A and 19B, which are the same to those of FIGS. 4, 6A, 6B, 8A and 8B.

Figure 14:
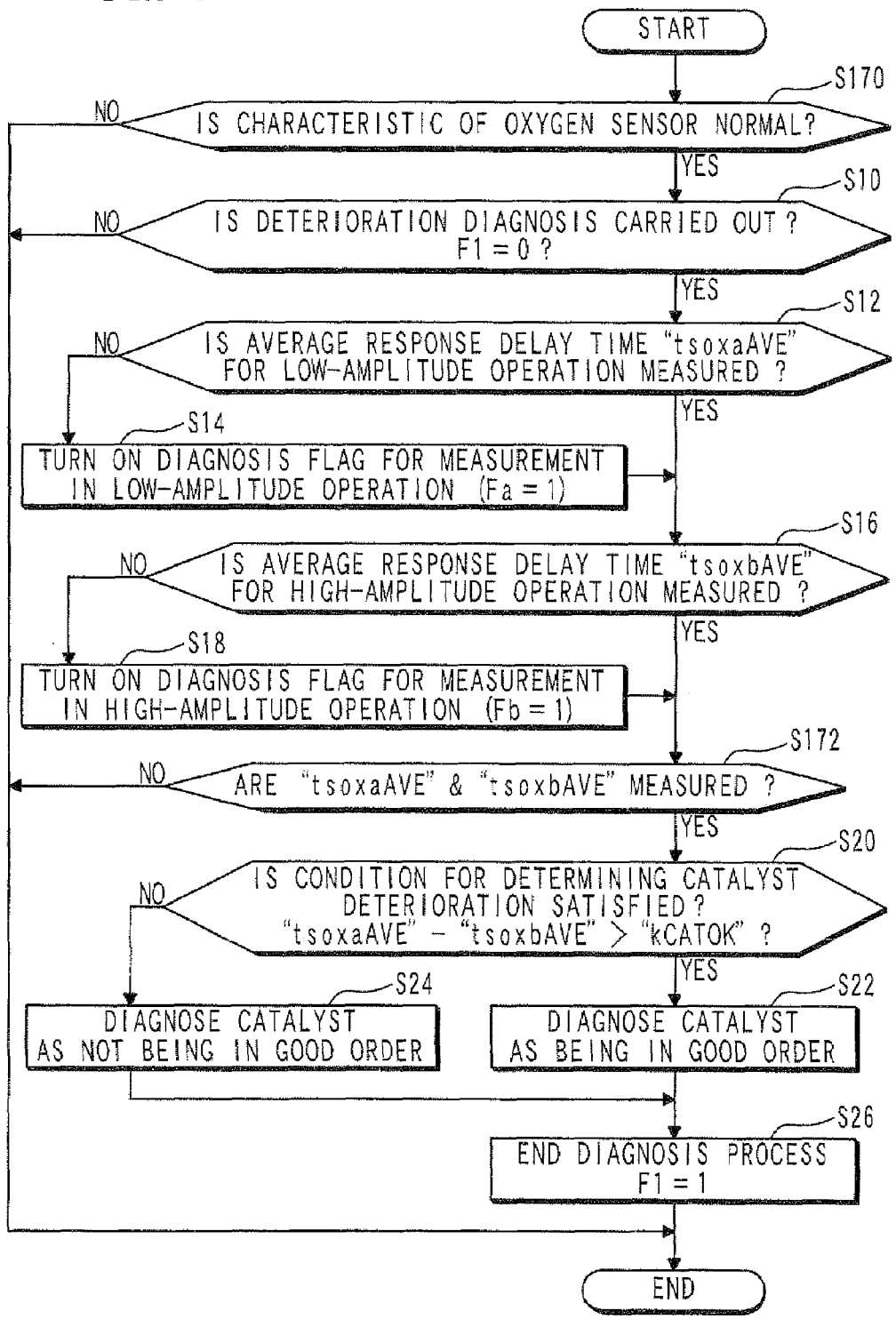
FIG. 14 is a flow-chart showing a deterioration diagnosing process for the catalyst according to a fourth embodiment.

FIG. 14 shows the process for the deterioration diagnosis for the catalyst.

At first, the ECU 37 determines at a step S170 whether the characteristic of the oxygen sensor 28 is in a normal condition or not. The ECU 37 determines that the characteristic of the oxygen sensor 28 is not in the normal condition (abnormal condition), when the ECU 37 diagnoses in the process of FIGS. 19A and 19B (explained below) that the response delay time and/or the dead-time of the oxygen sensor 28 is excessively elongated. In such a case (in the abnormal condition of the characteristic of the oxygen sensor 28), the deterioration diagnosis for the three-way catalyst 24 is prohibited.

In the case the ECU 37 determines that the characteristic of the oxygen sensor 28 is in the normal condition, the process goes to the step S10. The process goes to the step S12, when the ECU 37 determines at the step S10 that the deterioration diagnosis has not been carried out. At the step S12, the ECU 37 determines whether the average response delay time "tsoxaAVE" for the low-amplitude operation has been measured or not. When the average response delay time "tsoxaAVE" for the low-amplitude operation has not been measured, the process goes to the step S14, at which the diagnosis flag "Fa" for the measurement of the average response delay time in the low-amplitude operation is turned ON (Fa=1). As a result, the response delay times are measured in the low-amplitude operation in accordance with processes of FIGS. 15 to 17B (explained below).

In case of YES at the step S12 or when the process of the step S14 is completed, the process goes to the step S16, at which the ECU 37 determines whether the average response delay time "tsoxbAVE" for the high-amplitude operation has been measured or not.

When the average response delay time "tsoxbAVE" for the high-amplitude operation has not been measured, the process goes to the step S18, at which the diagnosis flag "Fb" for the measurement of the average response delay time in the high-amplitude operation is turned ON (Fb=1). As a result, the response delay times are measured in the high-amplitude operation in accordance with processes of FIGS. 18, 19A and 19B (explained below).

In case of YES at the step S16 or when the process of the step S18 is completed, the process goes to a step S172, at which the ECU 37 determines whether the average response delay times "tsoxaAVE" and "tsoxbAVE" for the respective low-amplitude and high-amplitude operations have been measured or not. In case of YES at the step S172, the process goes to the step S20, and the steps S20 to S26 which are the same to those of FIG. 4 are carried out.

In case of NO at the step S170, S10 or S172, or when the process at the step S26 is ended, the diagnosis process of FIG. 14 is ended.

Figure 15:
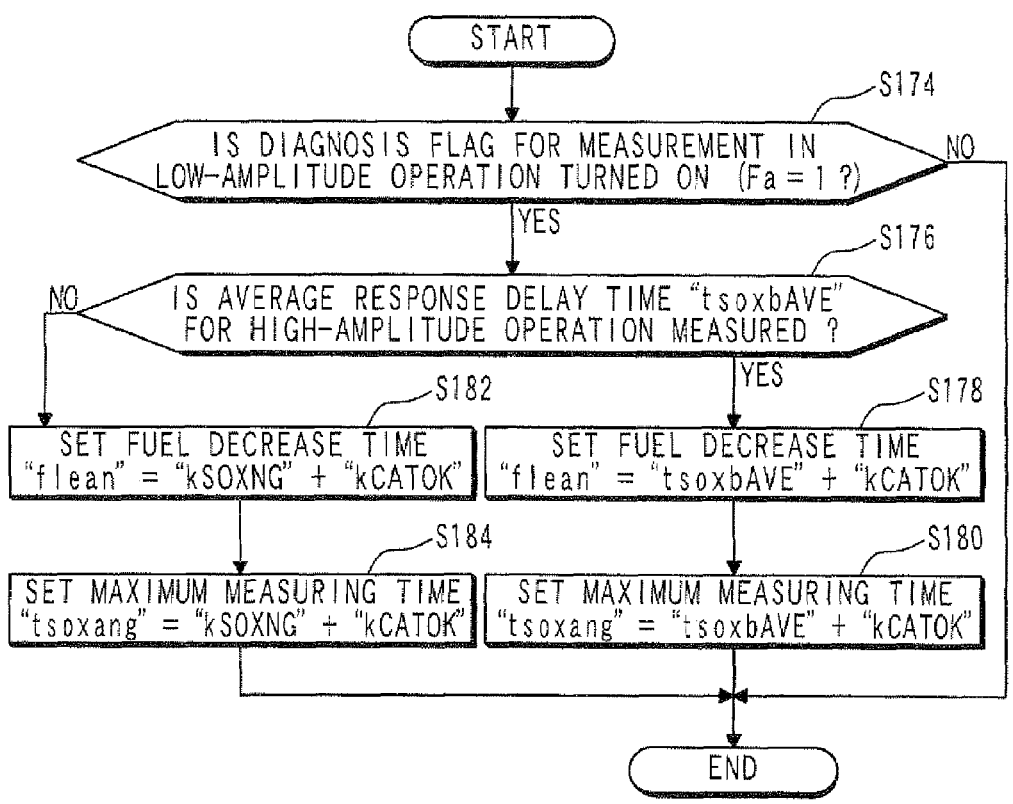
FIG. 15 is a flow-chart showing a process for setting a time (a fuel decrease time) of changing the air-fuel ratio of the low-amplitude operation and for setting a maximum measurement time.

FIG. 15 shows a process for setting the ratio-change time period for the low-amplitude operation and for setting the maximum measuring time for the response delay time in the low-amplitude operation.

At first, the ECU 37 determines at a step S174 whether the diagnosis flag "Fa" for the measurement of the average response delay time in the low-amplitude operation is turned ON (Fa=1). When the diagnosis flag "Fa" is turned ON, the process goes to a step S176, at which the ECU 37 determines whether the average response delay time "tsoxbAVE" for the high-amplitude operation has been measured or not. This process is carried out by determining whether the average response delay time "tsoxbAVE" for the high-amplitude operation is stored in a memory device at a step S252 of FIG. 19B, which will be explained below with reference to FIG. 19B. In case of YES at the step S176, the process goes to a step S178.

At the step S178, the ECU 37 calculates an additional amount of the average response delay time "tsoxbAVE" for the high-amplitude operation and the threshold value "kCATOK" used at the step S20 of FIG. 14, and sets such additional amount as a fuel decrease time "flean" for the fuel injection amount. The fuel decrease time may be also referred to as a lean time. The fuel decrease time (the lean time) "flean" is provided here for the purpose of suppressing such a case, in which the fuel decrease time "flean" may be excessively elongated when the target air-fuel ratio is skipped to the lean side in the low-amplitude operation.

In the step S20 of FIG. 14, the threshold value "kCATOK" is set as such a value, based on which the ECU 37 determines whether the three-way catalyst 24 is deteriorated or not. Therefore, the three-way catalyst 24 can be determined as being in the normal condition, when the average response delay time "tsoxaAVE" for the low-amplitude operation is longer than a time, which is the additional amount of the average response delay time "tsoxbAVE" for the high-amplitude operation and the threshold value "kCATOK". In other words, a minimum time necessary for measuring the average response delay time "tsoxaAVE" for the low-amplitude operation corresponds to the additional amount of the average response delay time "tsoxbAVE" for the high-amplitude operation and the threshold value "kCATOK". As a result, a minimum time for the fuel decrease time likewise corresponds to the additional amount of the average response delay time "tsoxbAVE" for the high-amplitude operation and the threshold value "kCATOK". Since the above additional amount is set as the fuel decrease time "flean", it is possible to make the time necessary for measuring the average response delay time "tsoxaAVE" for the low-amplitude operation as shorter as possible.

When the process of the step S178 is completed, at a step S180, the ECU 37 sets the additional amount of the average response delay time "tsoxbAVE" for the high-amplitude operation and the threshold value "kCATOK" as the maximum measuring time "tsoxang" for measuring the response delay time in the low-amplitude operation. In this embodiment, the maximum measuring time "tsoxang" is set as a value, which is equal to the minimum time for the fuel decrease time necessary for measuring the response delay time. Accordingly, the ECU 37 can diagnose in a shorter time period that the three-way catalyst 24 is in the normal condition, by confirming that the output of the oxygen sensor 28 is not reversed within the maximum measuring time "tsoxang".

In case of NO at the step S176, the process goes to a step S182, at which the ECU 37 likewise sets an additional amount of a predetermined time "kSOXNG" and the threshold value "kCATOK" as the fuel decrease time "flean". This step S182 is carried out in order to set the fuel decrease time "flean", without waiting until the average response delay time "tsoxbAVE" for the high-amplitude operation is calculated. Namely, if the setting of the fuel decrease time is delayed until the average response delay time "tsoxbAVE" for the high-amplitude operation is calculated, the measuring frequency for the response delay time would be decreased, and thereby a frequency for measuring the deterioration diagnosis of the three-way catalyst 24 would be decreased. Therefore, according to the present embodiment, the above predetermined time "kSOXNG" is used in place of the average response delay time "tsoxbAVE" for the high-amplitude operation so as to set the fuel decrease time "flean" necessary for measuring the response delay time in the low-amplitude operation.

The predetermined time "kSOXNG" is in advance decided based on experiments, in which the air-fuel ratios of the mixture and the intake air amounts for the high-amplitude operation are changed as parameters. Furthermore, the predetermined time "kSOXNG" is set as a maximum time for the assumed average response delay time for the high-amplitude operation, when the response delay time and/or dead-time of the oxygen sensor 28 is not excessively elongated.

Namely, in an initial stage of the three-way catalyst 24 (that is, when a product is shipped), the response delay time becomes longer, because the maximum oxygen trapping amount of the catalyst is not decreased due to deterioration under the aging phenomena. On the other hand, the maximum oxygen trapping amount of the catalyst is decreased in a condition that the three-way catalyst 24 is deteriorated due to the aging. Therefore, the response delay time becomes a shorter value between one-third and one-fifth of the response delay time in the initial stage. Therefore, the predetermined time "kSOXNG" is set as a minimum time from a fuel decrease control, within which the output of the oxygen sensor 28 is surely reversed, even in the initial stage of the three-way catalyst 24. As a result, the fuel decrease time can be set as a smaller value as possible.

The case, in which the response delay time and/or the dead-time of the oxygen sensor 28 is not excessively elongated, may be defined based on the response delay time and/or the dead-time of the oxygen sensor 28 when the emission characteristic comes on the edge of tolerance levels.

When the process of the step S182 is completed, the ECU 37 sets, at a step S184, the additional amount of the predetermined time "kSOXNG" and the threshold value "kCATOK" as the maximum measuring time "tsoxang" for the response delay time in the low-amplitude operation. The step S184 corresponds to the step S180.

In case of NO at the step S174 or when the process at the step S180 or S184 is ended, the process of FIG. 15 is ended.

A case, in which the determination at the step S176 is NO, corresponds to, for example, a case in which a process for the deterioration diagnosis is carried out for the first time for the three-way catalyst 24 after shipping.

Figure 16:
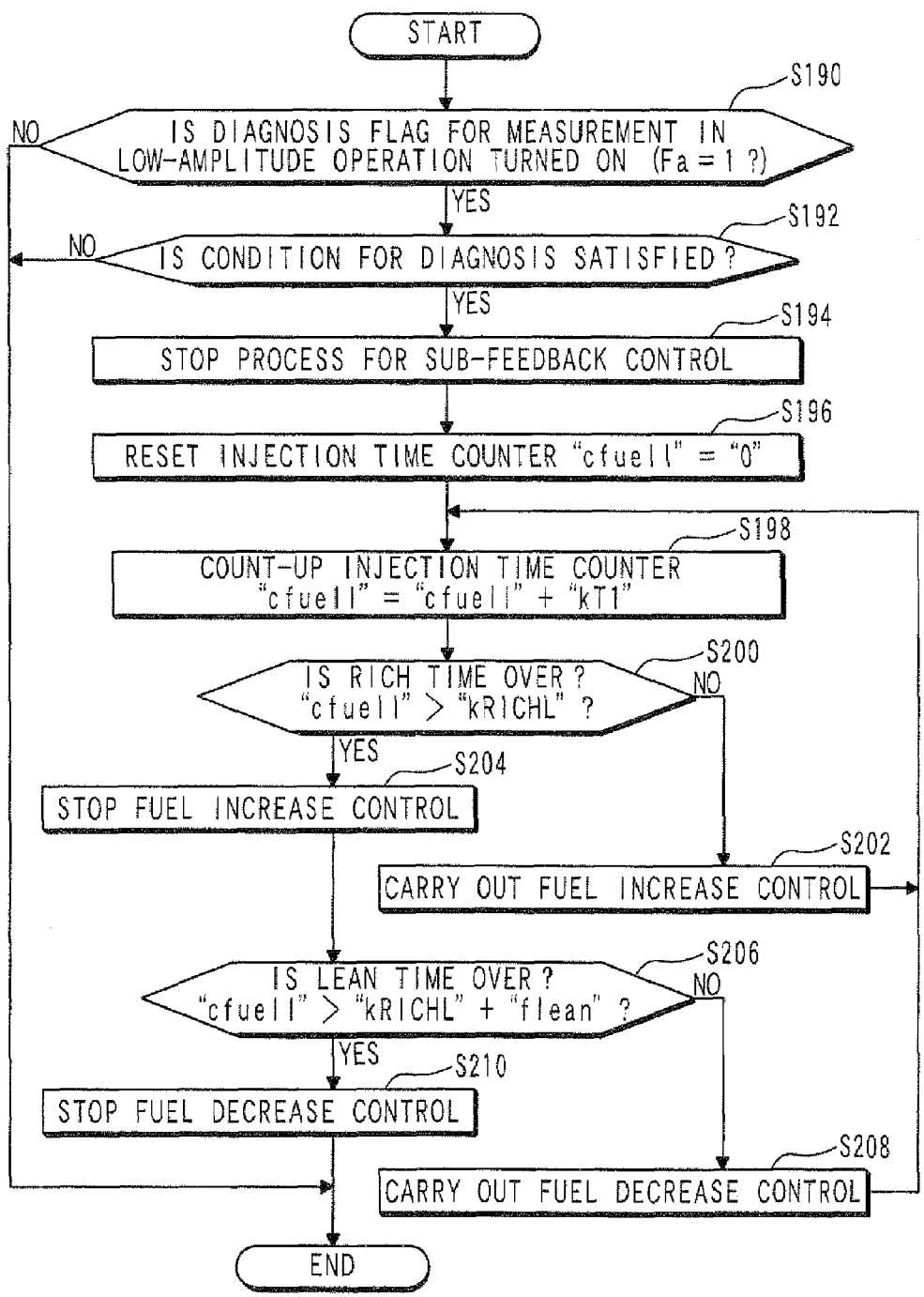
FIG. 16 is a flow-chart showing a process for setting a target air-fuel ratio for a low-amplitude operation according to the fourth embodiment.

FIG. 16 shows a process for setting a target air-fuel ratio for the low-amplitude operation.

At first, the ECU 37 determines at a step S190 whether the diagnosis flag "Fa" for the measurement of the average response delay time in the low-amplitude operation is turned ON (Fa=1). When the diagnosis flag "Fa" is turned ON, the process goes to a step S192 and the ECU 37 determines whether the condition for carrying out the diagnosis is satisfied or not. According to the present embodiment, the condition for carrying out the diagnosis at the step S192 is defined as the same condition to the step S32 of FIG. 5. When the condition for carrying out the diagnosis is satisfied, the process goes to a step S194, at which the ECU 37 stops the process for the sub-feedback control, as in the same manner to the step S34 of FIG. 5. At a step S196 following the step S194, the ECU 37 resets an injection time counter "cfuel1" to "0", before counting the time period for the fuel increase or the fuel decrease, in order to control the target air-fuel ratio for a predetermined period at such a value for carrying out the diagnosis for the catalyst deterioration. When the step S196 is completed, the process goes to a step S198.

At steps S198 to 210, a fuel increase control and a fuel decrease control for the fuel injection amount are carried out in order to skip the target air-fuel ratio from the rich side to the lean side (or vice versa) for the diagnosis operation of the catalyst deterioration. More exactly, at the step S198, a predetermined value "kT1" is added to the injection time counter "cfuel1", which counts a time during which the fuel injection amount is changed. According to the present embodiment, the predetermined value "kT1" is set as such a value equal to the process cycle for the process of FIG. 16.

At a step S200, the ECU 37 determines whether a predetermined fuel increase time for the fuel injection amount (hereinafter also referred to as a rich time "kRICHL") has passed over since the fuel increase control was carried out by skipping the target air-fuel ratio to the rich side. The rich time "kRICHL" is set in advance, based on experiments, as such a value with which the oxygen trapping amount of the catalyst is controlled at a reference amount. The rich time "kRICHL" varies depending on parameters, such as the intake air amount, the air-fuel ratio of the mixture.

When the rich time "kRICHL" has not yet passed over, the process goes to a step S202 in order that the fuel increase control is continuously carried out until the rich time "kRICHL" passes over. In case of YES at the step S200, the process goes to a step S204, at which the fuel increase control is stopped. Then, the process goes to a step S206.

At the step S206, the ECU 37 determines whether the lean time "flean", which is set at the process of the step S178 or S182 of FIG. 15, has passed over after the fuel decrease control was carried out by skipping the target air-fuel ratio to the lean side. When the lean time "flean" has not yet passed over, the process goes to a step S208 in order that the fuel decrease control is continuously carried out until the lean time "flean" passes over. In case of YES at the step S206, the process goes to a step S210, at which the fuel decrease control is stopped. Then, the process for the fuel increase control and fuel decrease controls is terminated.

In case of NO at the step S190 or S192, or when the process at the step S210 is ended, the process of FIG. 16 is ended.

The oxygen trapping amount of the three-way catalyst 24 at the starting point of measuring the response delay time varies depending on the rich time "kRICHL". Accordingly, it is desirable to independently set the rich time "kRICHL" and the lean time "flean", in order to surely reverse the output of the oxygen sensor 28 from the rich side to the lean side during the process of measuring the response delay time.

Figure 17A:
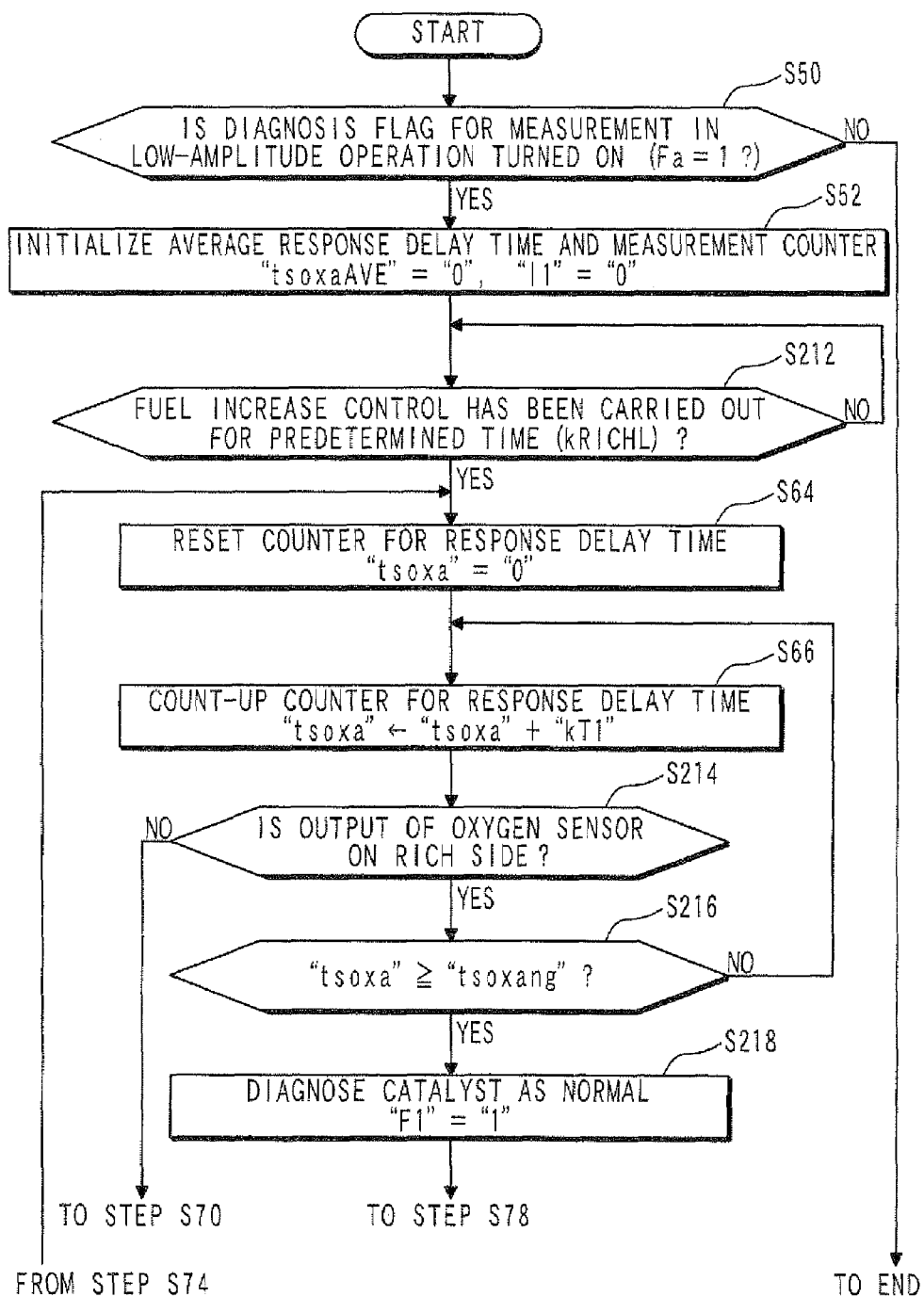
FIGS. 17A and 17B are flow-charts showing a process for measuring response delay time for the low-amplitude operation according to the fourth embodiment.
Figure 17B:
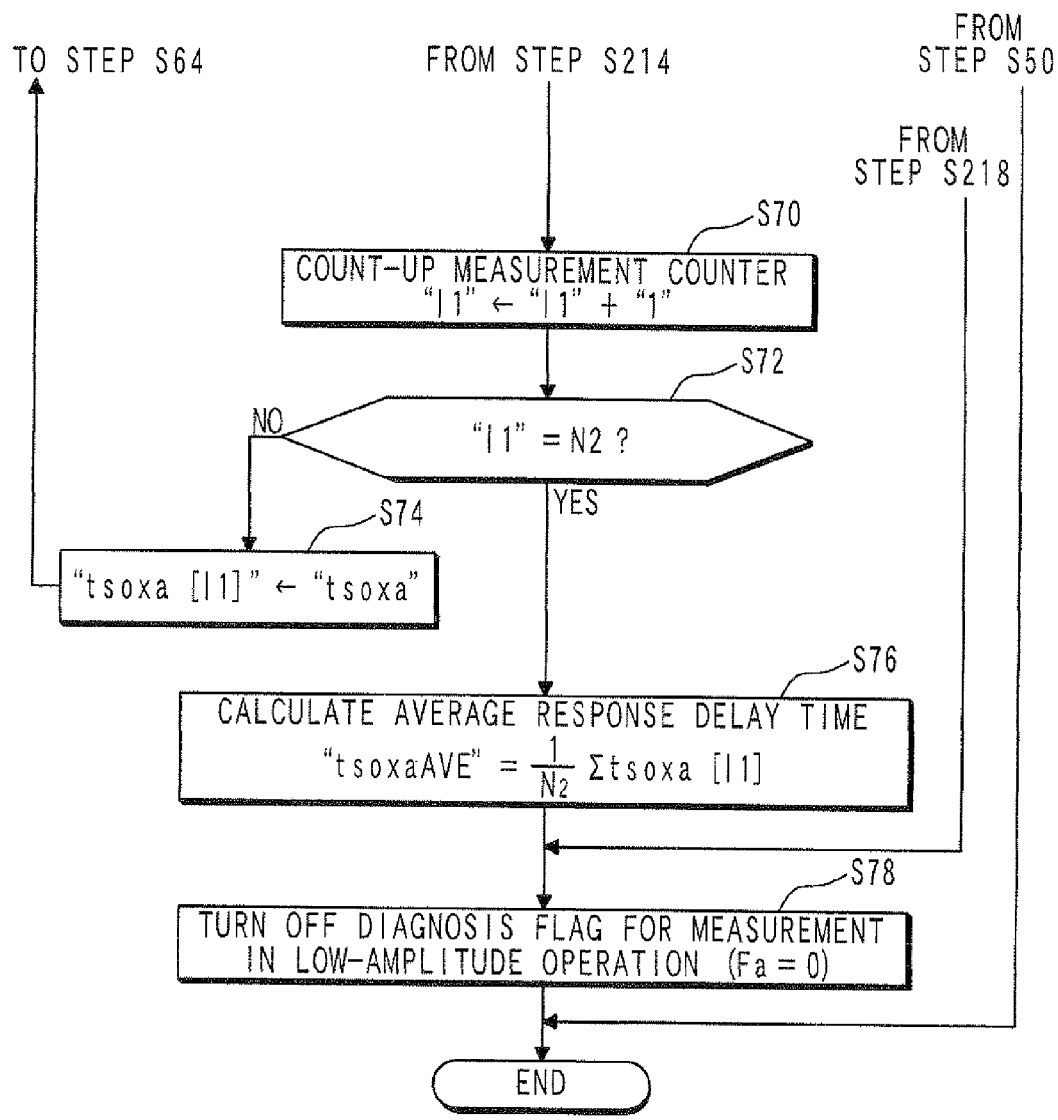

FIGS. 17A and 17B show a process for measuring the response delay time for the low-amplitude operation.

When the process of the step S52 is finished, at a step S212, the ECU 37 determines whether the fuel increase control is carried out for the predetermined time (the rich time "kRICHL") or not, in order to control the oxygen trapping amount at the predetermined reference amount. In other words, the ECU 37 waits ready until the fuel increase control is carried out according to the steps S200 to S204 of FIG. 16 for the rich time "kRICHL". When the fuel increase control is finished, the process goes to the step S64, at which the ECU 37 resets the counter "tsoxa" for the response delay time to "0", before starting with the measurement of the response delay time. In the measurement, the time point of fuel injection amount being decreased (at the step S208 of FIG. 16) is set as the starting point for the measurement of the response delay time in the lean control operation.

When the process at the step S64 is finished, the predetermined number "kT1" is added to the counter "tsoxa" for the response delay time at the step S66. At a step S214, the ECU 37 determines whether the output of the oxygen sensor 28 is on the rich side or not. When the output of the oxygen sensor 28 is on the rich side, the process goes to a step S216, at which the ECU 37 determines whether the time "tsoxa" from starting the measurement of the response delay time passes over the maximum measuring time "tsoxang", which is set at the step S180 or S184 of FIG. 15. This step is a process for diagnosing whether the three-way catalyst 24 is in the normal condition or not, as quickly as possible.

When the time "tsoxa" has not yet passed over the maximum measuring time "tsoxang", the process goes back to the step S66. On the other hand, when YES at the step S216, the process goes on to a step S218. At the step S218, the ECU 37 determines that the three-way catalyst 24 is in the normal condition and turns on the diagnosis record flag "F1" to "1". This is the step for stopping the deterioration process for the three-way catalyst 24, when the three-way catalyst 24 is diagnosed as being in the normal condition. Namely, the threshold value "kCATOK" of the step S20 in FIG. 14 is defined as such a value for determining the deterioration of the three-way catalyst 24. Accordingly, when the response delay time for the low-amplitude operation is longer than the maximum measuring time "tsoxang", the three-way catalyst 24 is diagnosed as being in the normal condition. Therefore, the ECU 37 can diagnose that the three-way catalyst 24 is in the normal condition, as quickly as possible, based on the phenomena that the output of the oxygen sensor 28 is not changed from the rich side to the lean side within the maximum measuring time "tsoxang". When the process of the step S218 is finished, the process goes to the step S78.

In case of NO at the step S214, the process goes to the step S70 so that the process of the steps S70 to S78, which are the same to the steps S70 to S78 of FIG. 6B, is carried out.

In case of NO at the step S50, or when the process at the step S78 is finished, the process of FIGS. 17A and 17B is ended.

Figure 18:
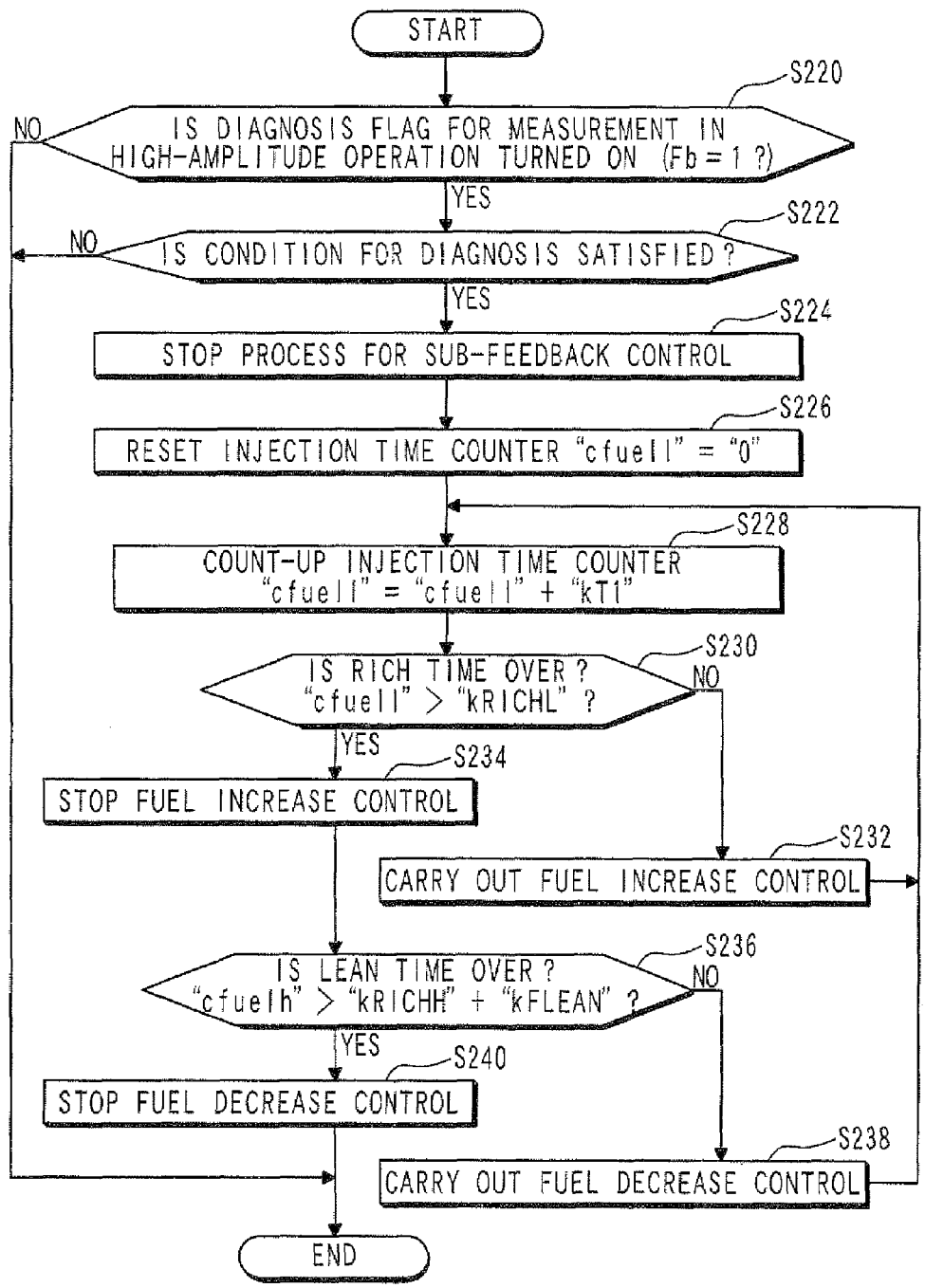
FIG. 18 is a flow-chart showing a process for setting a target air-fuel ratio for a high-amplitude operation according to the fourth embodiment.

FIG. 18 shows a process for setting a target air-fuel ratio for the high-amplitude operation.

When the ECU 37 determines, at a step S220, that the diagnosis flag "Fb" for the measurement of the average response delay time in the high-amplitude operation is turned ON (Fb=1), a process of steps S222 to S240, which correspond to the steps S192 to S210 of FIG. 16, is carried out so that the fuel increase control and fuel decrease control for the fuel injection amount are carried out. The fuel increase control as well as the fuel decrease control is carried out in such a manner that the skipping amount of the target air-fuel ratio for the high-amplitude operation to the rich side or to the lean side is larger than the skipping amount of the target air-fuel ratio for the low-amplitude operation to the rich side or to the lean side. The lean time "kFLEAN" at a step S236 is defined as such a value equal to the predetermined time "kSOXNG" at the step S182 or S184 of FIG. 15. As explained already, the predetermined time "kSOXNG" is set as the minimum time, within which the output of the oxygen sensor 28 is surely reversed, even in the initial stage of the three-way catalyst 24.

A rich time "kRICHH" at a step S230, which corresponds to the step S200 of FIG. 16, is set, in advance based on experiments, as a value with which the oxygen trapping amount of the catalyst can be controlled at the reference amount. The rich time "kRICHH" varies depending on parameters of the intake air amount, or the air-fuel ratio of the mixture.

In case of No at the step S220 or S222, or when the process at the step S240 is finished, the process of FIG. 18 is ended.

Figure 19B:
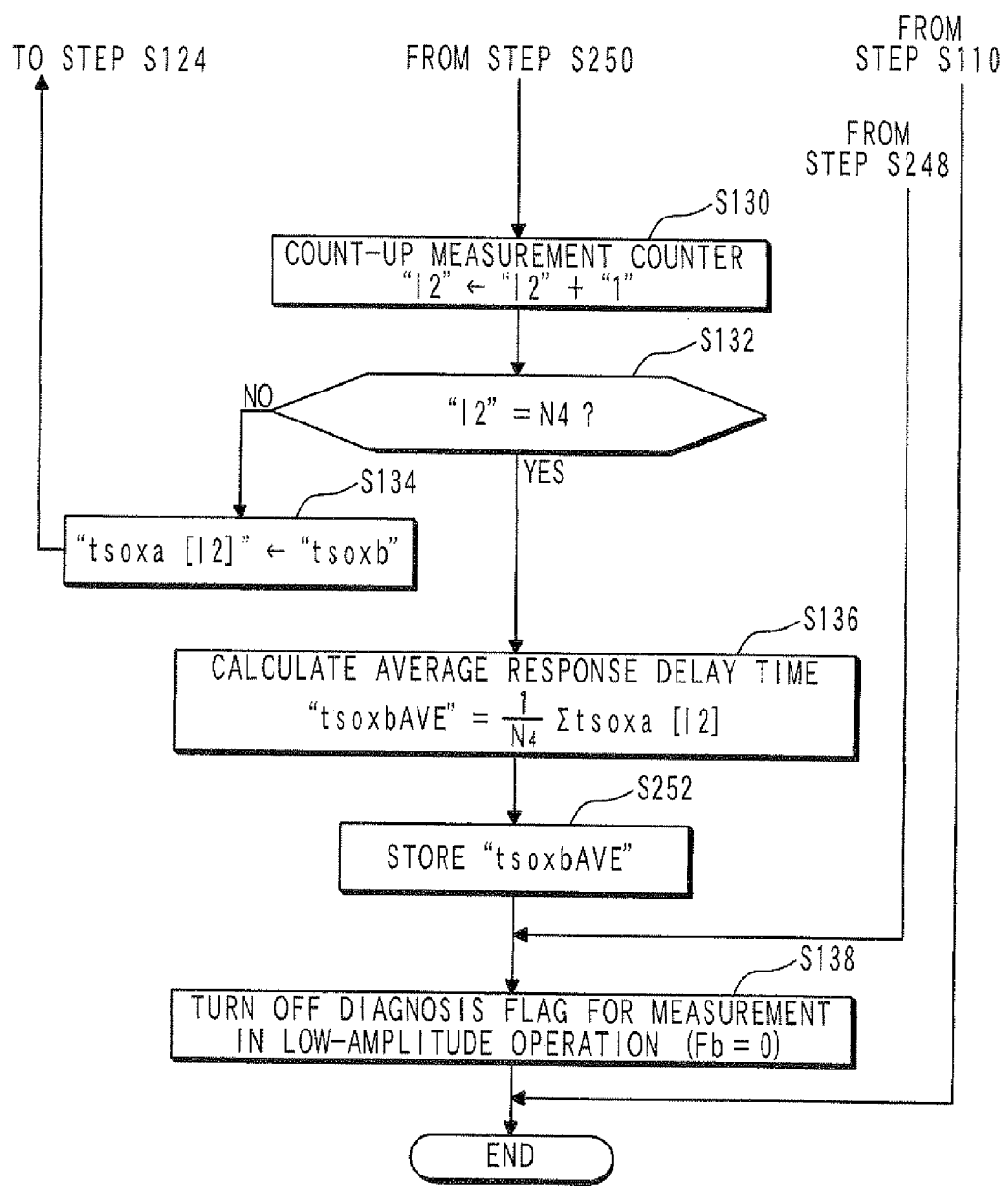

FIGS. 19A and 19B show a process for measuring the response delay time for the high-amplitude operation and for diagnosing characteristic of the oxygen sensor 28.

When the process of the step S112 is finished, at a step S242, the ECU 37 determines whether the fuel increase control is carried out for the predetermined time (the rich time "kRICHH"), in order to control the oxygen trapping amount of the catalyst at the predetermined reference amount. In other words, the ECU 37 waits ready until the fuel increase control is carried out according to the steps S230 to S234 of FIG. 18 for the rich time "kRICHH". When the fuel increase control is finished, the process goes to the step S124, at which the ECU 37 resets the counter "tsoxb" for the response delay time to "0", before starting with the measurement for the response delay time. In the measurement, the time point of fuel injection amount being decreased (at the step S238 of FIG. 18) is set as the starting point for the measurement of the response delay time in the lean control operation. Then, the process goes to the step S126.

At steps S126 to S250, the ECU 37 diagnoses the characteristic of the oxygen sensor 28 in addition to the measurement of the response delay time. More exactly, at the step S126, the predetermined number "kT1" is added to the counter "tsoxb" for the response delay time. At a step S244, the ECU 37 determines whether the output of the oxygen sensor 28 is on the rich side. When the output of the oxygen sensor 28 is on the rich side, the process goes to a step S246, at which the ECU 37 determines whether the time "tsoxb" from starting the measurement of the response delay time passes over the predetermined time "kSOXNG", which is used at the step S182 or S184 of FIG. 15. This step is a process for determining whether the response delay time or the dead-time of the oxygen sensor 28 is excessively elongated or not. As explained above, the predetermined time "kSOXNG" is set as such time, within which the output of the oxygen sensor 28 is surely reversed from starting the fuel decrease control, in the case that the response delay time or the dead-time of the oxygen sensor 28 is not excessively elongated. Therefore, when the output of the oxygen sensor 28 is not changed within this time "kSOXNG", the ECU 37 determines that the response delay time or the dead-time of the oxygen sensor 28 is excessively elongated.

When the time "tsoxb" from starting the measurement of the response delay time has not yet passed over the predetermined time "kSOXNG", the process goes back to the step S126. On the other hand, when YES at the step S246, the process goes on to a step S248. At the step S248, the ECU 37 determines that the characteristic of the oxygen sensor 28 is in the abnormal condition (that is, the response delay time or the dead-time is excessively elongated). Then, the engine check lamp is turned on to inform the vehicle driver of the abnormal condition of the oxygen sensor 28. As a result, the determination at the step S170 of FIG. 14 becomes NO, so that the deterioration diagnosis for the three-way catalyst 24 is prohibited until the oxygen sensor 28 is repaired. When the process of the step S248 is finished, the process goes to the step S138.

When the ECU 37 determines at the step S244 that the output of the oxygen sensor 28 is reversed to the lean side within the predetermined time "kSOXNG" from starting the measurement of the response delay time, the process goes to a step S250, at which the ECU 37 diagnoses that the characteristic of the oxygen sensor 28 is in the normal condition (that is, the response delay time or the dead-time is not excessively elongated). When the process of the step S250 is finished, the steps S130 to S136 (FIG. 19B) which are the same to those of FIG. 8B are carried out.

At a step S252, the average response delay time "tsoxbAVE" for the high-amplitude operation is stored in the memory device. This step S252 is provided so that the average response delay time "tsoxbAVE" is used at the step S176 of FIG. 15. The memory device means such a memory, which can hold its stored information independently of a current supply condition (that is, for example, a switching condition of an ignition switch provided between the ECU 37 and a power supply source, such as a battery, an alternator, etc.). The memory device is, for example, a non-volatile memory device, such as EEPROM, or a back-up RAM to which electric power is continuously supplied independently of the switching condition of the ECU 37 to the power supply source. When the process of the step S252 is finished, the process goes to the step S138.

In case of No at the step S110, or when the process at the step S138 is finished, the process of FIGS. 19A and 19B is ended.

FIGS. 20A to 20B show examples for setting the target air-fuel ratio for the deterioration diagnosis of the catalyst and for diagnosing the oxygen sensor 28 and the three-way catalyst 24 during the operation for measuring the response delay time. More exactly, FIG. 20A shows the transition of the target air-fuel ratio for the high-amplitude operation and FIG. 20B shows the transition of the output of the oxygen sensor 28 during the high-amplitude operation.

As shown in the drawings, the lean-skip of the air-fuel ratio is carried out at a time point "t1" and the fuel decrease control is continuously carried out for the lean time "kFLEAN" until a time point "t3". As indicated by a solid line in FIG. 20B, the response delay time from the time point "t1" (at which the fuel decrease control begins) to a time point "t2" (at which the output of the oxygen sensor 28 is reversed from the rich side to the lean side) is measured.

In FIG. 20B, the output of the oxygen sensor 28 which is in the normal condition is indicated by the solid line, whereas the output of the oxygen sensor 28 which is in the abnormal condition is indicated by a dotted line. When the characteristic of the oxygen sensor 28 is in the abnormal condition, the output of the oxygen sensor is not changed at the time point "t3" even after the predetermined time "kSOXNG". In this situation, the ECU 37 diagnoses at the step S248 of FIG. 19A that the characteristic of the oxygen sensor 28 is in the abnormal condition, so as to prohibit the deterioration diagnosis for the three-way catalyst 24.

As above, according to the present embodiment, it is possible to prohibit the deterioration diagnosis for the three-way catalyst 24 when the characteristic of the oxygen sensor 28 is in the abnormal condition, and thereby to avoid a situation in which the emission characteristic would become worse.

FIG. 20C shows the transition of the target air-fuel ratio for the low-amplitude operation and FIG. 20D shows the transition of the output of the oxygen sensor 28 during the low-amplitude operation.

As shown in the drawings, the lean-skip of the air-fuel ratio is carried out at the time point "t1" and the fuel decrease control is continuously carried out for the lean time "flean" until the time point "t3". As indicated by a solid line in FIG. 20D, the output of the oxygen sensor 28 is not reversed at the time point "t3" even after the maximum measuring time "tsoxang" from the time point "t1" (at which the fuel decrease control started). Accordingly, the ECU 37 can diagnose at the step S218 of FIG. 17A that the three-way catalyst 24 is in the normal condition, as quickly as possible.

In FIG. 20D, the output of the oxygen sensor 28 which is not deteriorated is indicated by a solid line. On the other hand, the output of the oxygen sensor 28, the maximum oxygen trapping amount of which is decreased due to the aged deterioration, is indicated by a dotted line. When the maximum oxygen trapping amount of the three-way catalyst 24 is decreased, the output of the oxygen sensor 28 is reversed from the rich side to the lean side at the time point "t2", which is shorter than the maximum measuring time "tsoxang". In other words, the time point "t2" comes earlier than the time point "t3".

The fuel decrease time (that is, the lean time "flean") for the low-amplitude operation is set in accordance with the average response delay time "tsoxbAVE" for the high-amplitude operation stored in the memory device. Accordingly, it is possible to make the fuel decrease time (the lean time "flean") as shorter as possible depending on the condition of the three-way catalyst 24, and thereby it is possible to suppress the deterioration of the emission characteristic during the operation for the deterioration diagnosis for the catalyst.

According to the present embodiment, there are following advantages (A12) to (A16) in addition to the advantages (A1) to (A4), (A6) and (A7) for the first embodiment:

(A12) When the output of the oxygen sensor 28 is not reversed within the predetermined time "kSOXNG" from the starting of the fuel decrease control for the high-amplitude operation, the ECU 37 diagnoses that the characteristic of the oxygen sensor 28 is in the abnormal condition and prohibits the deterioration diagnosis for the three-way catalyst 24 thereafter. As a result, it is possible to avoid the situation in which the emission characteristic is deteriorated.

(A13) The additional amount of the average response delay time "tsoxbAVE" for the high-amplitude operation and the threshold value "kCATOK" is defined as the fuel decrease time (the lean time) "flean" for the low-amplitude operation. As a result, it becomes possible to make the fuel decrease time (the lean time) "flean" after the lean-skip of the target air-fuel ratio as short as possible. In addition, it becomes possible to suppress the deterioration of the emission characteristic during the deterioration diagnosis for the catalyst.

(A14) In the case that the average response delay time "tsoxbAVE" for the high-amplitude operation is not yet measured, the additional amount of the predetermined time "kSOXNC" and the threshold value "kCATOK" is defined as the fuel decrease time (the lean time) "flean" for the low-amplitude operation. As a result, it is possible to suppress the deterioration of the emission characteristic, and at the same time to increase the frequency for the deterioration diagnosis of the catalyst.

(A15) When the output of the oxygen sensor 28 is not reversed to the lean side during the maximum measuring time "tsoxang" from the time of starting the measurement for the response delay time in the low-amplitude operation, the ECU 37 diagnoses that the three-way catalyst 24 is in the normal condition. As a result, the ECU 37 can diagnose that the three-way catalyst 24 is in the normal condition, as quickly as possible.

(A16) When the target air-fuel ratio for the deterioration diagnosis of the catalyst is set, the target air-fuel ratio is changed by the skip control. As a result, it is possible to suppress an increase of a number of adjusting elements for setting the target air-fuel ratio.

(Fifth Embodiment)

is A fifth embodiment will be explained with reference to the drawing, wherein different points from the fourth embodiment are mainly explained.

According to the fifth embodiment, the fuel decrease control is carried out by fuel-cut to the engine 19 during the operation 20 of measuring the response delay time for the high-amplitude operation.

Figure 21A:
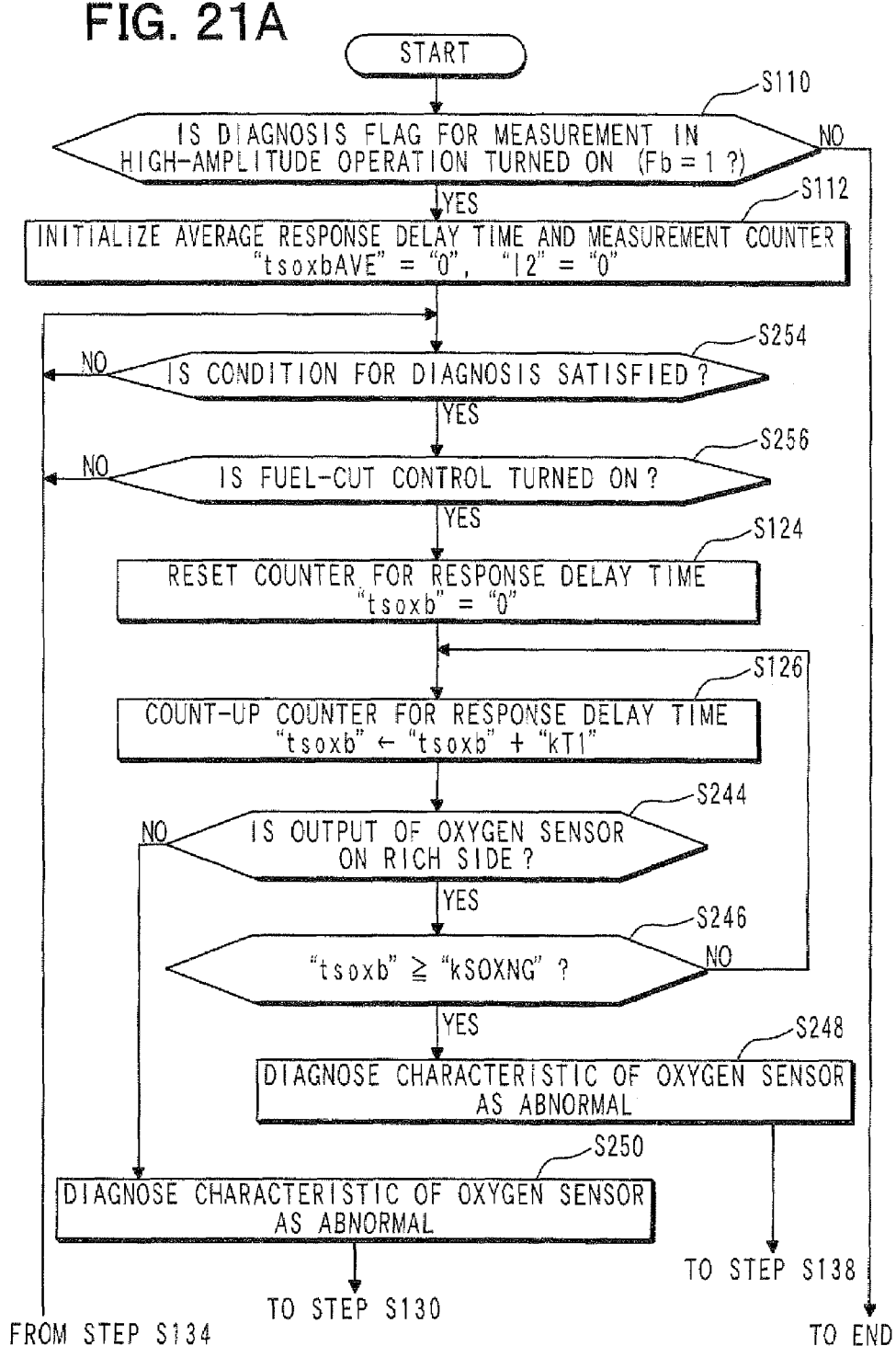
FIGS. 21A and 21B are flow-charts showing a process for measuring response delay time for the high-amplitude operation and a process for diagnosing characteristic of an oxygen sensor, according to a fifth embodiment.
Figure 21B:
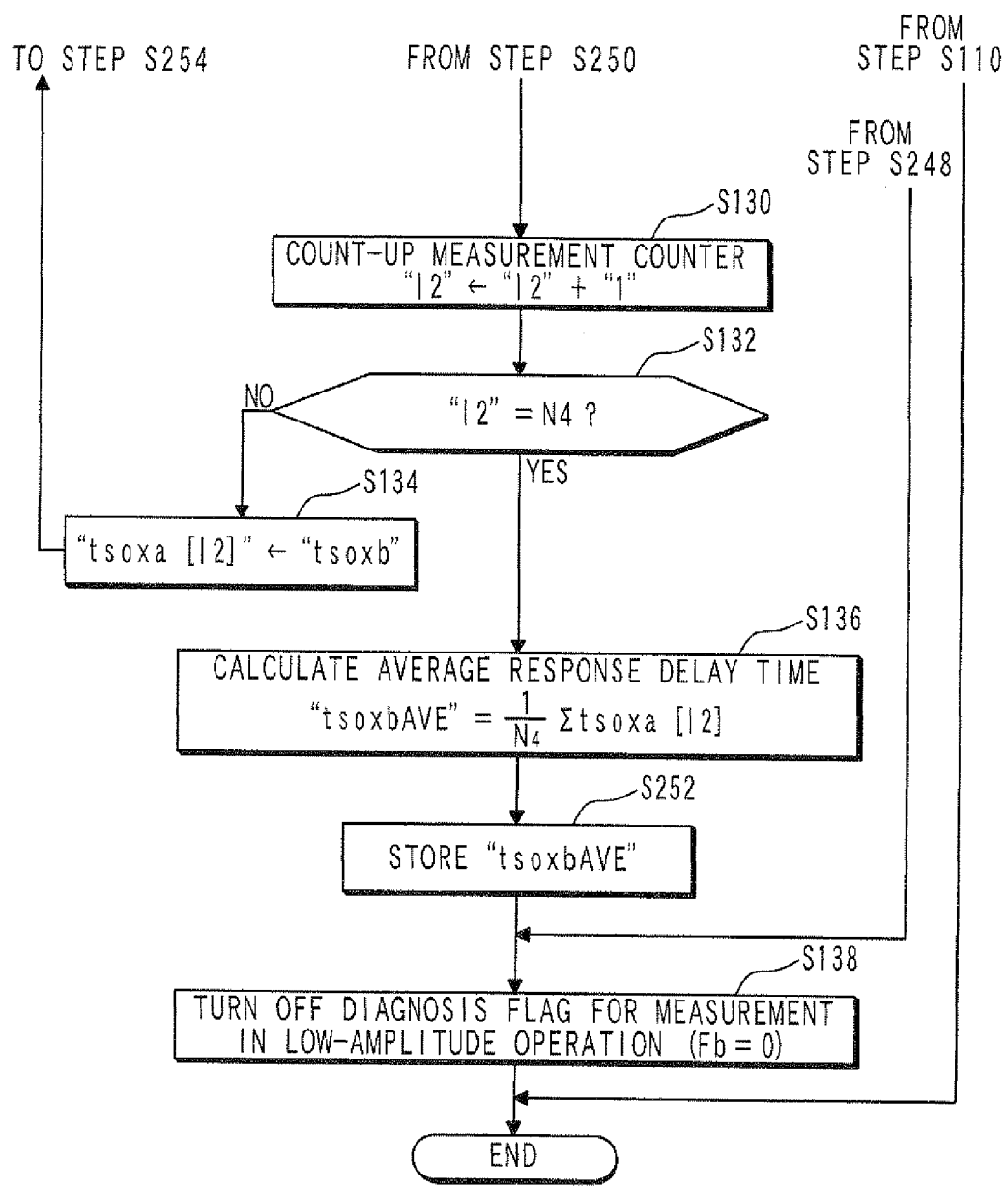

FIGS. 21A and 21B show a process for setting the target air-fuel ratio for the high-amplitude operation according to the present embodiment. This process is repeatedly carried out by the ECU 37, for example, at a predetermined cycle. The same reference numerals of FIGS. 19A and 19B are given to the steps of FIGS. 21A and 21B, which are the same to those of FIGS. 19A and 19B.

When the process of the step S112 is finished, the ECU 37 determines at a step S254 whether the condition for diagnosis is satisfied or not. The condition for diagnosis at the step S254 is the same to that for the step S160 of FIG. 12.

In case of YES at the step S254, the process goes to a step S256, at which the ECU 37 determines whether the fuel-cut control is turned ON or not. In case of NO at the step S256, the process goes back to the step S254. On the other hand, when the determination at the step S256 is YES, the process goes to the step S124, so that the process of the steps S124 to S138, which are the same to the steps S124 to S138 of FIGS. 19A and 19B, is carried out.

In case of NO at the step S110, or when the process at the step S138 is finished, the process of FIGS. 21A and 21B is ended.

According to the present embodiment, the fuel decrease control is carried out by the fuel-cut. Therefore, in a situation in which a number of the fuel-cut operation is decreased, it may be concerned that the frequency for measuring the average response delay time "tsoxbAVE" for the high-amplitude operation would be likewise decreased. According to the present embodiment, however, the fuel decrease time (the lean time "flean") for the low-amplitude operation is set by the step S182 of FIG. 15. Therefore, it is possible not only to suppress the deterioration of the emission characteristic, but also to increase the frequency for the deterioration diagnosis of the catalyst.

(Sixth Embodiment)

A sixth embodiment will be explained with reference to the drawing, wherein different points from the fourth embodiment are mainly explained.

When the output of the oxygen sensor 28 is reversed, it is supposed that excessive oxygen trapping amount of the three-way catalyst 24 is saturated or the trapped oxygen is fully discharged. Therefore, when the output of the oxygen sensor 28 is reversed within the rich time ("kRICHH" or "kRICHL") or the lean time ("kFLEAN" or "flean"), the air-fuel ratio of the mixture is displaced from the theoretical air-fuel ratio as a result of the continuous fuel increase or fuel decrease control even in a time period from the reverse of the output of the oxygen sensor 28 to a timing at which the rich time or the lean time passes over. The three-way catalyst 24 may not be able to absorb the influence caused by the displacement of the air-fuel ratio from the theoretical air-fuel ratio, and thereby the emission characteristic may be deteriorated.

According to the present embodiment, when the output of the oxygen sensor 28 is reversed from the lean to the rich side during the rich time (in which the target air-fuel ratio is set at the rich side), the target air-fuel ratio is forcibly changed to the other side, namely to the lean side, even before the end of the rich time. In the same manner, when the output of the oxygen sensor 28 is reversed from the rich to the lean side during the lean time (in which the target air-fuel ratio is set at the lean side), the target air-fuel ratio is forcibly changed to the other side, namely to the rich side, even before the end of the lean time.

FIG. 22 shows a process for setting the target air-fuel ratio in the low-amplitude operation according to the present embodiment. This process is repeatedly carried out by the ECU 37, for example, at a predetermined cycle. The same reference numerals of FIG. 16 are given to the steps of FIG. 22, which are the same to those of FIG. 16. Although FIG. 22 shows the process for setting the target air-fuel ratio in the low-amplitude operation, the idea of FIG. 22 can be likewise applied to a process for setting the target air-fuel ratio in the high-amplitude operation.

When the ECU 37 determines at the step S200 that the rich time "kRICHL" has not yet passed over, the process goes to a step S260 to determine whether the output of the oxygen sensor 28 is reversed from the lean side to the rich side. When the output of the oxygen sensor 28 is not reversed, the process goes to the step S202, while the process goes to the step S204 in case of YES at the step S260.

When the ECU 37 determines at the step S206 that the lean time "flean" has not yet passed over, the process goes to a step S262 to determine whether the output of the oxygen sensor 28 is reversed from the rich side to the lean side. When the output of the oxygen sensor 28 is not reversed, the process goes to the step S208, while the process goes to the step S210 in case of YES at the step S262.

In case of NO at the step S190 or S192, or when the process at the step S210 is finished, the process of FIG. 22 is ended.

According to the present embodiment, it is possible to make the time period, in which the excessive oxygen trapping amount of the three-way catalyst 24 is saturated or the trapped oxygen is fully discharged, as shorter as possible. Therefore, it is possible to suppress the deterioration of the emission characteristic during the operation of the deterioration diagnosis for the catalyst.

(Other Embodiments)

The above embodiments may be modified in various manners as below.

(M1) In the first embodiment, the response delay time is measured as such time period, from the time point at which the fuel injection amount is decreased as a result of the lean-skip of the target air-fuel ratio to the time point at which the output of the oxygen sensor 28 is reversed from the rich side to the lean side. The measurement of the response delay time is not limited to the above method, but may be carried out based on the function of the three-way catalyst 24 for discharging the trapped oxygen. Namely, the response delay time may be measured as such a time period, from a time point at which the fuel injection amount is increased as a result of the rich-skip of the target air-fuel ratio to a time point at which the output of the oxygen sensor 28 is reversed from the lean side to the rich side.

(M2) In the first embodiment, the time point at which the fuel injection amount is changed is defined as the starting time point for measuring the response delay time. However, as explained in the second embodiment, the time point, at which the output of the A/F sensor 26 is changed as a result of the change of the fuel injection amount, may be defined as the starting time point for measuring the response delay time.

(M3) In the first embodiment, the condition that the engine rotational speed as well as the intake air amount is within the predetermined value is defined as one of the conditions for carrying out the deterioration diagnosis, so that the deterioration diagnosis can be carried out in the condition in which the exhaust gas amount is in the same level. However, in the case any means or device for detecting or estimating the exhaust gas amount is provided, a condition that the exhaust gas amount detected or estimated by such means or device is within a predetermined value may be defined as one of the conditions for carrying out the deterioration diagnosis.

(M4) In the first embodiment, the average response delay time is calculated as the simple moving average value for the response delay times which are measured by several times. A weighted moving average value may be used. Furthermore, the average value may be calculated in a manner that the maximum value and the minimum value may be eliminated from the response delay times which are measured by several times.

(M5) In the first embodiment, the intake air amount is calculated based on the output of the air flow meter 14. In a system, in which an intake air pressure sensor is provided at a downstream side of the throttle valve 16, the intake air amount may be calculated based on the outputs from the intake air pressure sensor, the crank angle sensor 32 and a sensor for detecting an opening degree of the throttle valve 16.

(M6) In the first embodiment, the target air-fuel ratio is controlled by the skip control and the slow-change control (in which the air-fuel ratio is gradually changed). However, the slow-change control may be carried out only for a period, in which the target air-fuel ratio is changed from the rich side to the lean side or vice versa by several times before starting the measurement of the response delay time. If, in the above period, displacement of the air-fuel ratio caused by characteristic fluctuation of the A/F sensor 26 is detected and the target air-fuel ratio is set depending on such detected displacement, the target air-fuel ratio may be set only by the skip control.

(M7) In the second embodiment, the A/F sensor 26 is provided at the upstream side of the three-way catalyst 24, and the starting time point for the measurement of the response delay time is decided based on the output from the A/F sensor 26. An oxygen sensor may be used instead of the A/F sensor.

(M8) In the second embodiment, the deterioration diagnosis for the three-way catalyst 24 is carried out during the normal operating period of the engine 19 in addition to the specified period. However, the deterioration diagnosis may be carried out only during the normal operating period of the engine 19.

(M9) In the second embodiment, the fuel increase or fuel decrease control is carried out by use of a period before or after starting the fuel-cut control. However, the fuel increase or fuel decrease control may be carried out by use of the function of the three-way catalyst 24 for discharging the trapped oxygen. Namely, a period before or after terminating the fuel-cut control may be also used for the fuel decrease or fuel increase control.

(M10) In the third embodiment, the cycle of reverse for the output of the oxygen sensor is defined as the value corresponding to the response delay time. The response delay time is calculated based on the measurement of the cycle of reverse for the output of the oxygen sensor. In a system, in which the skip control for the target air-fuel ratio is carried out depending on the reverse of the output of the oxygen sensor 28, the output of the A/F sensor 26 is alternately changed from the rich to the lean side, or vice versa, as a result of the skip control. Therefore, a cycle of the change of the output from the A/F sensor 26, from the rich to the lean side or vice versa, may be defined as the value corresponding to the response delay time. And the response delay time may be calculated based on the measurement of the cycle of reverse for the output of the A/F sensor.

(M11) In the fourth embodiment, the fuel increase control is carried out by once during the predetermined time ("kRICHH" or "kRICHL") in order to control the oxygen trapping amount of the three-way catalyst 24 at the reference amount, at the step S200 of FIG. 16 or the step S230 of FIG. 18. However, the fuel increase control and the fuel decrease control may be carried out by several times so as to control the oxygen trapping amount of the three-way catalyst 24 at the reference amount.

(M12) According to the fourth embodiment, in the case of measuring the response delay time for the low-amplitude operation, when the time period during which the output of the oxygen sensor 28 is continuously held at the rich side is longer than the maximum measuring time "tsoxang", the ECU 37 determines that the three-way catalyst 24 is in the normal condition. However, the ECU 37 may determine that the three-way catalyst 24 is not in the normal condition, when the output of the oxygen sensor 28 is reversed from the rich side to the lean side during the period of the maximum measuring time "tsoxang" (="tsoxbAVE"+"kCATOK") from the starting point of the measurement of the response delay time, provided that the average response delay time for the high-amplitude operation has been calculated. As a result, it is possible to inform the vehicle driver of the condition of the three-way catalyst 24 as quickly as possible.

(M13) In the fifth embodiment, the characteristic of the oxygen sensor 28 is diagnosed at the steps S126 to S250 of FIG. 21 (which correspond to the steps S126 to S250 of FIG. 19) in the course of the operation for measuring the response delay time for the high-amplitude operation. In the case the measurement of the response delay time for the low-amplitude operation is carried out before the measurement of the response delay time for the high-amplitude operation, the characteristic of the oxygen sensor 28 may be diagnosed in the course of the operation for measuring the response delay time for the low-amplitude operation. This diagnosis for the characteristic of the oxygen sensor 28 can be carried out, for example, by determining that the response delay time or the dead-time of the oxygen sensor 28 is excessively elongated, when the time period until the output of the oxygen sensor 28 is reversed is longer than a predetermined time. The predetermined time may be set based on a time from the starting point of the fuel decrease control, within which the output of the oxygen sensor 28 can be surely reversed from the rich side to the lean side, in the case that the response delay time and the dead-time of the oxygen sensor are not excessively elongated and the three-way catalyst 24 is in the initial condition. The predetermined time can be decided based on the experiments, wherein the air-fuel ratio of the mixture set for the low-amplitude operation and the intake air amount are used as parameters. As a result, it is possible to diagnose the characteristic of the oxygen sensor 28 as quickly as possible, even when the response delay time is measured in the low-amplitude operation before the measurement of the response delay time in the high-amplitude operation.

(M14) In the above fourth to sixth embodiments, the average response delay time for the high-amplitude operation is stored in the memory device, whenever it is measured. However, it may be so modified that the average response delay time for the high-amplitude operation will not be memorized, when the measured value of this time is longer than the predetermined time "kSOXNG". Namely, the maximum oxygen trapping amount is decreased as a result of the aged deterioration of the three-way catalyst 24, and thereby the response delay time depending the maximum oxygen trapping amount of the three-way catalyst 24 is shortened. Accordingly, we could consider that the response delay time and the dead-time of the oxygen sensor 28 might be elongated, when the above measured value of this time is longer than the predetermined time "kSOXNG". It is, therefore, sufficient to learn the measured values so long as the average response delay time for the high-amplitude operation is shorter than the predetermined time "kSOXNG", when learning the change of the maximum oxygen trapping amount of the three-way catalyst 24.

Alternatively, the measured value of this time may be memorized only when the measured value of this time for the response delay time of the high-amplitude operation is shorter than the measured value of the previous time. According to the above modifications, the influence of the elongation for the response delay time and the dead-time of the oxygen sensor 28 can be properly removed, when learning the change of the maximum oxygen trapping amount.

(M15) In the fourth to sixth embodiments, the average response delay time for the high-amplitude operation is stored in the storage-holding memory device. The average response delay time for the high-amplitude operation may be stored in a volatile memory. In this case, whenever the ECU 37 is turned off, the average response delay time for the high-amplitude operation is erased. Therefore, the steps S182 and S184 shown in FIG. 15 are particularly effective, in a case in which the deterioration diagnosis for the catalyst is carried out not for the first time (for example, the catalyst 24 is in the initial condition at shipping) but for the second time or thereafter.

(M16) In the sixth embodiment, when the output of the oxygen sensor 28 is reversed from the lean to the rich side during the rich time, or when the output of the oxygen sensor 28 is reversed from the rich to the lean side during the lean time, the target air-fuel ratio is forcibly changed to the other side, namely to the lean side in the former case and to the rich side in the latter case. However, the target air-fuel ratio may be forcibly to either rich or lean side only in one of the cases.

(M17) In each of the above embodiments, the temperature of the three-way catalyst 24 is calculated based on the operating condition of the engine 19, the output of the water temperature sensor 34 and the output of the outside temperature sensor 36. The temperature of the three-way catalyst 24 may be directly detected.

(M18) In each of the above embodiments, the response delay time is measured by several times. However, the response delay time may be measured by only one time. Even in such a case, effects similar to the above effects (A1) to (A8), (A10), (A11), (A13) and (A15) can be obtained.

(M19) In the engine operation, in which the variational amount for the flow amount of the oxygen is set at the value other than the maximum, the ratio-change time period (the time point at which the air-fuel ratio is changed from the lean to the rich side, or vice versa, to the time point at which the air-fuel ratio is forcibly changed from the rich to the lean side) is defined as the additional amount. It corresponds to the additional amount of the response delay time for the engine operation in which the variational amount for the flow amount of the oxygen is set at the maximum value and the threshold amount, with which the difference between multiple response delay times is compared in order to carry out the diagnosis for the catalyst deterioration. However, the ratio-change time period may be defined as such a value, which is smaller than the above additional amount by a predetermined amount (which is not larger than the delay time "ΔT" explained in the above formula (1)).

(M20) In the above embodiments, the ratio-change time period (that is, the time period from the time point at which the air-fuel ratio is changed from one of the lean and rich values to the time point at which the air-fuel ratio is changed to the other value) is defined based on the response delay time measured in the engine operation, in which the variational amount for the oxygen flow is set at the maximum and the threshold value between the response delay times to be used for the deterioration diagnosis. However, the method for defining the ratio-change time period is not limited to the above method. For example, the ratio-change time period for the high-amplitude operation may be defined as a value, which is obtained by subtracting the above threshold value from the measured values for the response delay time for the low-amplitude operation. In such case, the change for the air fuel ratio may be immediately terminated when the output of the oxygen sensor 28 is not reversed over a time period, in which the above threshold value is subtracted from the response delay time for the low amplitude operation, when measuring the response delay time for the high-amplitude operation. In addition, in such case, a number of such phenomena may be counted, and the three-way catalyst 24 may be diagnosed as being deteriorated when the counted number becomes larger than a certain number.

(M21) In the above embodiments, the ratio-change time period (that is, the time period from the time point at which the air-fuel ratio is changed from one of the lean and rich values to the time point at which the air-fuel ratio is changed to the other value) is defined based on the response delay time measured in the engine operation, in which the variational amount for the oxygen flow is set at a specific value and the threshold value between the response delay times to be used for the deterioration diagnosis. However, the method for defining the ratio-change time period is not limited to the above method. For example, the response delay time for the low-amplitude operation may be defined as the time, which corresponds to the time calculated at the step S182 of FIG. 15.

(M22) A method for forming two different flows to be supplied to the catalyst 24, in which flow amount of the oxygen is controlled at different values for the purpose of carrying out the diagnosis of the catalyst deterioration, is not limited to the method, according to which the variational amount for the air-fuel ratio is changed. Even in the case the air-fuel ratio is changed by the same variational amount, the flow amount of the oxygen supplied to the catalyst 24 differs from each other when the exhaust gas amount differs from each other. Accordingly, the throttle valve 16 may be so controlled that the intake air amount differs from each other. In this case, the target air-fuel ratio may be skipped by an amount equal to a skip amount for the high-amplitude operation, and the engine operation may be carried out by an open-loop control. In the case the skip amount is large in the open-loop control, the air-fuel ratio can be surely changed to the lean or rich side. Therefore, the diagnosis for the catalyst deterioration can be carried out without being influenced by the characteristic of the A/F sensor 26.

(M23) In the above embodiments, the average response delay time is calculated based on the whole measured values measured by several times. However, multiple response delay times for various cases of different exhaust gas amounts may be stored in a memory device, such as RAM, and the diagnosis for the catalyst deterioration may be carried out based on data for the response delay times, which are data for the case of the same exhaust gas amount.

(M24) In the above embodiments, the time difference between the response delay time for the low-amplitude operation and the response delay time for the high-amplitude operation is used as the parameter for carrying out the diagnosis of the catalyst deterioration. However, a divisional figure of the response delay times for the low-amplitude and high-amplitude operations may be used as the parameter for carrying out the diagnosis of the catalyst deterioration.

For example, in the case a ratio of the delay time "$\Delta T$" (which is the delay time from the time point at which the fuel injection amount is decreased to the time point at which the influence for the change of the fuel injection amount appears at the three-way catalyst 24) to the response delay time "tA" or "tB" is almost equal to a ratio of the time delay "$S/(g a \times \Delta \lambda)$" or "$S/(g a \times 2 \times \Delta \lambda)$" (which depends on the maximum oxygen trapping amount "S" of the three-way catalyst 24) to the response delay time "tA" or "tB", and the delay time "$\Delta r$" (which is caused by the response delay time and the dead-time of the oxygen sensor 28) is substantially smaller than the above delay times ("$\Delta T$", "$S/(g a \times \Delta \lambda)$" or "$S/(g a \times 2 \times \Delta \lambda)$"), it is easy to grasp information relating to the time delay "$S/(g a \times \Delta \lambda)$" or "$S/(g a \times 2 \times \Delta \lambda)$" (which depends on the maximum oxygen trapping amount "S" of the three-way catalyst 24), from the divisional figure of the response delay times. Then, the threshold value "kCATOK" at the step S20 of FIG. 4 may be set in advance based on experiments, in which various kinds of figures influencing on the oxygen sensor 28 are used as parameters, so that the diagnosis for the catalyst deterioration is carried out by comparing the divisional figure of the response delay times with the threshold value "kCATOK".

(M25) In the above embodiments, the invention is applied to the gasoline engine having the three-way catalyst. However, the invention can be applied to a lean-burn gasoline engine or a diesel engine having NOx purifying catalyst for trapping NOx contained in the exhaust gas. In such a case, a diagnosis for catalyst deterioration may be carried out in the following manner. Namely, response delay times for different exhaust gas flows, from a first time point at which NOx amount contained in the exhaust gas at an upstream side of the catalyst is changed to a second time point at which NOx concentration contained in the exhaust gas at a downstream side of the catalyst is changed, are measured. Then, a difference between the response delay times for the different exhaust gas flows is compared with a predetermined threshold value.

What is claimed is:

1. A deterioration diagnosing apparatus for an exhaust gas purifying catalyst, which has functions for trapping and discharging oxygen, comprising:
    a sensing device provided in an exhaust system of an engine at a downstream side of the exhaust gas purifying catalyst and for detecting density of oxygen contained in exhaust gas; and
    an electronic control unit for receiving an output from the sensing device and configured to perform a first diagnosing step for diagnosing deterioration of the exhaust gas purifying catalyst based on a difference between a first response delay time and a second response delay time, wherein:
    the first response delay time is measured when the engine is operated in a first operational mode, in which a flow amount of the oxygen contained in the exhaust gas at an upstream side of the exhaust gas purifying catalyst is changed by a first variational amount, and the first response delay time is measured as a first time period from a first time point at which the flow amount of the oxygen is changed from a rich side to a lean side of an air-fuel ratio to a second time point at which the output of the sensing device is changed from the rich side to the lean side as a result of the change of the flow amount of the oxygen,
    the second response delay time is measured when the engine is operated in a second operational mode, in which the flow amount of the oxygen contained in the exhaust gas at the upstream side of the exhaust gas purifying catalyst is changed by a second variational amount, and the second response delay time is measured as a second time period from another first time point at which the flow amount of the oxygen is changed from the rich side to the lean side of the air-fuel ratio to another second time point at which the output of the sensing device is changed from the rich side to the lean side as a result of the change of the flow amount of the oxygen,
    the second variational amount is larger than the first variational amount,
    the electronic control unit determines that the exhaust gas purifying catalyst is deteriorated when the difference between the first and second response delay times is lower than a predetermined value,
    the second operational mode corresponds to a fuel-cut control for the engine,
    the electronic control unit is further configured to performed a step for forcibly changing flow amount of the oxygen contained in the exhaust gas at the upstream side of the exhaust gas purifying catalyst,
    the electronic control unit is further configured to performed a step for selling a ratio-change time period, based on which the flow amount of the oxygen is forcibly changed,
    the ratio-change time period is decided in accordance with the first response delay time, which is obtained in the first operational mode of the engine in which the variational amount for the flow amount of the oxygen is set at a maximum value, and
    the flow amount of the oxygen is changed, based on the above ratio-change time period, in the second operational mode of the engine in which the variational amount for the flow amount of the oxygen is set at a value other than the maximum value.

2. The deterioration diagnosing apparatus according to the claim 1, wherein
    in the case that the flow amount of the oxygen is changed in the second operational mode of the engine in which the variational amount for the flow amount of the oxygen is set at the value other than the maximum value, before the first response delay time is measured in the first operational mode of the engine in which the variational amount for the flow amount of the oxygen is set at the maximum value,
    the ratio-change time period is decided in accordance with an assumed response delay time for the first operational mode of the engine in which the variational amount for the flow amount of the oxygen is set at the maximum value.

3. The deterioration diagnosing apparatus according to the claim 1, wherein the electronic control unit is further configured to performed a second diagnosing step for diagnosing the deterioration of the exhaust gas purifying catalyst based on a change of the output of the sensing device, wherein the second diagnosing step is carried out by determining whether the output of the sensing device is changed within the ratio-change time period from a time point at which the flow amount of the oxygen is changed, when the flow amount of the oxygen is changed in the second operational mode of the engine in which the variational amount for the flow amount of the oxygen is set at the value other than the maximum value.

4. The deterioration diagnosing apparatus according to the claim 3, wherein the electronic control unit diagnoses at the second diagnosing step that the exhaust gas purifying catalyst is not in a deteriorated condition, when the output of the sensing device is not changed within the ratio-change time period from the time point at which the flow amount of the oxygen is changed.

5. A deterioration diagnosing apparatus for an exhaust gas purifying catalyst, which has functions for trapping and discharging oxygen, comprising:

a sensing device provided in an exhaust system of an engine at a downstream side of the exhaust gas purifying catalyst and for detecting density of oxygen contained in exhaust gas; and an electronic control unit for receiving an output from the sensing device and configured to perform a first diagnosing step for diagnosing deterioration of the exhaust gas purifying catalyst based on a difference between a first response delay time and a second response delay time, wherein:

the first response delay time is measured when the engine is operated in a first operational mode, in which a flow amount of the oxygen contained in the exhaust gas at an upstream side of the exhaust gas purifying catalyst is changed by a first variational amount, and the first response delay time is measured as a first time period from a first time point at which the flow amount of the oxygen is changed from a rich side to a lean side of an air-fuel ratio to a second time point at which the output of the sensing device is changed from the rich side to the lean side as a result of the change of the flow amount of the oxygen, the second response delay time is measured when the engine is operated in a second operational mode, in which the flow amount of the oxygen contained in the exhaust gas at the upstream side of the exhaust gas purifying catalyst is changed by a second variational amount, and the second response delay lime is measured as a second time period from another first time point at which the flow amount of the oxygen is changed from the rich side to the lean side of the air-fuel ratio to another second time point at which the output of the sensing device is changed from the rich side to the lean side as a result of the change of the flow amount of the oxygen, the second variational amount is larger than the first variational amount, the electronic control unit determines that the exhaust gas purifying catalyst is deteriorated when the difference between the first and second response delay times is lower than a predetermined value, the second operational mode corresponds to a fuel-cut control for the engine, the electronic control unit is further configured to performed a step for forcibly changing flow amount of the oxygen contained in the exhaust gas at the upstream side of the exhaust gas purifying catalyst, the electronic control unit is further configured to performed a step for setting a ratio-change time period, based on which the flow amount of the oxygen is forcibly changed, the electronic control unit has a learning function for learning a change of a maximum oxygen trapping amount of the exhaust gas purifying catalyst based on at least one of the first or second response delay times, and the ratio-change time period is set in accordance with the change of the maximum oxygen trapping amount, which is learned by the learning function of the electronic control unit.

6. A deterioration diagnosing apparatus for an exhaust gas purifying catalyst, which has functions for trapping and discharging oxygen, comprising:

a sensing device provided in an exhaust system of an engine at a downstream side of the exhaust gas purifying catalyst and for detecting density of oxygen contained in exhaust gas; and an electronic control unit for receiving an output from the sensing device and configured to perform a first diagnosing step for diagnosing deterioration of the exhaust gas purifying catalyst based on a difference between a first response delay time and a second response delay time, wherein:

the first response delay time is measured when the engine is operated in a first operational mode, in which a flow amount of the oxygen contained in the exhaust gas at an upstream side of the exhaust gas purifying catalyst is changed by a first variational amount, and the first response delay time is measured as a first time period from a first time point at which the flow amount of the oxygen is changed from a rich side to a lean side of an air-fuel ratio to a second time point at which the output of the sensing device is changed from the rich side to the lean side as a result of the change of the flow amount of the oxygen, the second response delay time is measured when the engine is operated in a second operational mode, in which the flow amount. of the oxygen contained in the exhaust gas at the upstream side of the exhaust gas purifying catalyst is changed by a second variational amount, and the second response delay time is measured as a second time period from another first time point at which the flow amount of the oxygen is changed from the rich side to the lean side of the air-fuel ratio to another second time point at which the output of the sensing device is changed from the rich side to the lean side as a result of the change of the flow amount of the oxygen, the second variational amount is larger than the first variational amount, the electronic control unit determines that the exhaust as purifying catalyst is deteriorated when the difference between the first and second response delay times is lower than a predetermined value, the second operational mode corresponds to a fuel-cut control for the engine, the electronic control unit is further configured to performed a step for forcibly changing flow amount of the oxygen contained in the exhaust gas at the upstream side of the exhaust gas purifying catalyst, the electronic control unit is further configured to performed a step for setting a ratio-change time period, based on which the flow amount of the oxygen is forcibly changed, when the output of the sensing device is changed to a rich side or to a lean side within the ratio-change time period as a result of the change of the flow amount, an air-fuel ratio of mixture to be supplied into a combustion chamber of the engine is forcibly changed to the lean side or to the rich side, which is an opposite side to the first rich or lean side.

7. A deterioration diagnosing apparatus for an exhaust gas purifying catalyst, which has functions for trapping and discharging oxygen, comprising:

a sensing device provided in an exhaust system of an engine at a downstream side of the exhaust gas purifying catalyst and for detecting density of oxygen contained in exhaust gas; and an electronic control unit for receiving an output from the sensing device and configured to perform a first diagnosing step for diagnosing deterioration of the exhaust gas purifying catalyst based on a difference between a first response delay time and a second response delay time, wherein:

the first response delay time is measured when the engine is operated in a first operational mode, in which a flow amount of the oxygen contained in the exhaust gas at an upstream side of the exhaust gas purifying catalyst is changed by a first variational amount, and the first response delay time is measured as a first time period from a first time point at which the flow amount of the oxygen is changed from a rich side to a lean side of an air-fuel ratio to a second time point at which the output the sensing device is changed from the rich side to the lean side as a result of the change of the flow amount of the oxygen, the second response delay time is measured when the engine is operated in a second operational mode, in which the flow amount of the oxygen contained in the exhaust gas at the upstream side of the exhaust gas purifying catalyst is changed by a second variational amount, and the second response delay time is measured as a second time period from another first time point at which the flow amount of oxygen is changed from the rich side to the lean side of the air-fuel ratio to another second time point at which the output of the sensing device is changed from the rich side to the lean side as a result of the change of the flow amount of the oxygen, the second variational amount is larger than the first variational amount, the electronic control unit determines the exhaust gas purifying catalyst is deteriorated when the difference between the first and second response delay times is lower than a predetermined value, the second operational mode corresponds to a fuel-cut control for the engine, a cycle of reverse, from a rich side to a lean side and from the lean side to the rich side, of the output of the sensing device is detected as such a value corresponding to the first and second response delay times, and the diagnosing step is carried out based on a difference of the cycle of the reverse between the first and second operational modes.

* * * * *